(12) United States Patent
Tobita et al.

(10) Patent No.: US 6,678,223 B2
(45) Date of Patent: Jan. 13, 2004

(54) FREQUENCY DEMODULATING CIRCUIT, OPTICAL DISK APPARATUS THEREOF AND PREFORMATING DEVICE

(75) Inventors: Minoru Tobita, Tokyo (JP); Susumu Tosaka, Kanagawa (JP); Yoshikatsu Niwa, Kanagawa (JP); Shinichi Nakao, Kanagawa (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/244,402

(22) Filed: Sep. 17, 2002

(65) Prior Publication Data

US 2003/0053385 A1 Mar. 20, 2003

Related U.S. Application Data

(60) Division of application No. 09/660,897, filed on Sep. 13, 2000, which is a division of application No. 09/074,814, filed on May 8, 1998, now Pat. No. 6,385,257, which is a continuation-in-part of application No. 09/009,595, filed on Jan. 20, 1998, now abandoned.

(30) Foreign Application Priority Data

| Jan. 21, 1997 | (JP) | ............ P09-009013 |
| Jan. 21, 1997 | (JP) | ............ P09-009014 |
| May 8, 1997 | (JP) | ............ P09-118310 |
| May 9, 1997 | (JP) | ............ P09-119661 |
| May 29, 1997 | (JP) | ............ P09-140647 |

(51) Int. Cl.$^7$ ............................................. G11B 7/005
(52) U.S. Cl. ................. 369/47.22; 369/47.28; 369/53.34
(58) Field of Search ............... 369/47.22, 47.19, 369/47.28, 47.35, 53.34

(56) References Cited

U.S. PATENT DOCUMENTS 4,700,364 A * 10/1987 Miyazaki et al. ............ 375/303

(List continued on next page.)

FOREIGN PATENT DOCUMENTS

JP 8-237320 * 9/1996

OTHER PUBLICATIONS

Patent Abstracts of Japan, vol. 96, No. 8 (019), JP 8–97870, Apr. 12, 1996.*

Patent Abstracts of Japan, vol. 97, No. 2 (025), JP 8–279786, Oct. 22, 1996.*

*Primary Examiner*—W. R. Young
(74) *Attorney, Agent, or Firm*—Oblon, Spivak, McClelland, Maier & Neustadt, P.C.

(57) ABSTRACT

An optical disk apparatus for driving an optical disk on which a groove wobble corresponding to a signal acquired from frequency modulation of biphase modulated address information, and a mark for representing phase information placed inside the wobble are preformatted, and having the biphase bit count "a" ("a" is a natural number) between two of the adjacent marks, and the channel bit count "n" ("n" is a natural number) between two of the adjacent marks. The apparatus includes first clock signal production device for generating a first clock signal utilizing an "n" frequency multiple of the reproduction signal of the clock mark, wobble signal reproduction device for reproducing from the optical disk a wobble signal corresponding to the groove wobble, and frequency demodulation device for acquiring the address information by frequency demodulation of the wobble signal. The frequency demodulation device has a second clock signal generator for generating a second clock signal by frequency dividing a data clock signal supplied from the first clock signal reproduction device by $1/M(M - - - n/(a \cdot s))$ in which a clock "s" ("s" is a natural number) is an oversampling value of the biphase bit, a waveform shaping unit for acquiring binary values by waveforming the wobble signal, and a detector for acquiring the address information by processing the second clock signal using the binary signal.

3 Claims, 37 Drawing Sheets

U.S. PATENT DOCUMENTS

| | | | | |
|---|---|---|---|---|
| 5,295,130 A | * | 3/1994 | Tobita et al. | 369/124.15 |
| 5,363,352 A | * | 11/1994 | Tobita et al. | 369/13.02 |
| 5,469,415 A | * | 11/1995 | Fujita et al. | 369/47.17 |
| 5,469,420 A | * | 11/1995 | Fujita et al. | 369/59.18 |
| 5,506,827 A | * | 4/1996 | Tobita | 369/59.22 |
| 5,592,454 A | * | 1/1997 | Tobita et al. | 369/53.36 |
| 5,721,873 A | * | 2/1998 | Tobita et al. | 711/164 |
| 5,812,512 A | * | 9/1998 | Tobita et al. | 369/84 |
| 5,818,805 A | * | 10/1998 | Kobayashi et al. | 369/47.32 |
| 5,978,350 A | * | 11/1999 | Tobita et al. | 369/275.3 |
| 5,999,504 A | * | 12/1999 | Aoki | 369/47.4 |
| 6,310,851 B1 | * | 10/2001 | Tobita et al. | 369/111 |

* cited by examiner

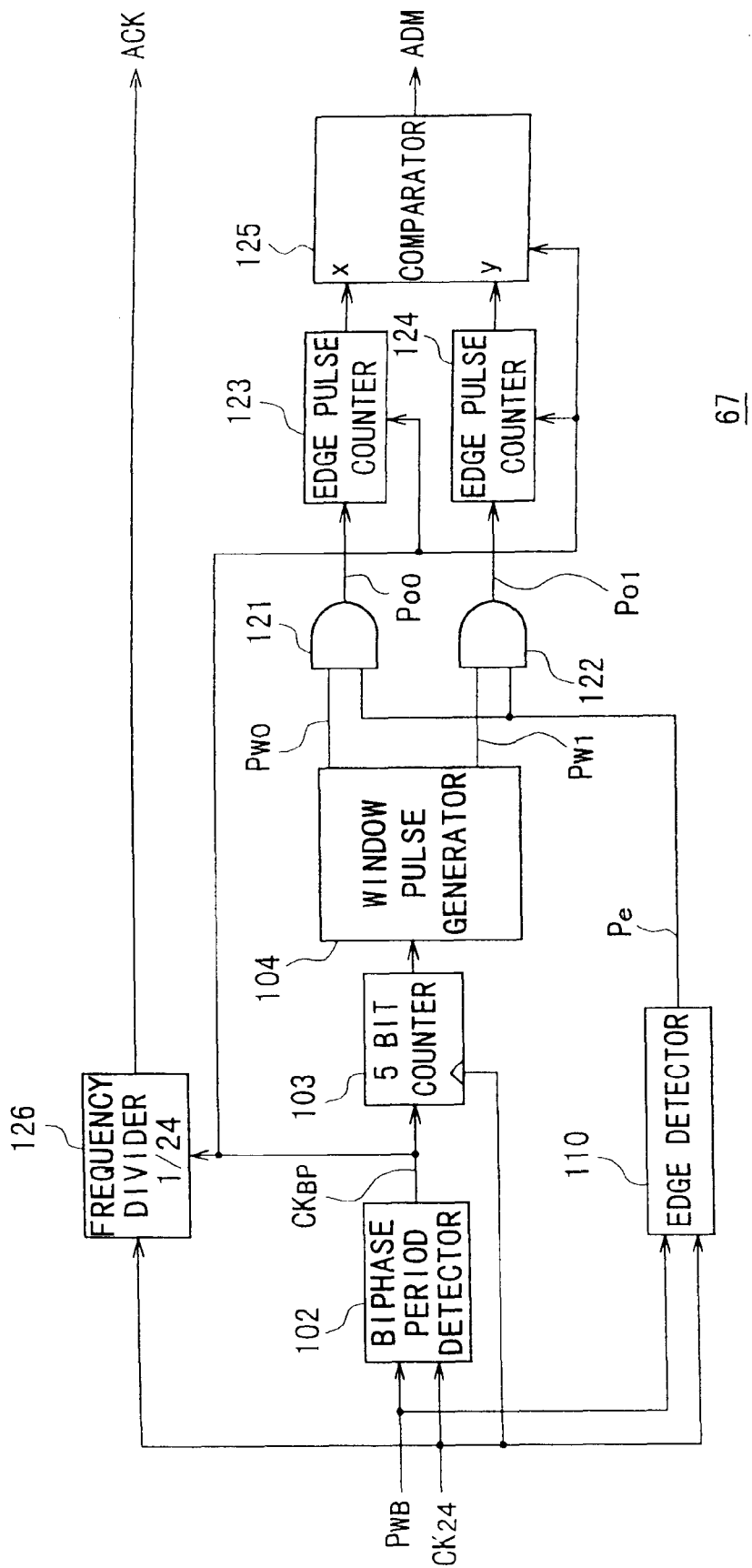
F I G. 12

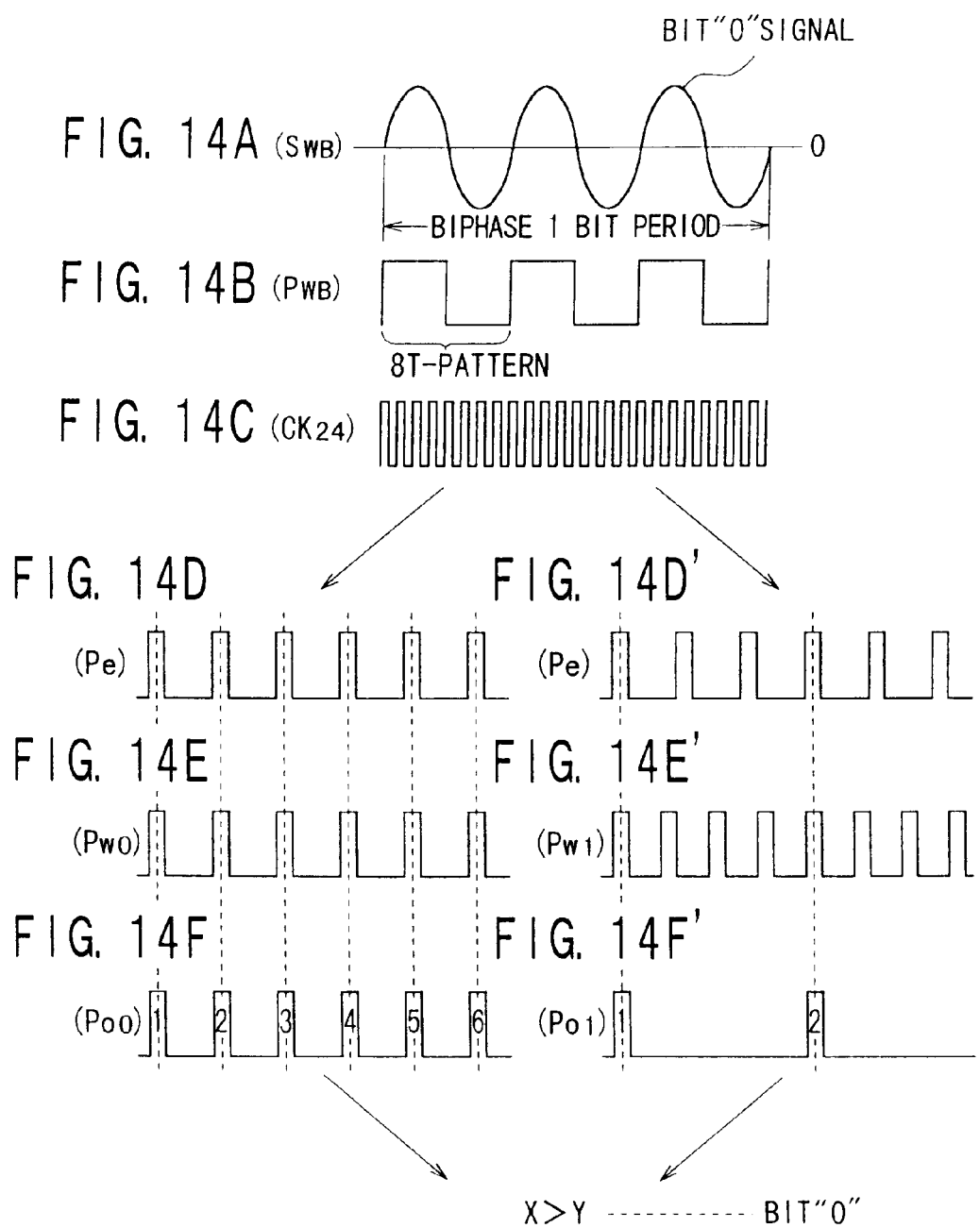

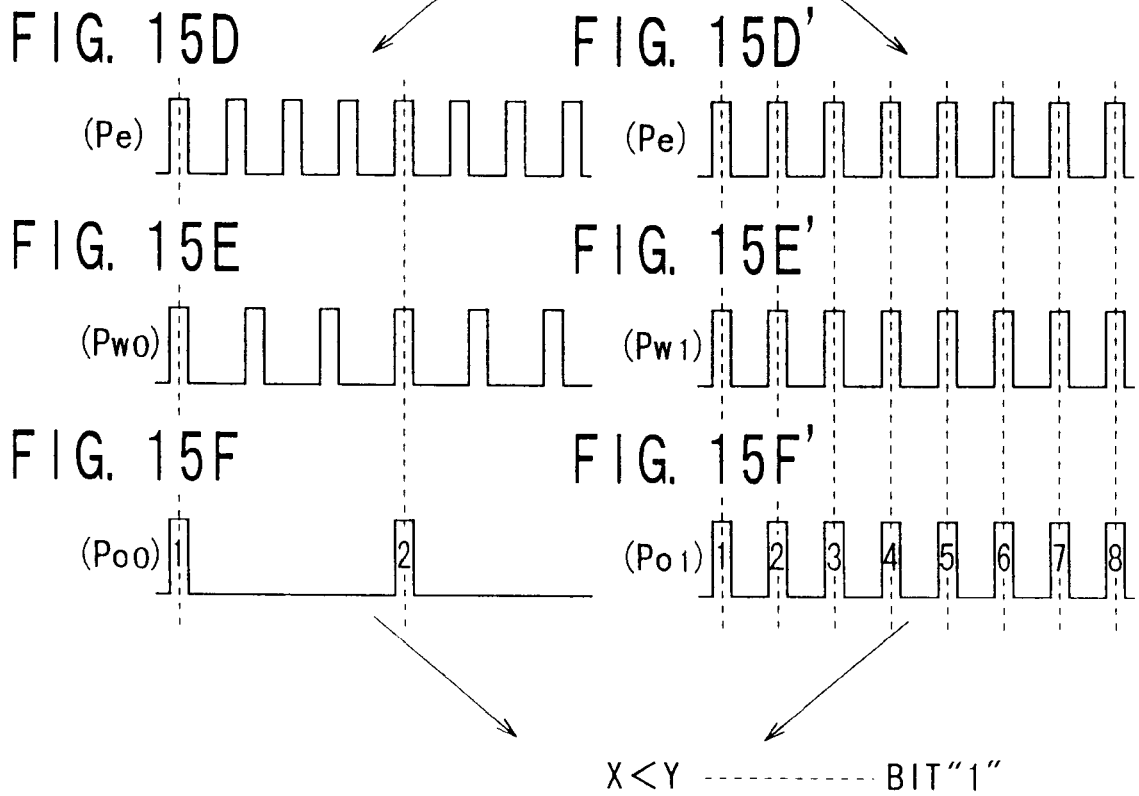

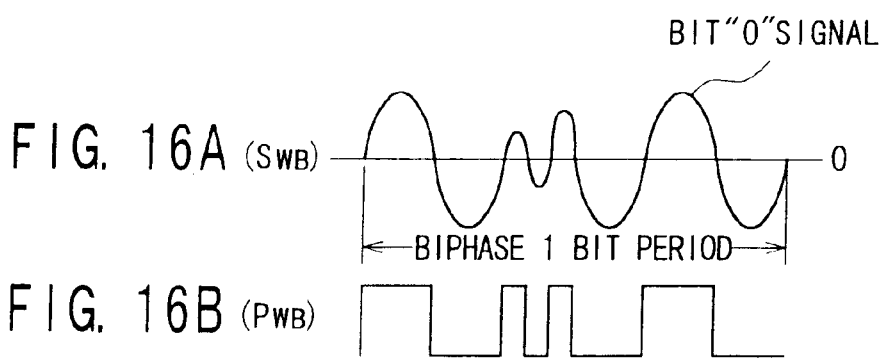

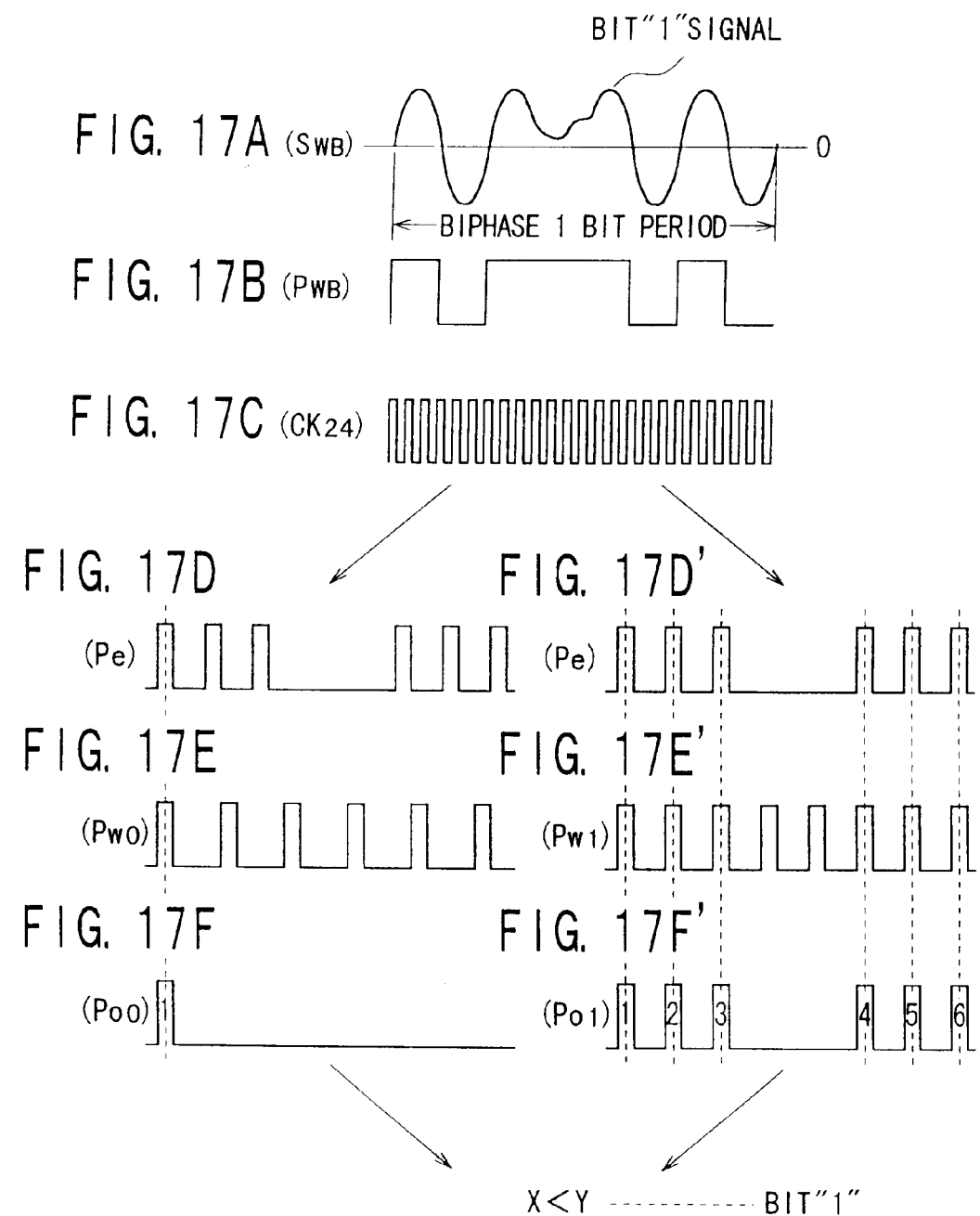

FIG. 18A (SwB) 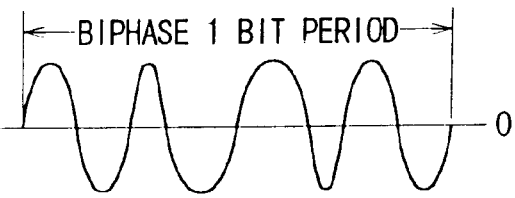
FIG. 18B (PwB) 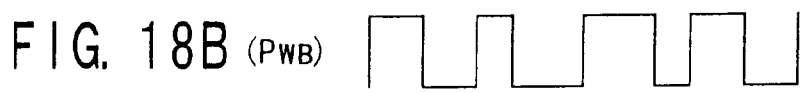
FIG. 18C (CK24) 
FIG. 18D (Pe) 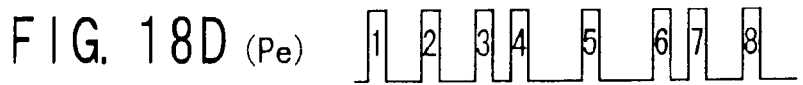
FIG. 18E (Pe)    FIG. 18E' (Pe) 
FIG. 18F (Pw0)    FIG. 18F' (Pw1) 
FIG. 18G (Po0)    FIG. 18G' (Po1) 
NUMBER JUDGMENT: INSUFFICIENT

FIG. 26A (SCM)
FIG. 26B (PCM)
FIG. 26C (SG)
FIG. 26D (PFP)
FIG. 26E (DCK)

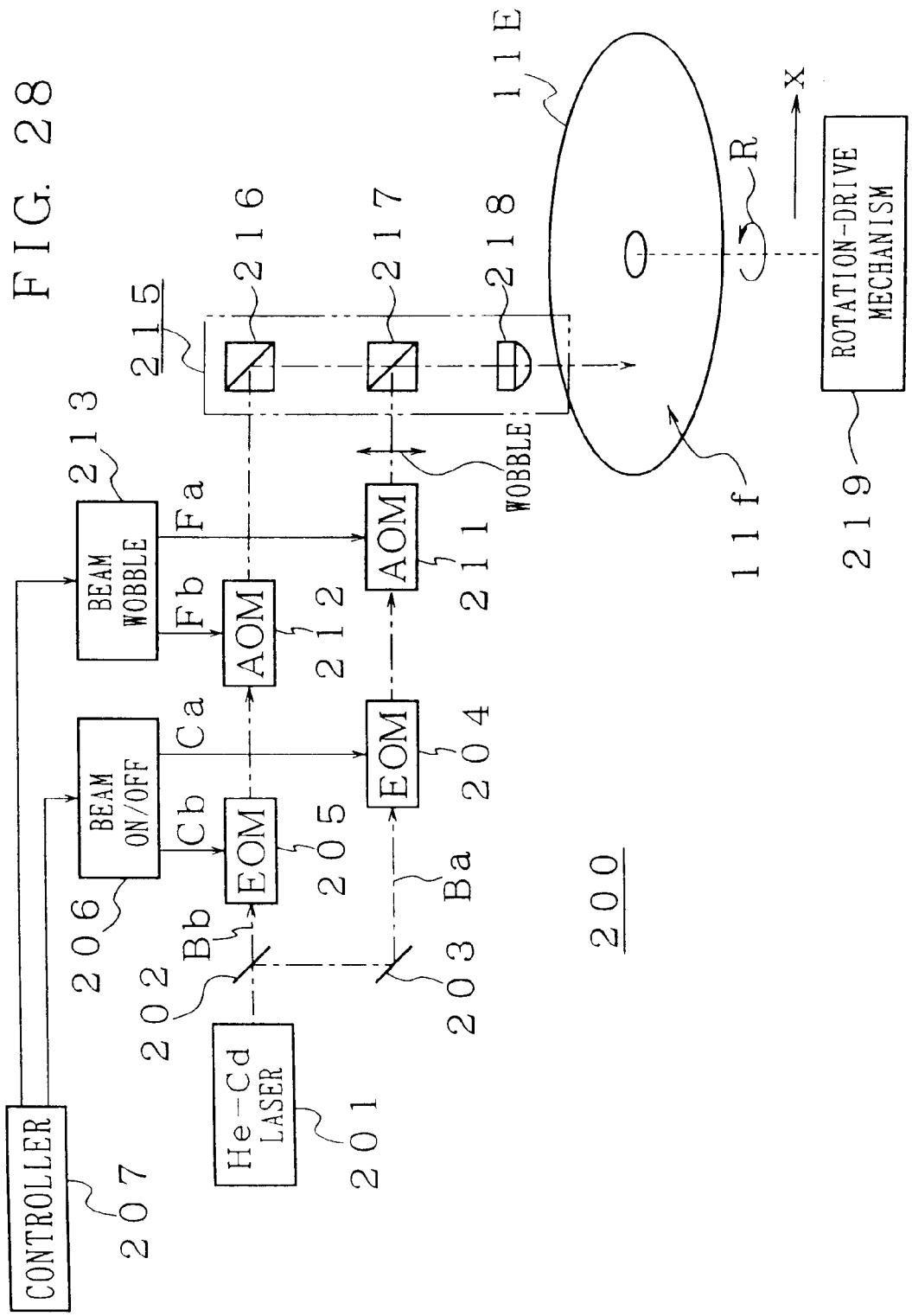

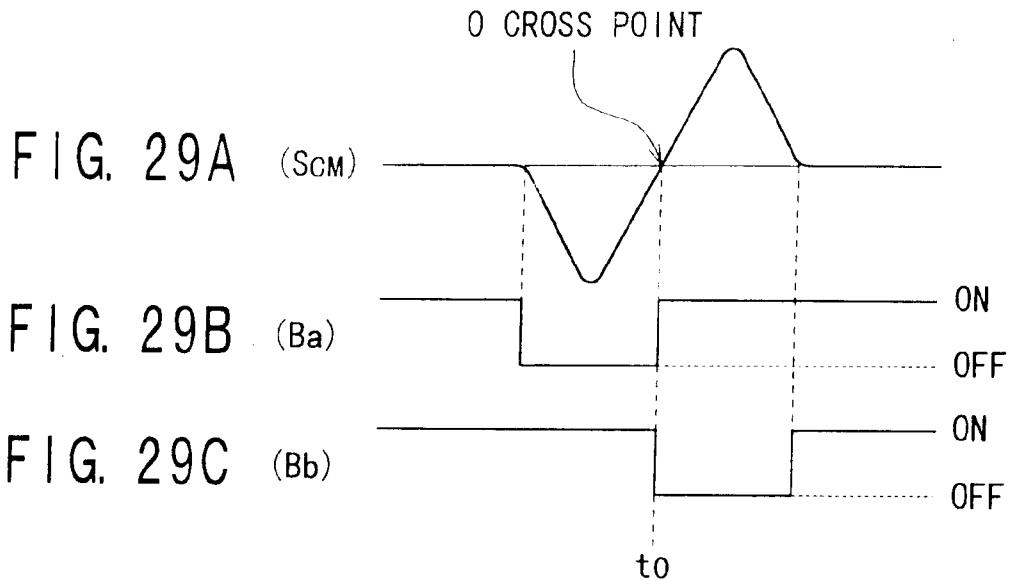
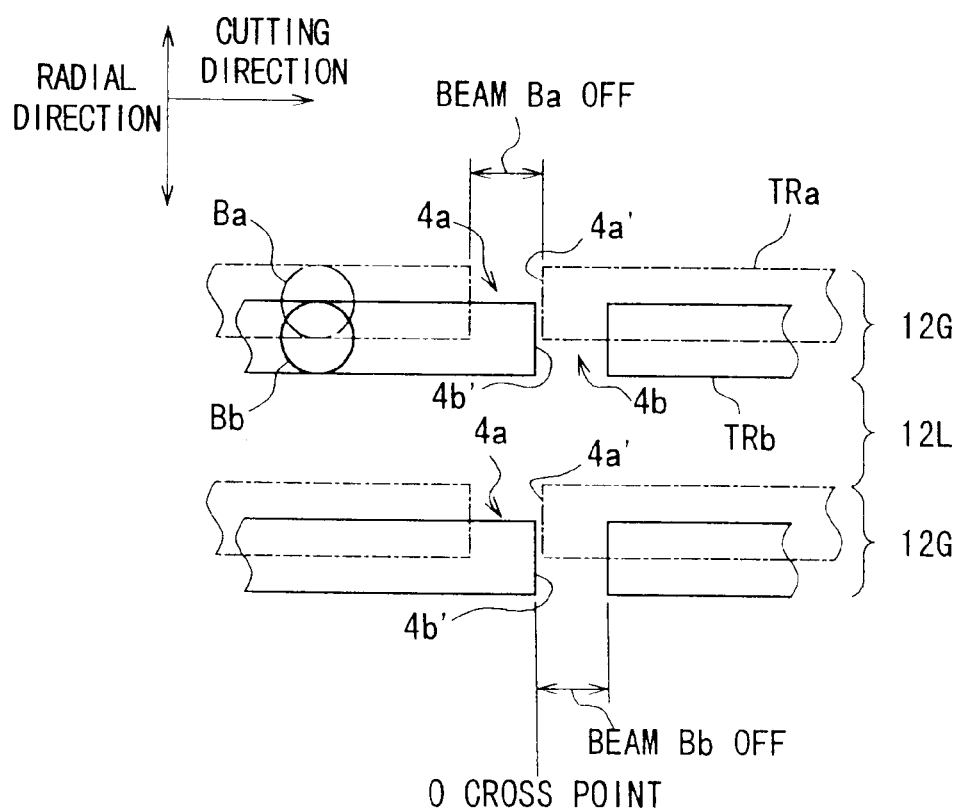

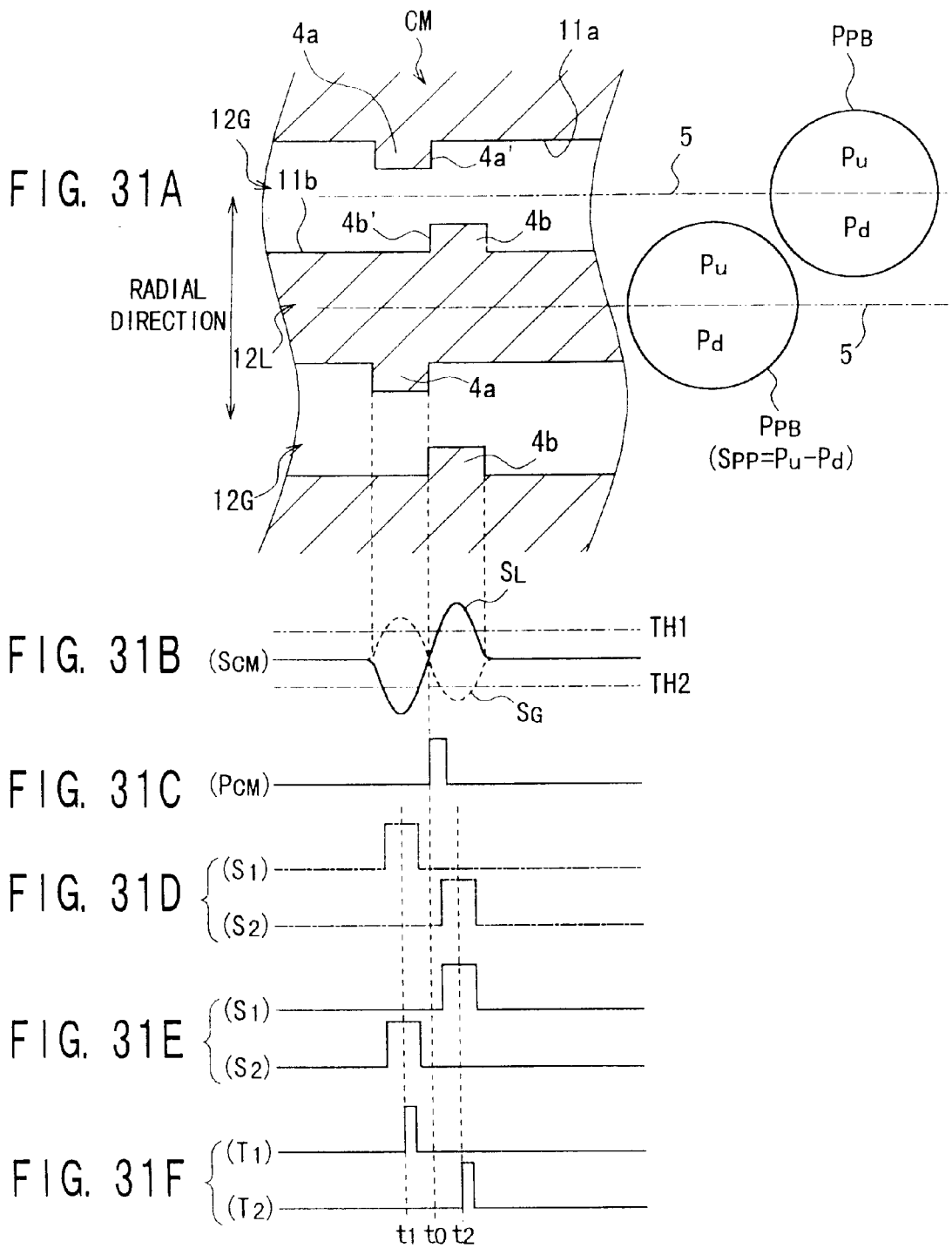

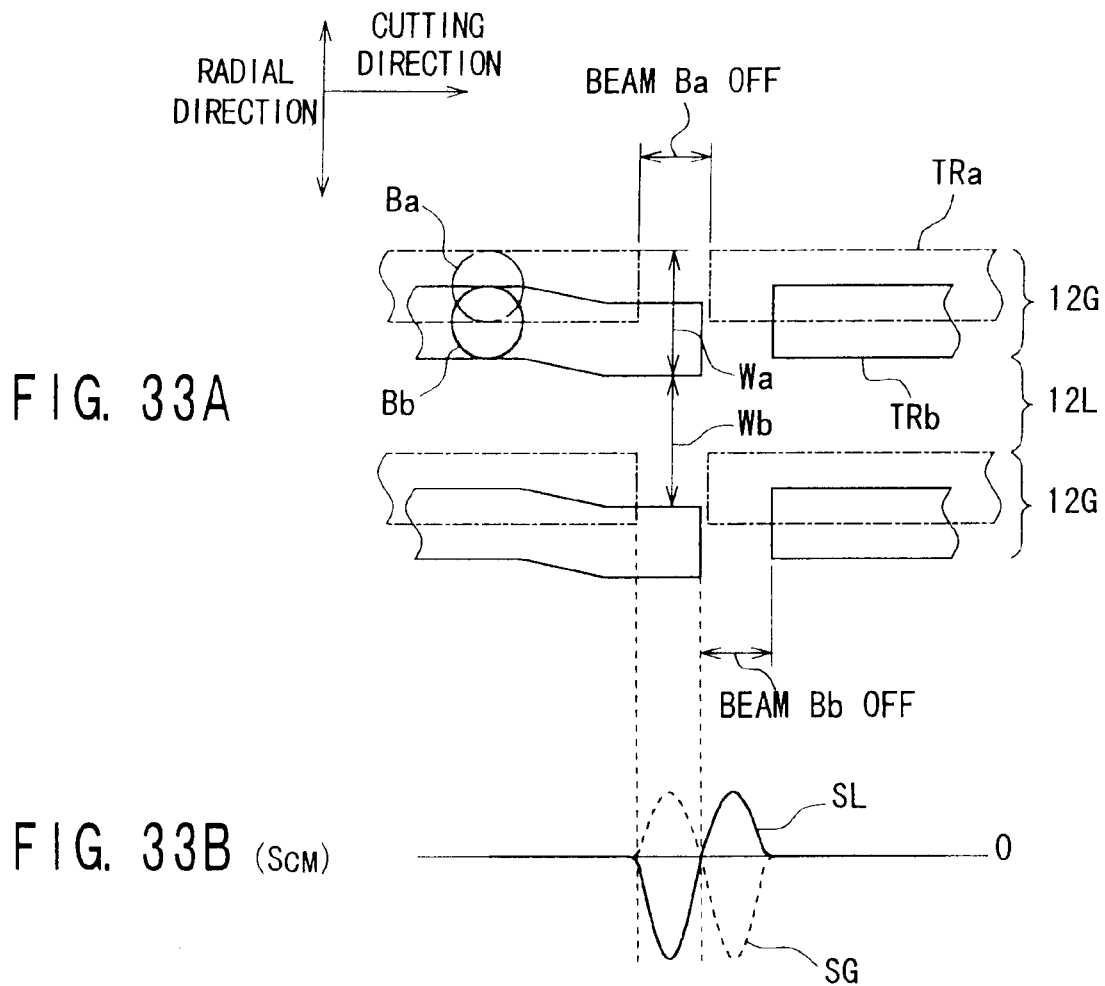

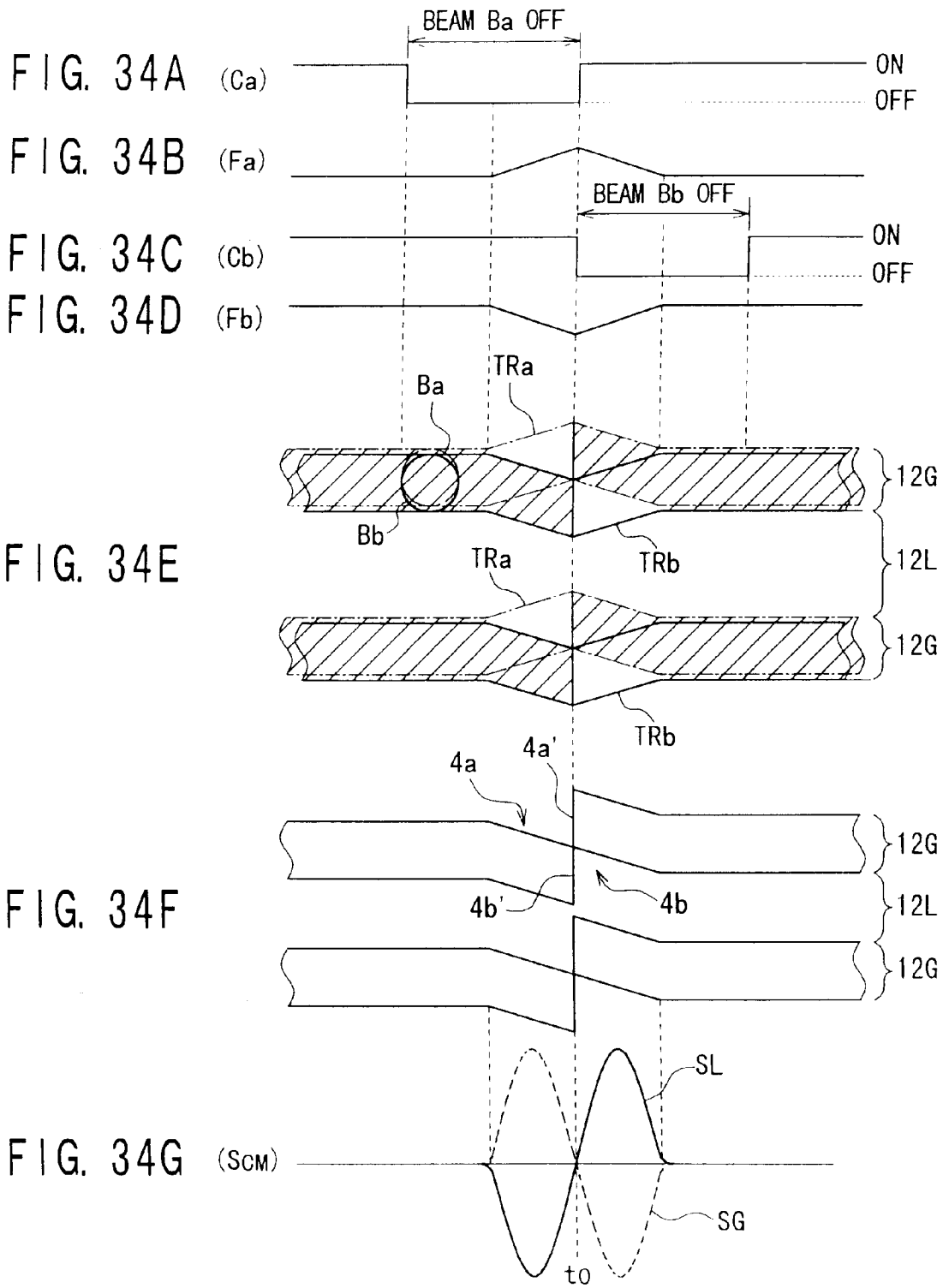

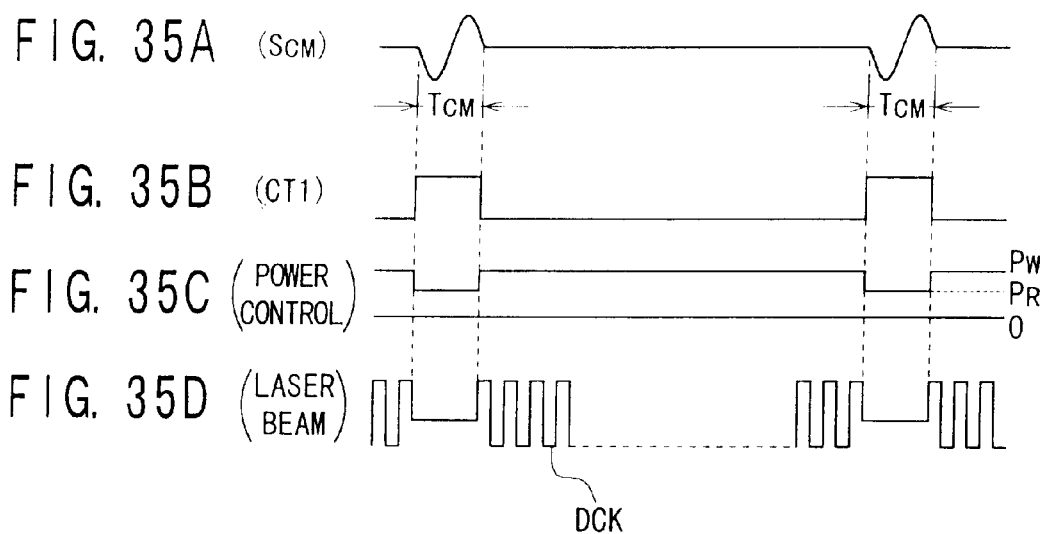
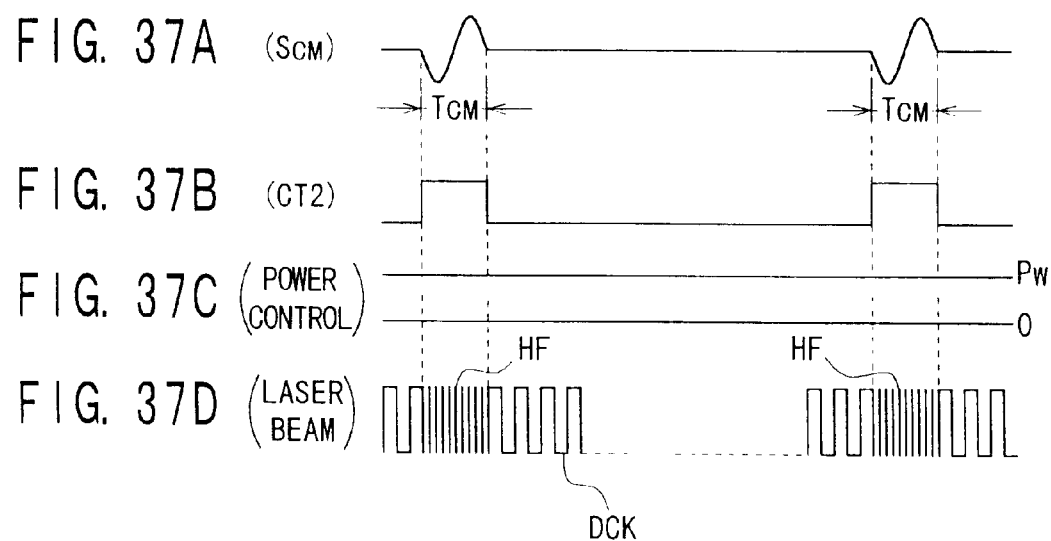

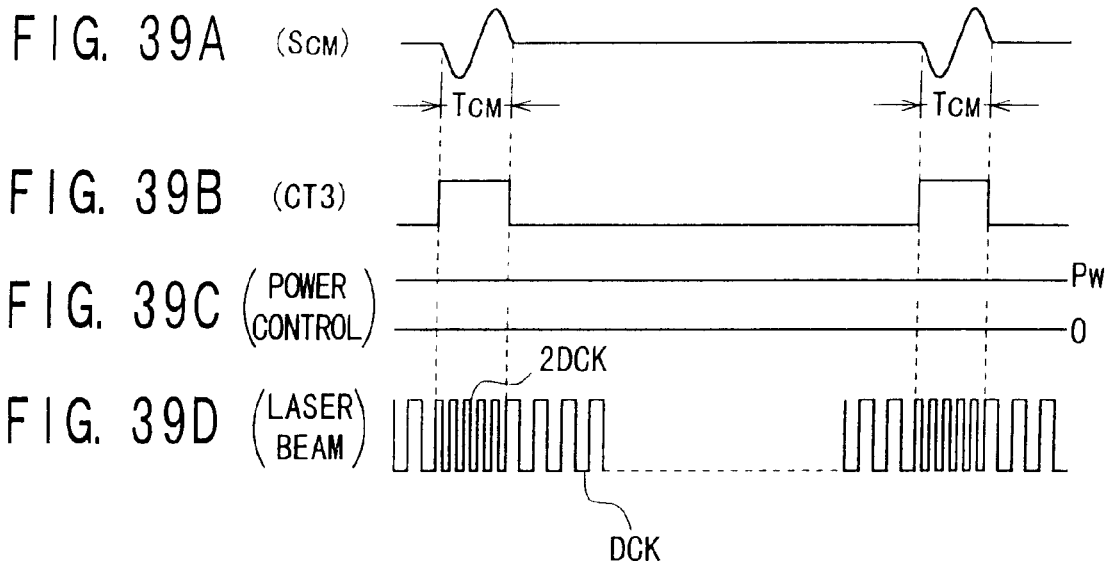
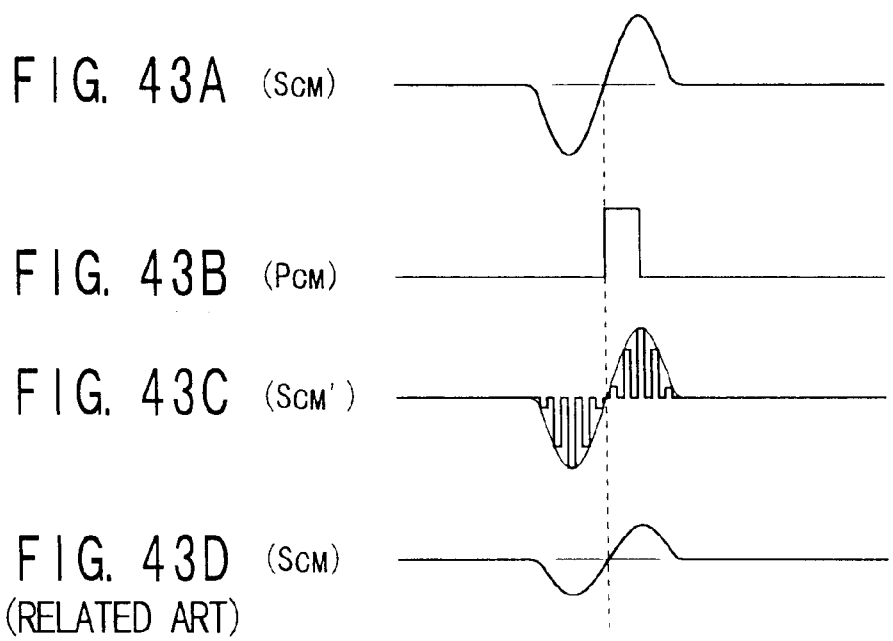

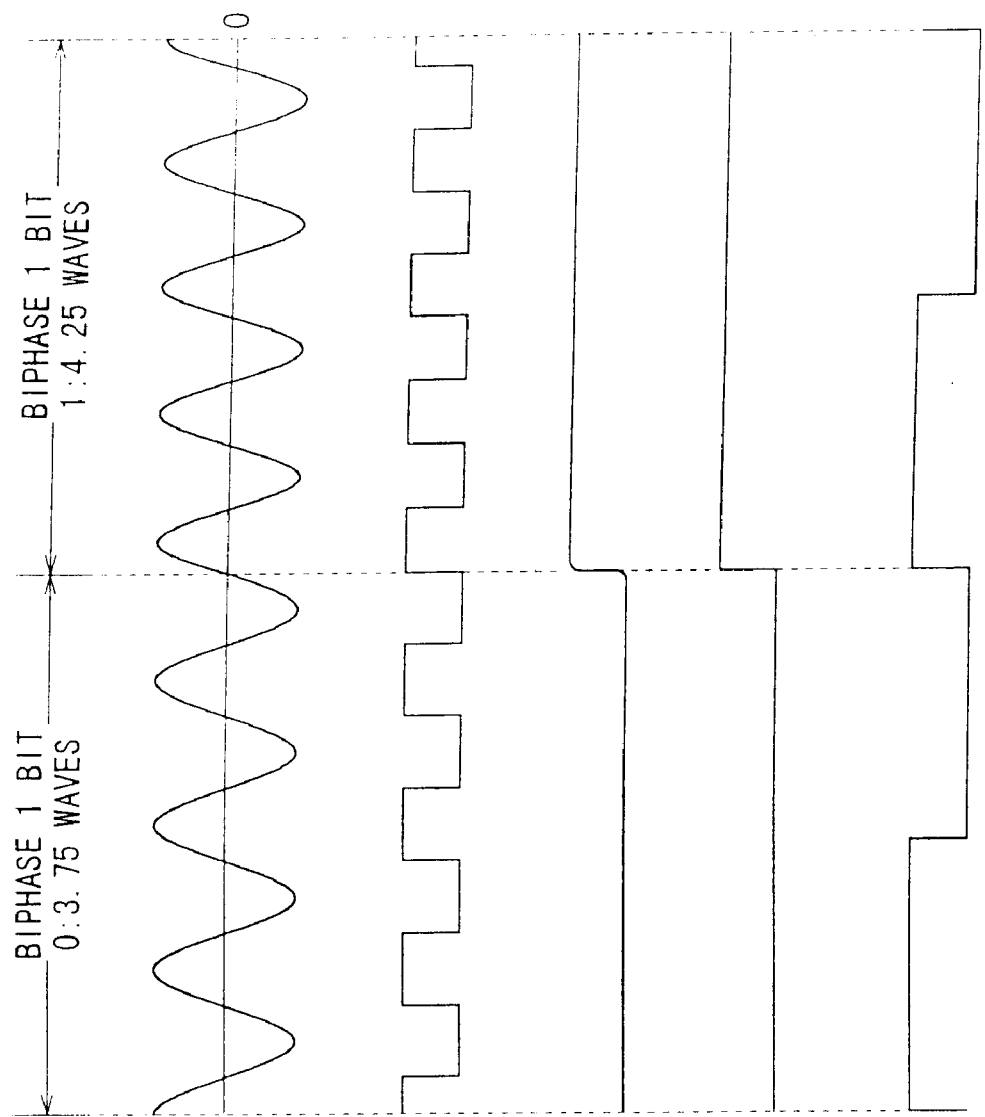
FIG. 42A (PRIOR ART) (SWB)
FIG. 42B (PRIOR ART) (PWB)
FIG. 42C (PRIOR ART) LPF103c OUTPUT
FIG. 42D (PRIOR ART) (ADM)
FIG. 42E (PRIOR ART) (ACK)

FIG. 44A
RELATED ART
FIG. 44B
RELATED ART
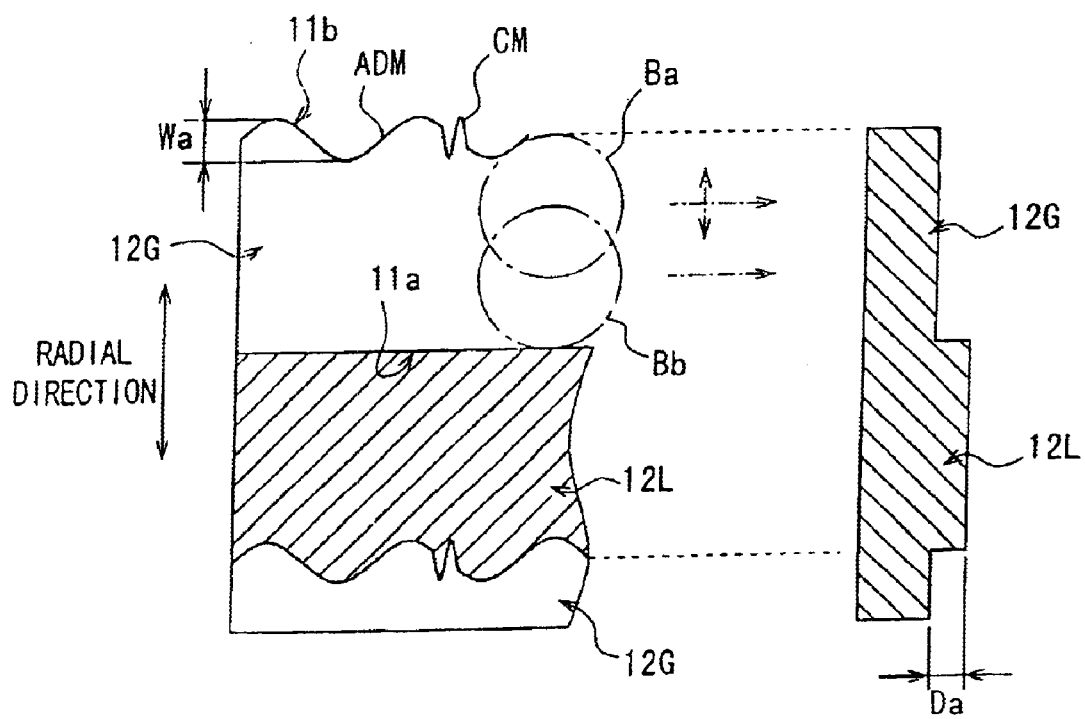
FIG. 45
RELATED ART
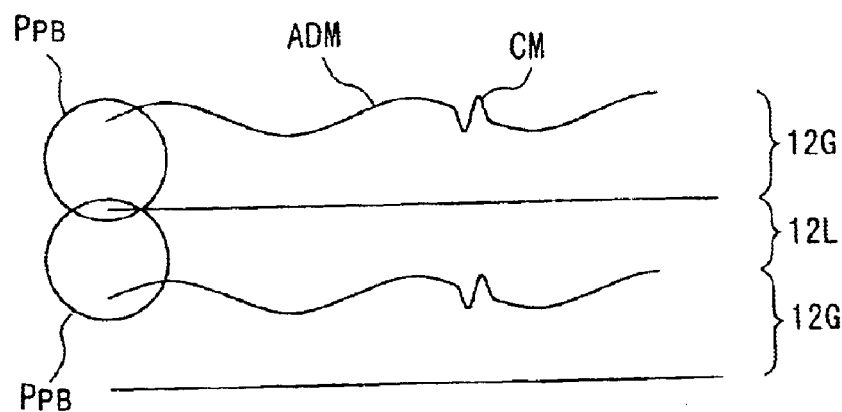

FREQUENCY DEMODULATING CIRCUIT, OPTICAL DISK APPARATUS THEREOF AND PREFORMATING DEVICE

This application is a Division of application Ser. No. 09/660,897 Filed on Sep. 13, 2000, which is a division of 09/074,814, filed on May 8, 1998 now U.S. Pat. No. 6,385,257, which is a Continuation in Part of 09/009,595, filed Jan. 20, 1998 now abandoned.

BACKGROUND OF THE INVENTION

1. Field of the Invention

The present invention relates to a frequency demodulating circuit, optical disk apparatus and preformatting device.

2. Description of Related Art

In the conventional art, an optical disk has been proposed in which frequency modulation of biphase modulated address information ADM is performed and grooves are recorded in a wobbling state corresponding to the post-modulated signal. This groove wobble as shown in FIG. 40 may for instance, when the digital data is "1" per one bit (biphase 1 bit) of the address information ADM, become 4.25 waves (period of 4.25 on the sine wave), whereas when the digital data is "0" per a biphase 1 bit of the address information ADM, the groove wobble becomes 3.75 waves (period of 3.75 on the sine wave). In this case, the groove wobble is a fixed amount regardless of the frequencies of the post-modulated signals.

FIG. 41 is a block diagram showing a sample layout of a frequency demodulating circuit 100 of the conventional art used to acquire address information ADM from a groove wobble reproduction signal, in other words a wobble signal $S_{WB}$. This frequency demodulating circuit 100 contains a capacitor 101 for blocking the DC component and a comparator 102 for converting the wobble signal $S_{WB}$ into the binary signal $P_{WB}$ whose DC component has been removed by setting a threshold value or zero.

Also, the frequency demodulating circuit 100 includes a voltage-controlled oscillator 103a, a phase comparator 103b, and also a low-pass filter 103c, which constitute a PLL (phase-locked loop) circuit 103. The phase comparator 103b compares the phases of the output signal of this voltage-controlled oscillator 103a and the pulse signal $P_{WB}$ output from the comparator 102. The low-pass filter 103c derives the low frequency component of the phase error signal output from this phase comparator 103b in order to obtain a control signal which is supplied to the voltage-controlled oscillator 103a.

This frequency demodulating circuit 100 also contains another low-pass filter 104 for deriving the low frequency component of an output signal from the low-pass filter 103c; another capacitor 105 for removing the DC component; and another comparator 106 to acquire the address information ADM from the output signal of the low-pass filter 104, whose DC component is removed while setting a threshold value of zero.

Also, the frequency demodulating circuit 100 contains an edge detector 107 for detecting a rising edge and falling edge of the address information ADM output from the comparator 106; and a monostable multivibrator 108 capable of obtaining a pulse signal of a predetermined width while using an edge detection signal output from this edge detector 117.

The frequency demodulating circuit further includes another voltage-controlled oscilator 109a, another phase comparator 109b, and another low-pass filter 109c, which constitutes another PLL circuit 109. The phase comparator 109b executes a phase comparison between the output signal of this voltage-controlled oscillator 109a and the pulse signal output from the monostable multivibrator 108. The low-pass filter 109c derives a low frequency component from a phase error signal output from this phase comparator 109b in order to produce a control signal which is supplied to the voltage-controlled oscillator 109a.

The operation of the frequency demodulating circuit 100 shown in FIG. 41 will next be described. The wobble signal $S_{WB}$ is supplied via the capacitor 101 to the comparator 102 in order to be converted into a binary signal $P_{WB}$. As previously described, the address information ADM which has been biphase-modulated is frequency-modulated, and this frequency-modulated signal is recorded as a groove wobble on the optical disk. As a result, as shown in FIG. 42A, the wobble signal $S_{WB}$ has 4.25 waves when the digital data is "1", and has 3.75 waves when the digital data is "0" in correspondence with the 1 bit (biphase 1 bit) of the address information ADM similar to the frequency-modulated signal. Such a binary signal $PW_B$ as shown in FIG. 42B is therefore output from the comparator 102.

On the other hand, since the frequency of the wobble signal $S_{WB}$ corresponding to "1" is different from the frequency of the wobble signal $S_{WB}$ corresponding to "0", the output signal of the low-pass filter 103c which constitutes the PLL circuit 103 is shown in FIG. 42C. As a result, the address information ADM is produced from the low-pass filter 106, as indicated in FIG. 42D. The edge of this address information ADM is then detected by the edge detector 107. The edge detection signal is supplied as a trigger signal to the PLL circuit 109 and the pulse signal output from the monostable multivibrator 108 is supplied as a reference signal to this PLL circuit 109. As a result, a clock signal "ACK" which is synchronized with the address information is acquired from the voltage-controlled oscillator 109a to constitute the PLL circuit 109 as shown in FIG. 42E.

As previously described, the frequency demodulating circuit 100 shown in FIG. 41 has two signal systems of the PLL circuits 103 and 109 which constitute an overly complex circuit configuration.

As explained previously, the amplitude of the wobble groove recorded on the optical disk is a fixed amount regardless of the frequency of the signal after modulation so that as shown in the enlarged view in FIG. 40, a change in the slope (or deflection) occurs at the zero crosspoint of the groove wobble corresponding to the junction of the "1" and the "0" of the address information ADM. Consequently, large jitter is prone to occur on the time axis of the wobble signal $S_{WB}$ that matches the junction point of the "1" and the "0" of the address information ADM. This jitter prevents the demodulation circuit from acquiring error-free address information ADM.

The assignee of this invention and others are currently in the midst of developing the next generation of optical magnetic disks (ASMO) and are proposing an magneto-optical disk in which clock marks hold address information by means of the groove wobbles and preformatting is performed. In this previously undisclosed magneto-optical disk apparatus, a data clock signal is acquired in order to record and reproduce data by utilizing the reproduction signal of this clock mark.

A reproduction signal $S_{CM}$ of the clock marks is shown in FIG. 43A. This reproduction signal $S_{CM}$ functions as shown in FIG. 43B to form a $P_{CM}$ signal showing the timing of the zero (0) crosspoint. A data clock signal is acquired by means of the PLL circuit while referring to this pulse $P_{CM}$ signal.

The above mentioned clock mark CM is formed as shown in FIG. 44A and 44B while using a pair of cutting beams to cut-forme the surface of the base disk. Writing is performed radially across the surface of the disk base with a lands 12L and a grooves 12b being alternately formed. The groove 12G is cut to a specified depth Da as shown in the cross sectional view in FIG. 44B by using the cutting beams. Excluding the beams Ba, Bb, FIG. 44 shows a lateral reduction of one-tenth when the vertical direction is set as 1, just the same as in FIG. 45 related later.

The flat surface is one side of the cutting edge 11a in the groove 12G and the other cutting edge 11b is wobbled. The address information (shown by sine wave) ADM and the clockmark CM (one cycle of sine wave) are consecutively formed in this address information ADM (shown by sine wave).

One pair of cutting beams Ba, Bb is used as shown in FIG. 44A as the cutting beams for performing wobble cutting. The cutting beams Ba, Bb scan the surface of the base disk in a partially overlapping state as shown in the figure. In this example, a groove wobble is formed by means of the cutting beam Ba.

When reproducing the clock mark CM formed in the groove 12G in the groove wobble by means of the $P_{PB}$ beam shown in FIG. 45, both the reproduction signal $S_{CM}$ of the clock mark CM acquired during scanning of the land 12L and the reproduction signal $S_{CM}$ of the clock mark CM acquired during scanning of the groove 12G form signals of identical polarity as shown in FIG. 43A.

Accordingly, whether the beam $P_{PB}$ is scanning above the land 12L or scanning above the groove 12G cannot currently be determined by means of this reproduction signal $S_{CM}$. However, if it can be determined from the polarity of the reproduction signal $S_{CM}$, whether the beam $P_{PB}$ is currently scanning above the land 12L or scanning above the groove 12G, and servo control of the optical pickup system can then be accurately performed.

Further, as related above, the amplitude Wa (FIG. 44A) of the clock mark formed in the groove 12G by means of the wobble groove, is extremely small. The clock mark CM for the reproduction signal $S_{CM}$ shown in FIG. 43A has a poor signal to noise ratio. Accordingly, the clock signal acquired by using this reproduction signal $S_{CM}$ has a large jitter and for instance cannot be used as a clock signal for data reproduction. Further, control of the first cutting beam Ba is difficult since the clock signal must be formed accompanied by drastic level fluctuations of the zero cross point, the smaller the amplitude Wa.

SUMMARY OF THE INVENTION

It is therefore an object of this invention to provide an optical disk apparatus in which one signal system of these PLL circuits is reduced to a simple configuration for performing demodulation.

It is therefore another object of this invention to provide an optical disk apparatus in which jitter is reduced at the time axis of the wobble signal $S_{WB}$ that matches the junction point of the "1" and the "0" of the address information ADM and thus allow satisfactory acquisition of address information.

It is still another object of this invention to provide a preformatting device that can easily preformat marks having highly precise position (phase) information.

It is a further object of this invention to provide an optical disk apparatus that easily identifies whether the beam is above the groove or above the land by utilizing a polarized reproduction signal of a mark having phase information to determine whether the beam scanning the optical disk is above the land or above the groove.

In the optical disk apparatus of one aspect of this invention for driving an optical disk on which a groove wobble corresponding to a signal acquired from frequency modulated, biphase modulated address information, and a mark for expressing phase information placed inside said wobble are preformatted; and along with making the biphase bit count "a" ("a" is a natural number) between two of adjacent said marks, the channel bit count is made "n" ("n" is a natural number) between two of said adjacent marks wherein, said optical disk has first clock signal reproduction means to generate a first clock signal utilizing an "n" frequency multiple of the reproduction signal of said clock mark and, wobble signal reproduction means to reproduce from said optical disk a wobble signal corresponding to said groove wobble and, frequency demodulation means to acquire said address information by frequency demodulation of said wobble signal and, said frequency demodulation means has; a second clock signal generator to generate a second clock signal by dividing a data clock signal supplied from said first clock signal reproduction means by 1/M(M= n/(a·s)) in which a clock "s" ("s" is a natural number) is an oversampling value of said biphase bit and a waveform shaping unit to shape the waveform of said wobble signal and a detector to acquire said address information by processing with said second clock signal for said binary signal.

In this invention therefore, a biphase bit oversampling clock signal is generated by frequency division from a data clock signal which is an integer ratio of data clock signal and frequency of the biphase bit oversampling clock signal. Utilizing this clock signal allows acquisition of address information by frequency demodulation of the wobble signal obtained with the wobble signal reproduction means.

A optical disk apparatus of another aspect of this invention for driving an optical disk formed with alternate grooves and lands radially across the disk surface containing recording tracks; and marks preformatted with phase information wherein; marks having said phase information are formed on one end of said land or said groove and have a first concavity or protrusion at parallel falling sides in said radial direction and, a said land or said groove formed on the other side, parallel in the radial direction and constituting a second concavity or protrusion in the track rising direction also matching the falling direction, and whether the laser beam scanning said optical disk is above said land or above said groove can be detected from the polarity of the reproduction signal on the mark.

In a further aspect of this invention, in the lands and grooves, the concavities and protrusions comprising the marks containing the phase information, protrude in opposite directions. Consequently, the polarity of the mark reproduction signal will have a respectively different polarity according to whether the beam is scanning a land or a groove. This means that whether the beam is over a groove or a land can easily be determined by means of the polarity of the mark reproduction signal.

A preformatting device in yet another aspect of this invention is provided for cut-forming the surface of the base disk to form grooves and marks containing phase information on said base disk wherein said preformatting device comprises: a light source for generating a first and a second cutting beam, optical means for joining said first and second cutting beams to mutually overlap so that said first and second cutting beams overlap to irradiate a portion of the surface of the base disk, cutting beam control means for controlling on and off switching of said first and second cutting beams and, control means for controlling operation of said cutting beam control means. The control means is regulated such that said first cutting beam is turned off only for a fixed period immediately before the timing of said mark to be formed, and said second cutting beam is turned off only for a fixed period immediately after the timing of said mark to be formed.

In a yet further aspect of this invention, a first and a second cutting beam overlap and the junction of their light beams irradiates the surface of the base disk and cut-forms a groove in that surface. The first cutting beam is turned off for a fixed period immediately before the timing of said mark to be formed, and at one side of the groove, a protrusion is formed in parallel in the falling section towards the track where the mark is to be formed in the radial direction of the disk. The second cutting beam turns off for a fixed interval immediately after the timing of the mark to be formed. Accordingly, a protrusion is formed on the other side of the groove in parallel in the rising section towards the track where the mark is to be formed in the radial direction of the disk. The pairs of protrusions formed in these grooves are marks having phase information.

In the optical disk preformatted with the marks having the phase information as described above, when a mark is scanned by a beam, a signal having a one cycle sine wave is acquired. As related above, since the mark is formed by controlling the on and off switching of the cutting beam, the mark reproduction signal undergoes a sudden level change at the zero crosspoint. Consequently, the zero crosspoint can accurately be detected with no effect from jitter, even if the amount of protrusion from the pair of protrusions comprising the marks is small.

In a still further aspect of this invention, a frequency demodulator circuit has a waveform shaping section for forming a frequency modulated signal expressing the digital data to acquire a binary signal, clock signal generating unit for generating clock signals having a frequency corresponding to "1" of said address information, and also having a frequency higher than said frequency signal by a common multiple, which corresponds to "0" of said digital data; and a detector for acquiring said digital data based on clock signals corresponding to said binary information.

The optical disk apparatus of this invention further drives an optical disk on which a groove wobble corresponding to a signal acquired from frequency modulated address information, and a post-modulated signal are recorded; wobble signal reproduction means for reproducing from said optical disk a wobble signal corresponding to said groove wobble and, frequency demodulation means for acquiring said address information by frequency demodulation of said wobble signal and said frequency demodulation means has :a waveform shaping unit for acquiring a binary signal from a wave shaped from the wobble signal, a wobble signal frequency corresponding to said address information of "1", clock signal generator means for acquiring a clock signal having a frequency multiple of said wobble signal corresponding to said address information of "0", a detector for acquiring said address information by processing said binary signal with said clock signal.

In this aspect of the invention, the digital data, for instance the frequency modulated signal containing address information is shaped by a waveform shaping unit and converted into a binary signal. Then a clock signal generator, for instance a PLL circuit is used to obtain a clock signal which is a common multiple (for instance the lowest common multiple frequency) higher than the frequency modulated signal corresponding respectively to the digital data "1" and "0".

Based on this clock signal, the binary signal corresponding to "1" has a pattern of "1 and "0" comprised of the first clock portion; and the binary signal corresponding to "0" has a pattern of "1" and "0" comprised of the second clock portion. In the detector, a binary signal pattern using this clock signal is detected and demodulation of the digital data then performed.

In an optical disk apparatus of a further aspect of this invention in which the address information is frequency modulated and the post-modulation signal is recorded on an optical disk as a groove wobble. This groove wobble amplitude is made to change according to the frequency of the signal after modulation. This change in groove wobble amplitude prevents a deflection near the groove wobble zero crosspoint corresponding to the junction point of the waveform expressing "0" and the waveform expressing "1" of the address information.

In this invention, the groove wobble amplitude is made to change according to the frequency of the signal after modulation, and a fixed amount of deflection is applied to the groove wobble zero crosspoint corresponding to the junction point of the waveform expressing "0" and "1" of the address information. This process reduces jitter along the time axis of the wobble signal $S_{WB}$ corresponding to the junction of the 0"and "1" of the address information.

BRIEF DESCRIPTION OF THE DRAWINGS

FIG. 12 is a block diagram snowing the layout of the detector.

FIGS. 14A through 14F' are waveforms illustrating the operation of the detector.

FIGS. 15A through 15F' are waveforms illustrating the operation of the detector.

FIGS. 16A through 16F' are waveforms illustrating the operation of the detector.

FIGS. 17A through 17F' are waveforms illustrating the operation of the detector.

FIGS. 18A through 18G' are waveforms illustrating the operation of the detector.

FIG. 28 is a block diagram showing the structure of the preformatting device.

FIGS. 29A through 29C are waveforms illustrating the on and off switching for the cutting beam and the clock mark signal.

FIG. 30 is a concept view of the on and off switching of the cutting beam.

FIGS. 31A through 31F show the interrelation of the clock marks and their reproduction signals.

FIGS. 33A and 33B are concept views showing the on/off switching of the cutting beam and the wobble (fixed shift).

FIG. 34 is a concept view showing the on/off switching of the cutting beam and the wobble (fixed shift).

FIGS. 35A through 35D are timing charts illustrating the laser beam modulation by the data clock signal.

FIGS. 37A through 37D are timing charts illustrating the laser beam modulation by the data clock signal.

FIGS. 39A through 39D are timing charts illustrating the laser beam modulation by the data clock signal.

FIGS. 42A through 42E are timing charts illustrating the operation of the frequency demodulation circuit.

FIGS. 43A through 43D are drawings showing the clock mark reproduction signal for the magneto-optical disk apparatus relating to the present invention.

FIGS. 44A and 44B are drawings showing the interrelation of the cutting beam and clock mark.

FIG. 45 is a drawing showing the clock mark on the land and groove.

DETAILED DESCRIPTION OF THE PREFERRED EMBODIMENTS

Figure 1:
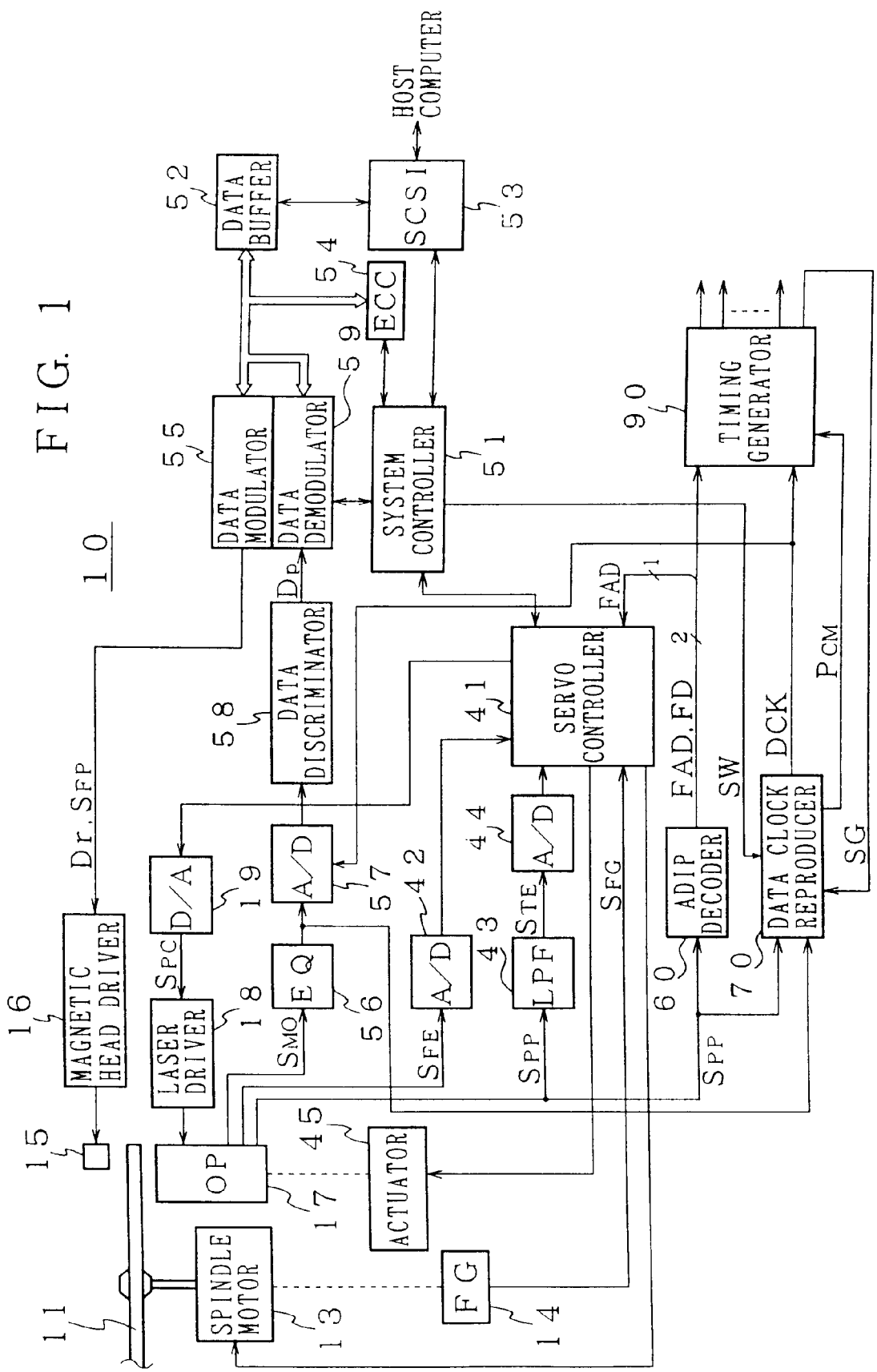
FIG. 1 is a block diagram showing the magneto-optical disk apparatus of the first embodiment of this invention.
Figure 2:
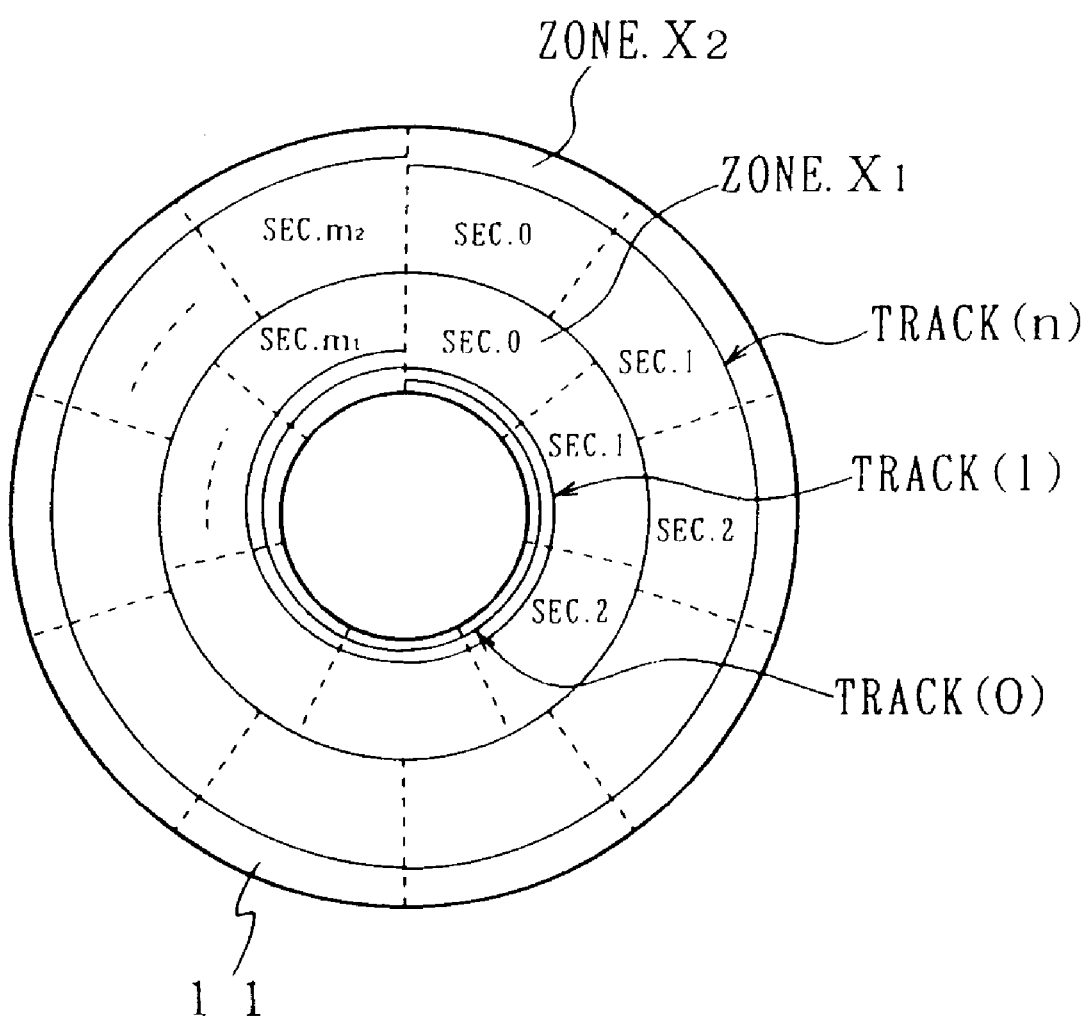
FIG. 2 is a flat view showing the sector layout of the magneto-optical disk.

Hereafter the first embodiment of this invention will be described while referring to the accompanying drawings. The structure of a magneto-optical disk apparatus 10 of the first embodiment of this invention is shown in FIG. 1.

Figure 11:
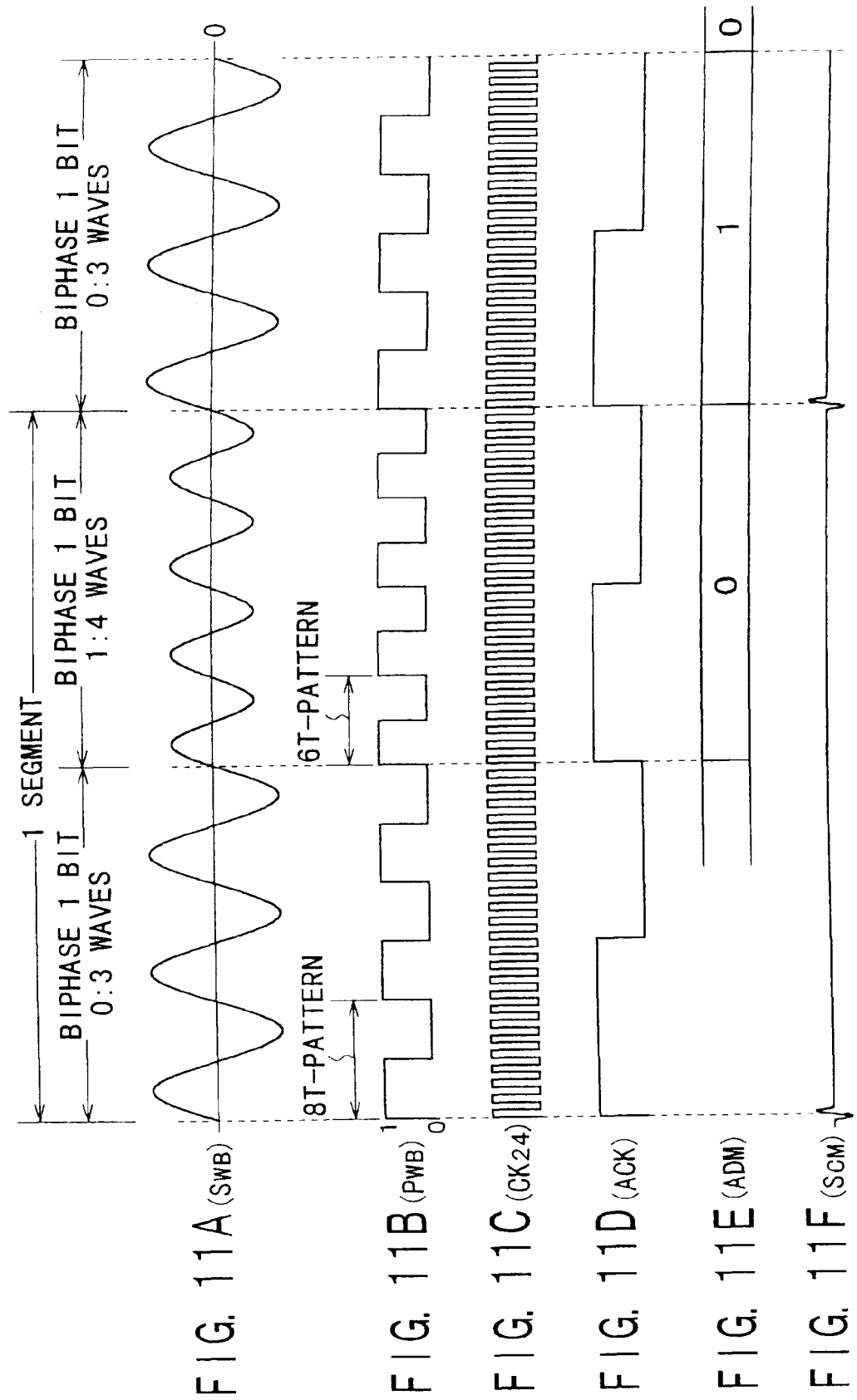
FIGS. 11A through 11F are timing flowcharts illustrating the operation of the ADIP decoder.

A magneto-optical disk 11 accommodated in the magneto-optical disk apparatus 10 will first be described. FIG. 11 shows the layout of a sector of the magneto-optical disk 11. A track "0" to a track "n" are formed on this magneto-optical disk 11 in a spiral form from an inner circumferential side thereof to an outer circumferential side thereof. Further, the magneto-optical disk 11 is divided up into zones, with the "0" to "m1" sectors contained circumferentially in the tracks of zone X1 on the inner circumferential side; while the "0" to "mn (m2>m1)" sectors are contained in the tracks of zone X2 on the outer circumferential side.

Figure 3:
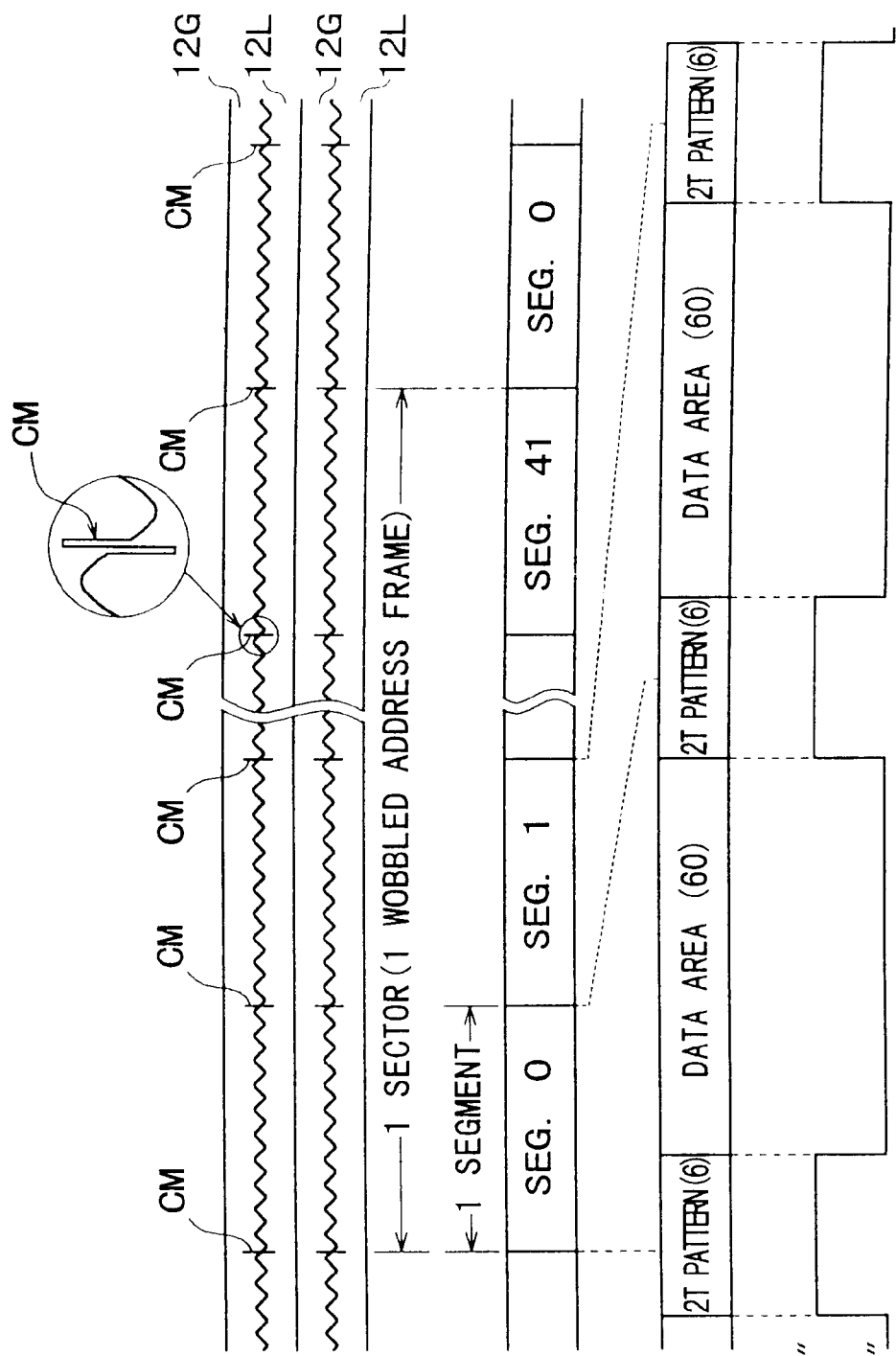
FIGS. 3A through 3D are timing charts illustrating the sector (wobble address frame) format.

The format of a sector (wobble address frame) is shown in A–O of FIG. 3. As shown in FIG. 3A, groove portions 12G and land portions 12L are alternately formed radially on the magneto-optical disk 11, and data is recorded on any one of the groove portions 12G and land portions 12L, or both of these portions 12G and 12L. One side of a groove portion 12G is brought for instance, into a wobbling state in response to biphase-modulated address information ADM.

In this case, the address information ADM is frequency-modulated (namely, FM), and the groove portions 12G are wobbled to correspond to the FM modulated signal. In other words, this FM modulated signal is recorded as a groove wobble. It should be understood that since one side of the groove portion 12G is wobbled, consequently one side of the land portion 12L is brought into a wobbling state in response to the address information ADM.

This address information ADM has already been subjected to biphase modulation. Performing biphase modulation on the address information to acquire and use address information ADM is known as a method to prevent the generation of the DC components (DC free). The "1" bit of the address information prior to biphase modulation corresponds to a biphase "2" bit.

Figure 5:
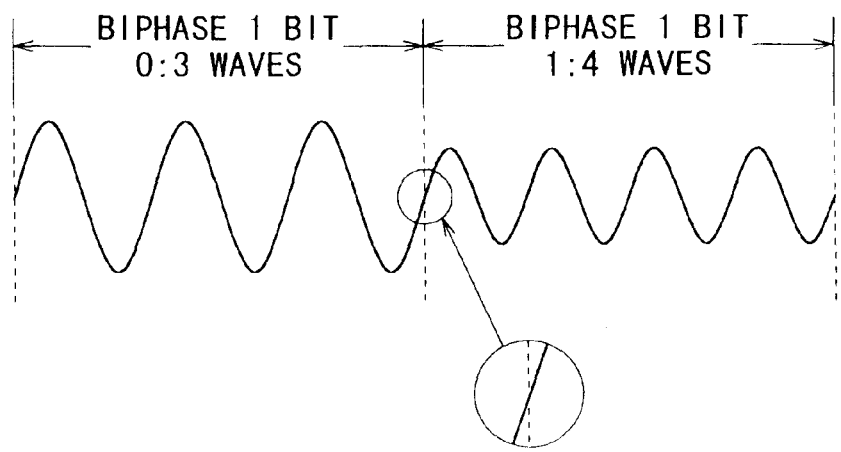
FIG. 5 is a drawing showing a sample layout of the groove wobble.

As shown in FIG. 5, a groove wobble becomes 4 waves per 1 bit of the address information ADM (biphase 1 bit) when the digital data is "1", whereas a groove wobble becomes 3 waves per 1 bit of the address information ADM (biphase 1 bit) when the digital data is "0". Moreover, the amplitude of this groove wobble is varied in response to the frequencies of modulated signals. Also, as shown in an enlarged view in FIG. 5, the slope of the groove wobble at the zero cross point which corresponds to the junction between "1" of the address information ADM and "0" of this address information is not allowed to change.

Figure 4:
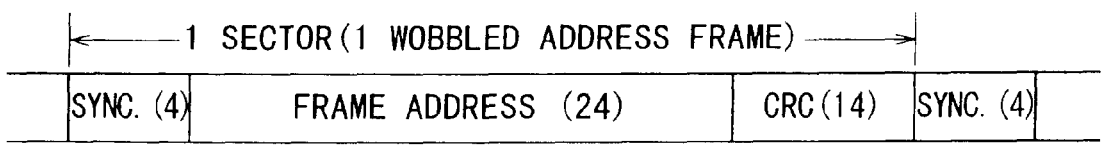
FIG. 4 is a drawing showing one sector (wobble address frame) of the address information prior to biphase modulation.

Here, a groove wobble within a 1-sector (1 wobble address frame) period contains the data prior to biphase modulation, for example, 42 bit data. This 42 bit data is made up of a 4 bit sync (synchronization) signal data, 24 bit frame address data, a 6 bit reserve bit, and a 14 bit CRC (cyclic redundancy check) code, as indicated in FIG. 4.

Further, as shown in FIG. 3B, when a 1 sector is comprised for instance of 24 segments. A clock mark CM as shown in FIG. 3A is preformatted to be multiplexed with the groove wobble at a boundary position of each of the segments. Then, as shown in FIG. 3C, a 60 byte data region is formed in each of these segments and further, a 6 byte fixed pattern region is formed therein to correspond to the boundary position of the respective segments. As will be discussed later, when writing data, NRZI data is written into the data region, whereas a 2T-fixed pattern signal synchronized with the NRZI data is recorded on the fixed pattern region (symbol "T" is a bit interval of data).

Here, 1 sector on the magneto-optical disk 11 is comprised of 42 segments, and a clock mark CM is preformatted at the boundary position of each segment so that the high speed bit count "a" between adjacent clock marks becomes 2 bits. Also on this magneto-optical disk 11, along with a 60 bit data zone being formed within each segment, a 6 bit fixed pattern region is formed which corresponds to the boundary position of each segment so that the channel bit count "n" between the adjacent clock marks becomes 528 bits.

The magneto-optical disk apparatus 10 shown in FIG. 10 will now be described. This disk apparatus 10 contains a spindle motor 13 for rotating the magneto-optical disk 11. The magneto-optical disk 11 is rotary-driven at a constant angular velocity during he recording operation and the reproducing operation. A frequency generator 14 for detecting the rotation speed of the spindle motor 13 is mounted on a rotary shaft of the spindle motor 13.

The disk apparatus 10 further contains a magnetic head 15 for generating an external magnetic field; a magnetic head driver 16 for controlling the generation of the magnetic field by this magnetic head 15; an optical head 17 constituted by a semiconductor laser, an objective lens, a photodetector and the like; and a laser driver 18 for controlling light emission of the semiconductor laser by this optical head 17. Both the magnetic head 15 and the optical head 17 are arranged opposite to each other in such a manner that the magneto-optical disk 11 is sandwiched between the magnetic head 15 and the optical head 17. A laser power control signal $S_{PC}$ is supplied from a servo controller (will discussed later) via a D/A converter 19 to the laser driver 18, so that the power of the laser light emitted from the semiconductor laser of the optical head 17 can reach a record power $P_W$ during recording operation. During reproducing, the power $P_W$ is regulated to become reproduction power $P_R$.

While data is written (during recording), as explained later, both the recording data Dr and a fixed pattern signal $S_{FP}$ are supplied to the magnetic head driver 16, so that magnetic fields corresponding to the recording data Dr and the fixed pattern signal $S_{FP}$ are generated from the magnetic head 15. The recording data Dr is then recorded in the data region of the magneto-optical disk 11, and also a fixed pattern signal $S_{FP}$ is recorded in the fixed pattern region corresponding to the data region into which the recording data Dr is recorded by the magnetic field in conjunction with the laser beam emitted from the optical head 17.

Figure 6:
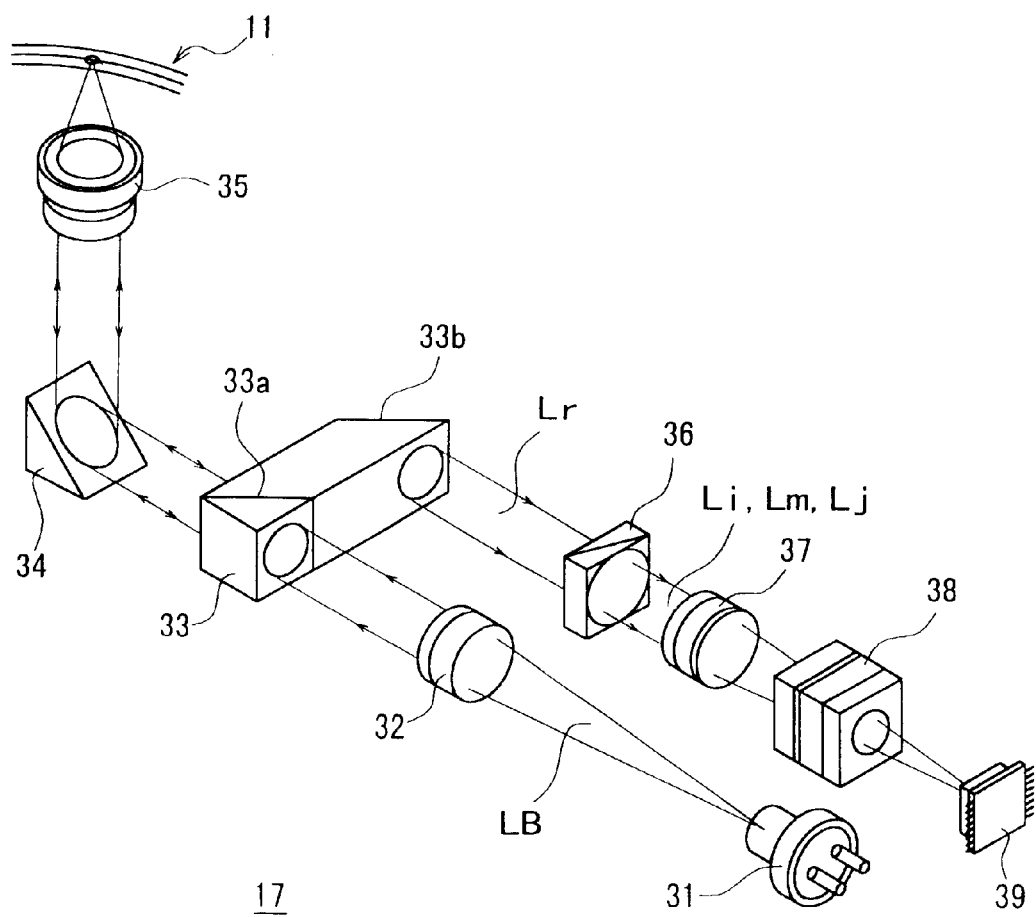
FIG. 6 is a perspective view showing the optical system of the optical head.

FIG. 6 schematically illustrates a structure of the optical system of the optical head 17. The optical head 17 contains a semiconductor laser 31, a collimator lens 32, a beam splitter 33, a raising mirror 34, and an objective lens 35. The semiconductor laser 31 is employed so as to produce a laser beam LB. The collimator lens 32 is employed to collimate divergent light of the laser beam LB emitted from this semiconductor laser 31 to produce parallel light. The beam splitter 33 is employed to split the laser beam LB into two sets of laser light beams, namely transmission light and reflection light. The reflecting mirror 34 is used to change the optical path of the laser beam LB. The objective lens 35 is then employed to irradiate the laser beam LB onto a recording surface (recording film) of the magneto-optical disk 11.

This optical head 17 further contains a Wollaston prism (polarization plane detecting prism) 36, a condenser lens 37, a photodetector 39, and a multi-lens 38. The Wollaston prism 36 is employed to isolate the laser beam which is reflected from a reflection plane 33b of the beam splitter 33 and then is projected outside this beam splitter 33 as three sorts of laser beams, depending upon differences in polarization directions. The condenser lens 37 is employed to condense the three sorts of laser beams (parallel light) output from this Wollaston prism 36. The three sorts of laser beams projected from this condenser lens 37 are then irradiated onto the photodetector 39. The multi-lens 38 is positioned between the condenser lens 37 and the photodetector 39.

Figure 7:
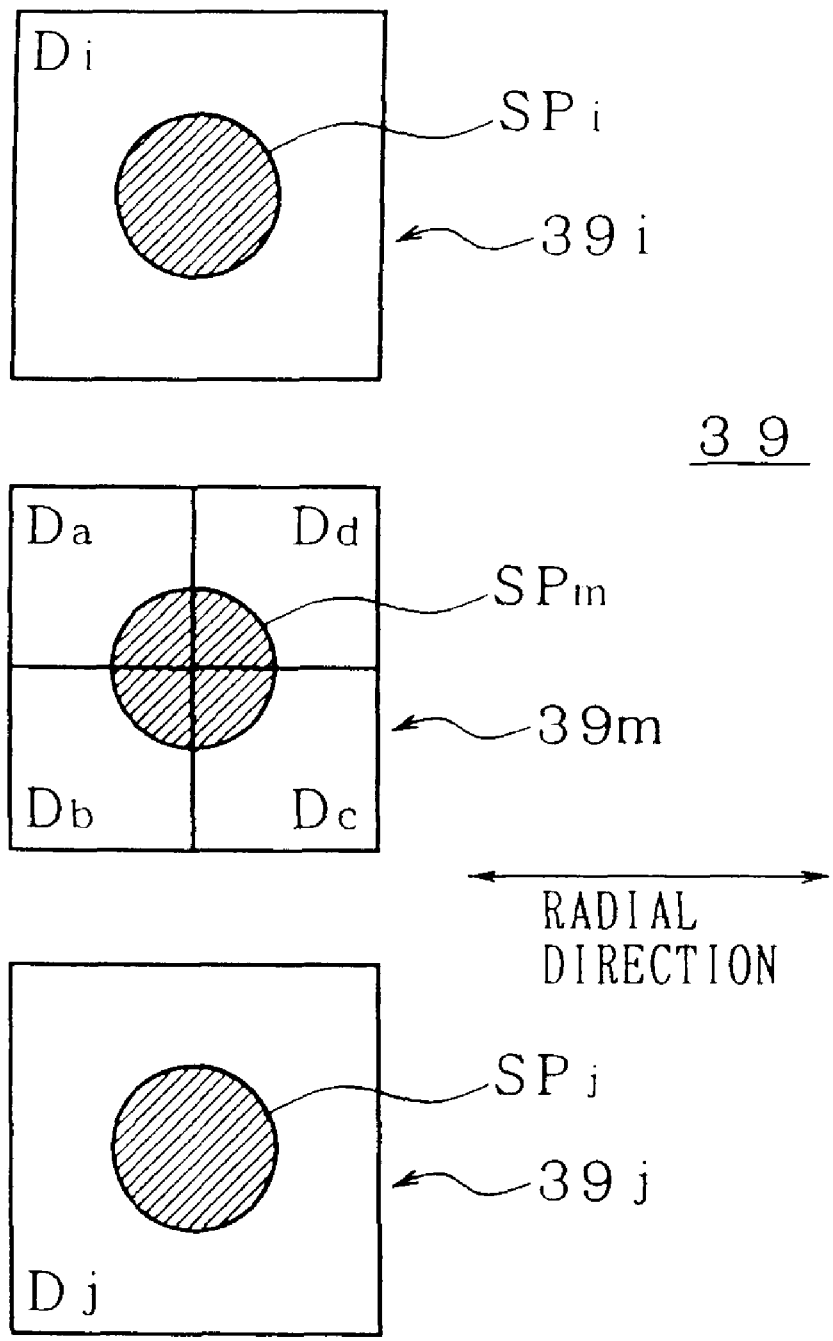
FIG. 7 is a view showing the structure of the photodetector for the optical system of the optical head and the spots formed above the photodetector.

The multi-lens 38 is comprised of a combination of a convex lens and cylindrical lens. The reason for using this cylindrical lens is that, a focus error signal can be obtained by way of the well-known astigmatism method. As indicated in FIG. 7, the photodetector 39 is arranged by a 4-split photodiode $39m$, and two sets of photodiodes $39i$, $39j$.

Figure 8:
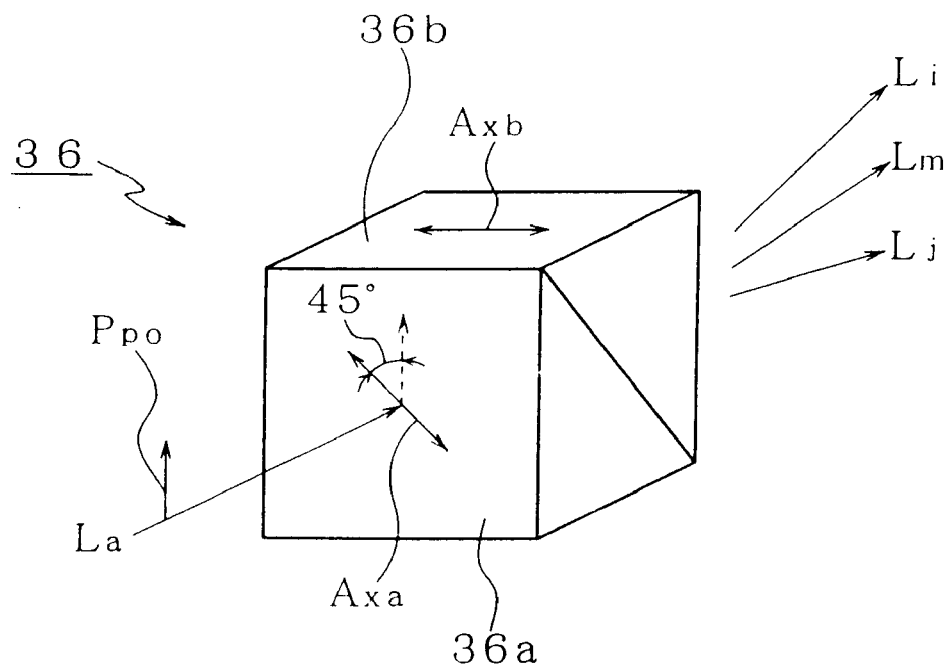
FIG. 8 is a view illustrating the structure of the Wollaston prism constituting the optical system of the optical head.

A sample structure of the Wollaston prism 36 is shown in FIG. 8. This prism 36 is comprised of rectangular prisms $36a$ and $36b$ made of a single-axial crystal, such as quartz. In this case, an optical axis Axb of the prism $36b$ is set to be inclined 45 degrees with respect to an optical axis Axa of the prism $36a$.

Figure 9:
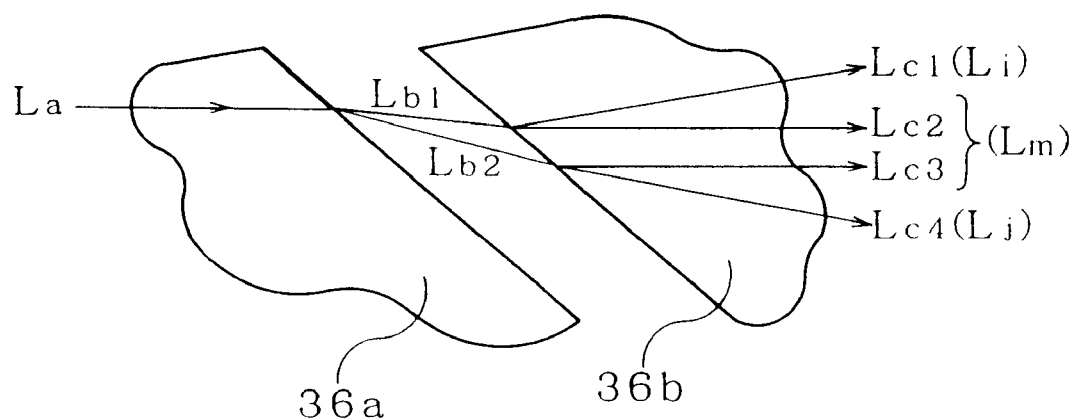
FIG. 9 is a view showing isolation of light rays by the Wollaston prism.

In this kind of optical arrangement, the quartz has two different refractive indexes for the polarization planes of incident light. As a result, when the linear polarization light "La" having a polarization plane Ppo inclined by 45 degrees with respect to the optical axis Axa of the prism $36a$, is input into this prism $36a$, this linear polarization light La is separated into a polarization component Lb1 and another polarization component Lb2, as shown in FIG. 9 in this prism $36a$. The polarization plane perpendicular to the optical axis Axa, and the polarization component Lb2 have this polarization component Lb2 parallel to the optical axis Axa. Furthermore, in another prism $36b$, the polarization component Lb1 is separated into a polarization component Lc1 having such a polarization plane parallel to the optical axis Axb and another polarization component Lc2 having such a polarization plane perpendicular to the optical axis Axb. Moreover, the polarization component Lb2 is separated into a polarization component Lc3 having such a polarization plane parallel to the optical axis Axb and another polarization component Lc4 having such a polarization plane perpendicular to the optical axis Axb.

Here, it should be understood that the polarization components Lc1 and Lc2 have polarization planes perpendicular to the optical axis Axa of the prism $36a$, and the respective light amounts are equal to one-fourth the amount of light from the linear polarization light La. On the other hand, the polarization components Lc3 and Lc4 have polarization planes parallel to the optical axis Axa of the prism $36a$, and the respective light amounts thereof are equal to one-fourth the amount of light from the linear polarization light La. The light projection angle of the polarization component Lc2 from the prism $36b$ is equal to the polarization component Lc3 from this prism $36b$. As a result, three sets of laser beams Li, Lm, Lj are separately acquired from the Wollaston prism 36.

The operation of the optical head 17 shown in FIG. 14 will now be described. The laser beam LB which is projected from the semiconductor laser 31 as divergent light is collimated by the collimator lens 32 to form the parallel laser light which is then input to the beam splitter 33. The light path of the laser beam which has passed through the multilayer film 33a of the beams splitter 33 is changed to a right angle by the reflecting mirror 34, and then the resulting laser beam is then irradiated onto the recording plane of the magneto-optical disk 11 via the objective lens 35.

The laser beam reflected onto the recording plane of the magneto-optical disk 11 is input via the objective lens 35 and the mirror 34 into the beam splitter 33. The laser beam Lr reflected onto the multilayer film 33a of the beam splitter 33 is further reflected on the reflection plane 33b of the beam splitter 33 and is then projected outside this beam splitter 33. This projected laser light is input into the Wollaston prism 36.

The laser beam Lr related to the reflection from the recording surface of the magneto-optical disk 11 is thus input into the Wollaston prism 36. Although not described in the foregoing descriptions, such a polarization plane when there is no rotation (Kerr rotation) of the polarization plane on the recording surface of the magneto-optical disk 11 is set to be inclined by 45 degrees with respect to the optical axis Axa (refer to a relationship between the polarization plane Ppo of linear polarization light La and optical axis Axa). As a result, the three sets of laser beams Li, Lm, Lj can be separately obtained from the laser beam Lr by way of the Wollaston prism 36 in a similar manner to the above-explained case in which the linear polarization light La was input.

In this case, the polarization plane of the laser beam Lr is slightly rotated along either the clockwise direction or the counterclockwise direction in accordance with the magnetizing direction of the recording film of the magneto- optical disk 11, so that a size amount relationship is established for the light amounts of the laser beams Li and Lj in accordance with the magnetizing directions of the recording film of the magneto-optical disk 11. As a consequence, light amounts of the laser beams Li and Lj are detected and then are subtracted from each other, so that a reproduction signal corresponding to the data (signal) recorded by the magneto-optical manner can be acquired. It should be noted that even when the polarization plane of the laser beam Lr is rotated, the light amount of the laser beam Lm is fixed.

As explained previously, the three sets of laser beams Li, Lm, Lj projected from the Wollaston prism 36 are input via the condenser lens 37 and the multi-lens 38 into the photodetector 39. As shown in FIG. 7, the spots SPi, SPm, SPj are formed by the respective laser beams Li, Lm, Lj on the photodiodes 39i, 39m, 39j which constitute the photodetector 39.

In this case, assuming now that detection signals of the four photodiodes Da to Dd which constitute the 4-split photodiode 39m are "Sa" to "Sd" respectively, and also detection signals of the photodiodes Di, Dj which constitute the photodiodes 39i, 39j are "Si", "Sj", the below-mentioned calculation is performed in an amplifier circuit unit (not shown) of the optical head 17, so that a reproduction signal $S_{MO}$, an astigmatism type focus error signal $S_{FE}$, and a push-pull signal $S_{PP}$ are produced from the recording region:

$S_{MO}=Si-Sj$ $S_{FE}=(Sa+Sc)-(Sb+Sd)$ $S_{PP}=(Sa+Sb)-(Sc+Sd)$

Now referring back to FIG. 1, the magneto-optical disk apparatus 10 contains a servo controller 41 equipped with a CPU (central processing unit). The focus error signal $S_{FE}$ produced by the optical head 17 is supplied via an A/D converter 42 to the servo controller 41. The push-pull signal $S_{PP}$ produced by the optical head 17 is such a signal made by synthesizing a tracking error signal $S_{TE}$ by way of the push-pull method, a wobble signal (FM signal) $S_{WB}$ corresponding to the groove wobble of the magneto-optical disk 11, and a clock mark reproduction signal $S_{CM}$ corresponding to a clock mark CM of the magneto-optical disk 11. Here, the signals $S_{TE}$, $S_{WB}$ and $S_{CM}$ are in different frequency bands. Accordingly, the signals $S_{TE}$, $S_{WB}$ and $S_{CM}$ can respectively be extracted by the push-pull signal $S_{PP}$ using the low-pass filter and band-pass filter.

The tracking error signal $S_{TE}$ which is extracted from the push-pull signal $S_{PP}$ by a low-pass filter 43 is supplied via an A/D converter 44 to the servo controller 41. Furthermore, a frequency signal $S_{FG}$ output from the above-described frequency generator 14 is supplied to this servo controller 41.

The operation of the servo controller 41 is controlled by a system controller 51 (explained later). An actuator 45 containing a tracking coil, a focus coil, and further a linear motor for moving the optical head 17 along the radial direction is controlled by this servo controller 41 to thereby execute servo control of the tracking operation and the focusing operation. The servo controller 41 further controls movement of the optical head 17 in the radial direction. Also, the spindle motor 13 is controlled by the servo controller 41 in such a manner that, as previously explained, the magneto-optical disk 11 is rotated at a constant angular velocity when the recording operation and the reproducing operation are carried out.

The magneto-optical disk apparatus 10 includes a system controller 51 equipped with a CPU, a data buffer 52, and a SCSI (Small Computer System Interface) interface 53 used to transfer/receive data and commands with a host computer. The system controller 51 controls the overall system of this disk apparatus 10.

The magneto-optical disk apparatus 10 also includes an ECC (Error Correction Code) circuit 54, and a data modulator 55. This ECC circuit 54 performs an error correction code sum processing of the write data supplied from the host computer via the SCSI interface 53, and also an error correction process operation with respect to output data of a data demodulator (discussed later). The data modulator 55 converts the write data to which the error correction code has been added by this ECC circuit 54 into NRZI (Non Return to Zero Inverted) data to thereby obtain the recording data Dr and also produce the above-explained fixed pattern signal $S_{FP}$.

The magneto-optical disk apparatus 10 further includes an equalizer circuit 56, an A/D converter 57, a data discriminator 58, and a data demodulator 59. The equalizer circuit 56 compensates for a frequency characteristic of the reproduction signal $S_{MO}$ produced from the optical head 17. The A/D converter 57 A/D converts the output analog signal from this equalizer circuit 56 into a digital signal. The data discriminator 58 digitally executes a data discriminating process with respect to the output digital data from this A/D converter 57 to thereby obtain reproduction data Dp. The data demodulator 59 executes an NRZI inverse-conversion process of the reproduction data Dp output from this data discriminator 58 to thereby obtain the read data. The data discriminator 58 is comprised of a binary circuit and a Viterbi decoder.

The magneto-optical disk apparatus 10 further contains an ADIP (Address In Pre-groove) decoder 60, a data clock reproducer 70, and a timing generator 90. The ADIP decoder 60 decodes the wobble signal $S_{WB}$ contained in the push-pull signal $S_{PP}$ produced from the optical head 17 to thereby obtain a frame synchronization signal FD and frame address data FAD. The data clock reproducer 70 is employed to acquire a data clock signal DCK from the clock mark reproduction signal $S_{CM}$ contained in the push-pull signal $S_{PP}$, and also the reproduction signal $S_{MO}$ corresponding to the fixed pattern region of the magneto-optical disk 11. The timing generator 90 generates timing signals such as a read gate signal and a write gate signal, which are required for the respective circuits of the entire system by using the frame synchronization signal FD, the frame address data FAD, and the data clock signal DCK. The frame address data FAD is also supplied to the servo controller 41, and the data clock signal DCK is supplied as the sampling clock to the A/D converter 57.

Figure 10:
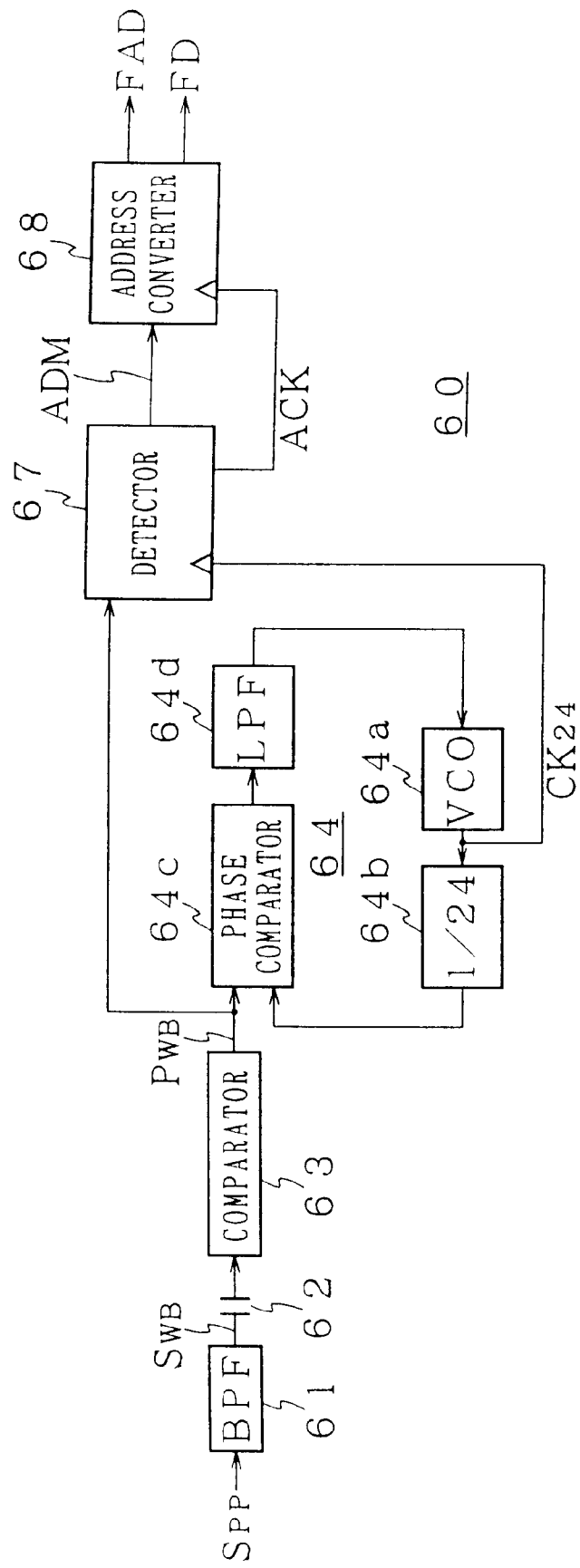
FIG. 10 is a block diagram showing the layout of the ADIP decoder.

The structure of the ADIP decoder 60 is shown in FIG. 10. This ADIP decoder 60 comprises a bandpass filter 61 for extracting a wobble signal $S_{WB}$ from the push-pull signal $S_{PP}$, a capacitor 61 for blocking the direct current, and a comparator 63 for converting a wobble signal $S_{WB}$ whose threshold equals zero into a pulse signal (binary signal) $P_{WB}$.

This ADIP decoder 60 further has a PLL circuit 64 comprising a voltage control oscillator 64a, a frequency divider 64b to divide by ¹⁄₂₄ the clock signal CD24 output from the voltage control oscillator 64a, a phase comparator 64c for performing phase comparison of the pulse signal $P_{WB}$ output from the comparator 63 and the signal output from the frequency divider 64, and a low-pass filter 64d for acquiring a control signal extracted from the low frequency components of the phase differential signal output from the phase comparator 64c, for input to the voltage control oscillator 64a.

This ADIP decoder 60 further performs frequency demodulation of the clock signal CK24 output from the voltage controlled oscillator 64a with respect to the binary signal $P_{WB}$ output from the comparator 63, in order to acquire the address information ADM. This ADIP decoder 60 also has an address converter 68 to perform synchronous detection, biphase demodulation, and error detection of the address information ADM output from the detector 67 by utilizing the clock signal ACK synchronized with the address information ADM acquired from the detector 67 and acquire a frame synchronizing signal FD and frame address data FAD.

Next, the operation of the ADIP decoder 60 as shown in FIG. 10 is described. A wobble signal $S_{WB}$ is extracted from the bandpass filter 61 by means of the push-pull signal $S_{PP}$. Then, this wobble signal $S_{WB}$ is converted into a pulse signal $P_{WB}$ supplied to a comparator 63 by way of the capacitor 62. As shown above, frequency modulation is performed on the address information ADM after having been biphase modulated, and this post-modulated signal then recorded as a groove wobble. Consequently, this wobble signal $S_{WB}$ has 4 waves during "1" for a 1 bit of the address information ADM (biphase 1 bit), as shown in FIG. 11A, just the same as with the signal after frequency modulation; and this wobble signal $S_{WB}$ has 3 waves during "0". Consequently, as shown in FIG. 11B, the pulse (binary) signal $P_{WB}$ is acquired from the comparator 63. The amplitude of this wobble signal $S_{WB}$ is proportional to the amplitude of the groove wobble of the magneto-optical disk 11.

When the frequency of the wobble signal $S_{WB}$ corresponding to the bit "1" is equal to "fa" and the frequency of the wobble signal $S_{WB}$ corresponding to the bit "0" is equal to "fb", an oscillating frequency of a voltage-controlled oscillator 64a is set in such a manner that this oscillating frequency is varied near frequencies (=6 fa=8fb) higher than these frequencies fa, fb by a common frequency multiple. As a result, as indicated in FIG. 11C, from the voltage-controlled oscillator 64a, a clock signal CK24 is obtained which has a frequency (fc=6Fa–8Fb), namely, the frequency higher than the biphase bit frequency by 24 times, and is synchronized with the pulse signal $P_{WB}$.

Assuming now that this clock signal CK24 is set to the reference, a 1 time period of a pulse signal $P_{WB}$ corresponding to the biphase 1 bit="1" has a 6T-pattern comprised of "1" for 3 clocks and "0" for 3 clocks, whereas a pulse signal $P_{WB}$ corresponding to the biphase 1 bit="0" has an 8T-pattern constructed of "1" for 4 clocks and "0" for 4 clocks.

When the 8T-pattern is continuously detected from the pulse signal $P_{WB}$, the detector 67 outputs a "0" in synchronization with the clock signal ACK (shown in FIG. 11D) during the subsequent biphase 1 bit period. On the other hand, when the 6T-pattern is continuously detected from the pulse signal $P_{WB}$, the decoding process circuit 67 outputs "1" in synchronization with the clock signal ACK (shown in FIG. 11D) during the subsequent biphase 1 bit period.

In other words, the detector 67 executes the demodulating process operation with respect to the pulse signal $P_{WB}$, so that the address information ADM (shown in FIG. 11E) corresponding to the groove wobble is output in synchronization with the clock signal ACK along with this clock signal ACK from this detector 67. The clock mark CM for the reproduction signal $S_{CM}$ is shown in FIG. 11F.

This address information ADM is supplied to an address converter 68, and then this parallel data is supplied to a decoder 69. In the address converter 68 performs synchronization detection, biphase demodulation, and the error detection with respect to the address information ADM, so that both a frame synchronization signal FD and frame address data FAD are obtained. As a consequence, the frame address data FAD obtained from the address information ADM is output from the address converter 68 in combination with the frame synchronization signal FD.

The structure of the detector 67 is shown in FIG. 12. This detector 67 has a biphase period detecting circuit 102 to detect by pulse signal $P_{WB}$ pattern discrimination, the change point (threshold point) between the biphase bit "1" and the biphase bit "0" and acquire a clock signal $CK_{BP}$ for biphase bit synchronization. This detector 67 also has a 5-bit counter 103 to supply a reset signal to this clock signal $CK_{BP}$ and to supply this as a clock signal for counting.

The detector 67 further has a window pulse generating circuit 104 to generate a window pulse $P_{W0}$ for the biphase bit "0" and another window pulse $P_{W1}$ for the biphase bit "1" based on the output from the counter 103. The window pulse $P_{W0}$ for the biphase bit "0" is a pulse output from the counter 103 in response to a rising edge and a falling edge of a pulse signal $P_{WB}$ having a normal interval (8T-pattern). Thus, 6 window pulses are obtained within the biphase period. Similarly, another window pulse $P_{W1}$ for the biphase bit "1" is such a pulse output from the counter 103 in response to a rising edge and a falling edge of a pulse signal $P_{WB}$ having a normal interval (8T-pattern). Thus, 8 window pulses are generated within one biphase period.

The detector 67 further has an edge detecting circuit 110 to detect the rising edge and a failing edge of a pulse signal $P_{WB}$ using the clock signal CK24 and output as the edge detection pulse Pe.

Figure 13:
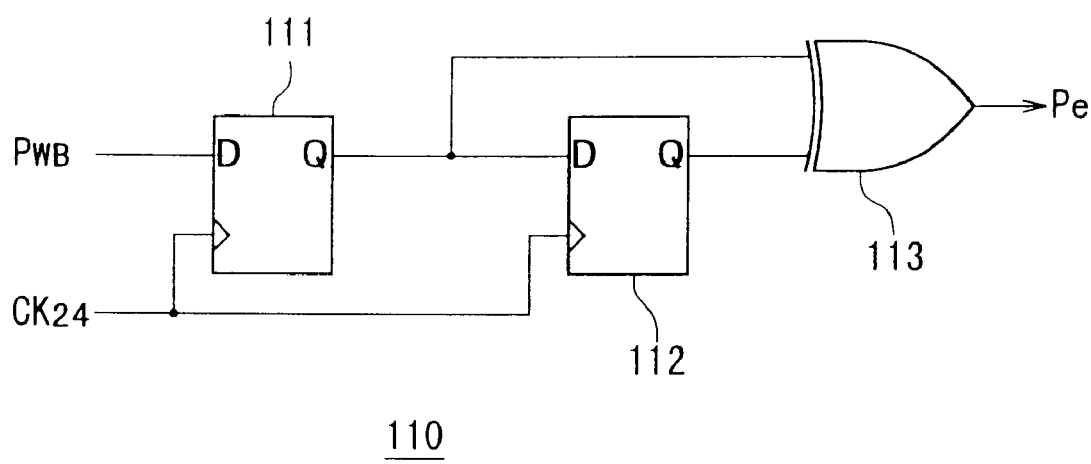
FIG. 13 is a block diagram showing the layout of the edge detector circuit.

The structure of this edge detecting circuit 110 is shown in FIG. 13. This edge detecting circuit 110 contains two-stage type D flipflop circuits 111 and 112 comprised of an exclusive-OR circuit 113 and triggered by the clock signal CK24. The pulse signal $P_{WB}$ is applied to the data D terminal of the first D flipflop circuit 111, so that a non-inverted output is obtained at the Q terminal which is supplied to the data terminal D of the D flipflop circuit 112. The signals acquired from the non-inverted terminals Q of the D flipflop circuits 111 and 112 are supplied to the input of exclusive-or circuit 113. The output from this exclusive-OR circuit 113 is then output by the edge detection pulse Pe.

Returning to FIG. 12, the detector 67 further has a window pulse generating circuit 104 to generate a window pulse $P_{W0}$ and a window pulse $P_{W1}$ which are gated by the edge detection pulse Pe. The AND gates 121, 122 which function as coincidence detection circuits and the respective edge detection pulses Pe are counted by the edge pulse counters 123, 124 and the count values x and y then compared. In the next biphase bit period, the comparator circuit 125 outputs the address information ADM based on these comparison results.

Here, the clock signals $CK_{BP}$ are supplied as the respective biphase bit period reset signals to the edge pulse counters 123 and 124. This clock signal $CK_{BP}$ is also supplied to as a timing signal to the comparator circuit 125. In this comparator circuit 125, a bit "0" is output as address information ADM when x is greater than y; and a bit "1" is output as address information ADM when y is greater than x.

This detector 67 also has a frequency divider 126 to output a clock signal ACK (see FIG. 11D) synchronized with the address information ADM, after dividing the clock signal CK by 24 (¹⁄₂₄) while referring to the clock signal $CK_{BP}$.

The operation of the detector 67 is next described while referring to FIG. 12. A pulse signal $P_{WB}$ and a clock signal CK24 are supplied to a biphase period detector 102 and a biphase period clock signal $CK_{BP}$ obtained. In the 5 bit counter 103, this clock signal $CK_{BP}$ is supplied as a reset signal and the clock signal CK24 supplied as a clock signal for counting. Thus, each biphase bit period is first reset in the 5 bit counter 103 and then counting performed by the clock signal CK24. This count is performed from "0" to "23" in base 10.

The count output from the 5 bit counter 103 is supplied to the window pulse generator 104 and based on the output from the 5 bit counter 103, a window pulse $P_{W0}$ for counting the biphase bit "0" and a window pulse $P_{W1}$ for counting the biphase bit "1" are generated and each is supplied as gating signals to the AND gates 121 and 122.

On the other hand, a pulse signal $P_{WB}$ and a clock signal CK24 are supplied to an edge detector circuit 110. The rising edge and falling edge of the pulse signal $P_{WB}$ are detected and an edge detection pulse Pe obtained. This edge detection pulse Pe is supplied to the AND gates 121, 122. This edge detection pulse Pe is also supplied as gating pulses from the AND gates 121, 122 to the respective edge pulse counters 123, 124 and each biphase 1 bit period then counted.

The count values x and y from the edge pulse counters 123, 124 counted prior to the biphase 1 bit period are then compared in the comparator circuit 125. Then, in the next biphase 1 bit period, the address information ADM is output based on these comparison results.

For instance, when the wobble signal $S_{WB}$ for the biphase 1 bit period shown in FIG. 14A corresponds to the biphase bit "0", the pulse (binary) signal $P_{WB}$ is consecutively counted 3 times as shown in FIG. 14B in an 8T pattern and an edge detector pulse Pe is acquired as shown in FIG. 14D and FIG. 14D1. The clock signal CK24 is shown in FIG. 14C.

Then, in order to form the window pulse $P_{W0}$ as shown in FIG. 14E for supply to the AND gate 121, the gate output PO0 for supply to the edge pulse counter 123 is set so that x=6 as shown in FIG. 14F. However, in order to form the window pulse $P_{W1}$ as shown in FIG. 14E' for supply to the AND gate 122, the gate output PO1 for supply to the edge pulse counter 124 is set so that y=2 as shown in FIG. 14F'. Accordingly, in the next biphase 1 bit period a bit "0" is output as the address information ADM from the comparator circuit 125.

When a wobble signal $S_{WB}$ for a biphase 1 bit period corresponds to a biphase bit "1" as shown in FIG. 15A, the 6T pattern as shown in FIG. 15B of the pulse signal (binary) $P_{WB}$ repeats consecutively 4 times, and an edge detector pulse Pe is acquired as shown in FIG. 15D'. The clock signal CK24 is shown in FIG. 15C.

Then, in order to form the window pulse $P_{W0}$ as shown in FIG. 15E for supply to the AND gate 121, the gate output PO0 for supply to the edge pulse counter 123 is set so that x=2 as shown in FIG. 15F. However, in order to form the window pulse $P_{W1}$ as shown in FIG. 15E' for supply to the AND gate 122, the gate output PO1 for supply to the edge pulse counter 124 is set so that y=8 as shown in FIG. 15F'. Accordingly, in the next biphase 1 bit period a bit "1" is output as the address information ADM from the comparator circuit 125.

Next, the deformation of the wobble signal $S_{WB}$ when defects such as in the magneto-optical disk 11 occur are explained next For instance, when defects such as shown in FIG. 16A occur in a case where the wobble signal $S_{WB}$ of the biphase 1 bit period matches the biphase bit "0", a pulse (binary) signal $P_{WB}$ such as in FIG. 16B is obtained, and an edge detector pulse Pe as shown in FIG. 16D, FIG. 16D' is acquired. The clock signal CK24 is shown in FIG. 16C.

Then, in order to form the window pulse $P_{W0}$ as shown in FIG. 16E for supply to the AND gate 121, the gate output PO0 for supply to the edge pulse counter 123 is set so that x=6 as shown in FIG. 16F. However, in order to form the window pulse $P_{W1}$ as shown in FIG. 16E' for supply to the AND gate 122, the gate output PO1 for supply to the edge pulse counter 124 is set so that y=3 as shown in FIG. 16F'. Accordingly, in the next biphase 1 bit period a bit "0" is output as the address information ADM from the comparator circuit 125.

When the wobble signal $S_{WB}$ of the biphase 1 bit period corresponds to biphase bit "1", and deformation occurs as shown in FIG. 17A due to defects, a pulse (binary) signal $P_{WB}$ such as in FIG. 17B is obtained, and an edge detection pulse Pe is acquired as shown in FIG. 17D and 17D'. The clock signal CK24 is shown in FIG. 17C.

Since the window pulse $P_{W0}$ which is supplied to the AND gate 121 is formed as shown in FIG. 17E, the gate output PO0 which is supplied to the edge pulse counter 123 is set so that x=1 as shown in FIG. 17F. However, since the window pulse $P_{W1}$ which is supplied to the AND gate 122 is formed as shown in FIG. 17E', the gate output PO1 which is supplied to the edge pulse counter 124 is set so that y=6 as shown in FIG. 17F'. Accordingly, in the next biphase 1 bit period a bit "1" is output as the address information ADM from the comparator circuit 125.

Thus, in the detector 67 shown in FIG. 12, even if deformation occurs in the wobble signal $S_{WB}$ as shown in FIG. 16A and FIG. 17A, satisfactory address information ADM is acquired even if defects are present in the wobble $S_{WB}$ signal. The quality of the address information ADM is the same as that when no defects were present in the wobble signal.

However, when deformation occurs due to defects such as shown in FIGS. 16A and 17A, the difference between the x and y becomes large as explained above so that even if a bit "0" or a bit "1" can be identified only the size of the x and y, a correct address information ADM can be acquired. However when the difference between x and y is slight it is sometimes difficult to determine whether to identify the information as a bit "0" or a bit "1".

For instance when deformation occurs as shown in FIG. 18A in the biphase 1 bit period of the wobble signal $S_{WB}$, the pulse (binary) signal $P_{WB}$ appears as shown in FIG. 18B and an edge detection pulse Pe as shown in FIG. 18D (FIG. 18E=FIG. 18E') is acquired. The clock signal CK24 is shown in FIG. 18C.

Then, in order to form the window pulse $P_{W0}$ as shown in FIG. 18F for supply to the AND gate 121, the gate output POO for supply to the edge pulse counter 123 is set so that x=4 as shown in FIG. 18G. In the event of a bit "0", x=6 can be assumed.

However, in order to form the window pulse $P_{W1}$ as shown in FIG. 18F' for supply to the AND gate 122, the gate output PO1 for supply to the edge pulse counter 124 is set so that y=6 as shown in FIG. 17G'. In the event of bit "1", x=8 can be assumed.

Accordingly, in a simple comparison, a bit "1" can be identified since x is less than y. However, this cannot be immediately determined to actually be bit "1" because when the respective count outputs "x" and "y" are compared with the original count outputs to be detected, both count outputs "x" and "y" have the same errors in view of such a point that there is a count which has a shortage of two.

A more accurate determination is possible by adding a further condition to the window, and isolating the rising edge and the falling edge and then detecting these edges.

Figure 19:
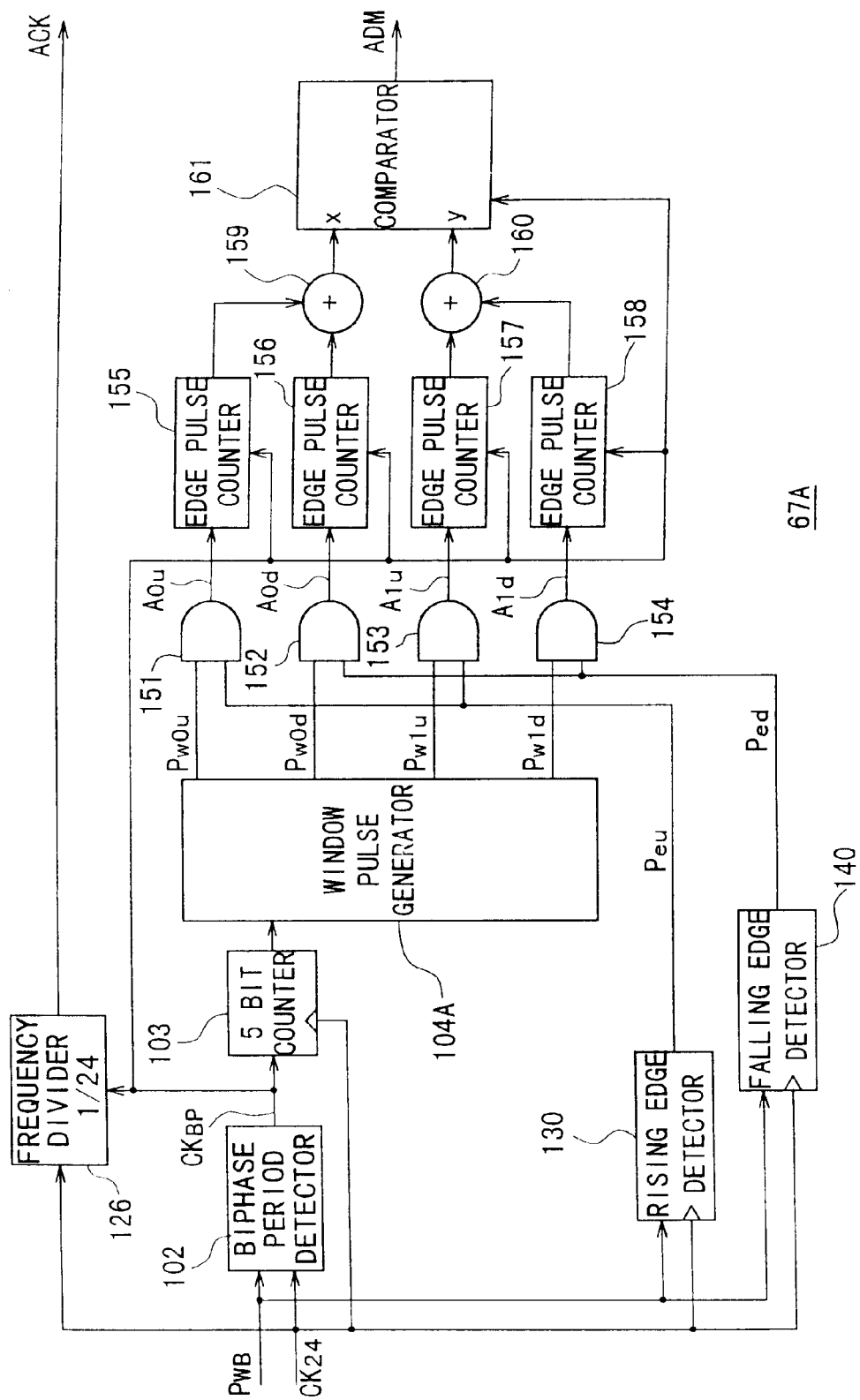
FIG. 19 is a block diagram showing the structure of another embodiment of the detector.

Another structure of the detector 67A is shown in FIG. 19. Here the rising edge and the falling edges are isolated and detected. FIG. 19 is shown with the identical symbols in sections corresponding to FIG. 12.

This detector 67A utilizes the clock signal CK24 and detects the boundary (dividing line) of the biphase bit "1" and "0" by identification with the pulse signal $P_{WB}$ by means of the biphase period detecting circuit 102 and acquire the clock signal $CK_{BP}$ for biphase bit synchronization. This detector 67 also has a 5-bit counter 103 to supply a reset signal to this clock signal $CK_{BP}$ and to supply this as a clock signal for counting.

The detector 67A has window pulse generator 104 and based on the output from the 5 bit counter 103, a window pulse $P_{W0}$u and $P_{W0}$d for counting the biphase bit "0" and a window pulse $P_{W1}$u and $P_{W1}$d for counting the biphase bit "1".

Here, the window pulse $P_{W0}$u is a pulse output in response to the rising edge of pulse signal $P_{WB}$ of a genuine 8T pattern, and 3 pulses are generated in the biphase 1 bit interval. The window pulse $P_{W0}$d is a pulse output in response to the falling edge of pulse signal $P_{WB}$ of a genuine 8T pattern, and 3 pulses are generated in the biphase 1 bit interval.

Further, the window pulse $P_{W1}$u is a pulse output in response to the rising edge of pulse signal $P_{WB}$ of a genuine 6T pattern, and 4 pulses are generated in the biphase 1 bit interval. The window pulse $P_{W1}$d is a pulse output in response to the falling edge of pulse signal $P_{WB}$ of a genuine 6T pattern, and 4 pulses are generated in the biphase 1 bit interval.

Further, the detector 67A has a rising edge detector 130 for detecting the rising edge of the pulse signal $P_{WB}$ and output an edge detector pulse Peu by utilizing a clock signal CK24. The detector 67A also has an edge detector circuit 140 to detect the rising edge of a pulse signal $P_{WB}$ utilizing a clock signal CK24 in the same way, and output an edge detector pulse Ped.

Figure 20:
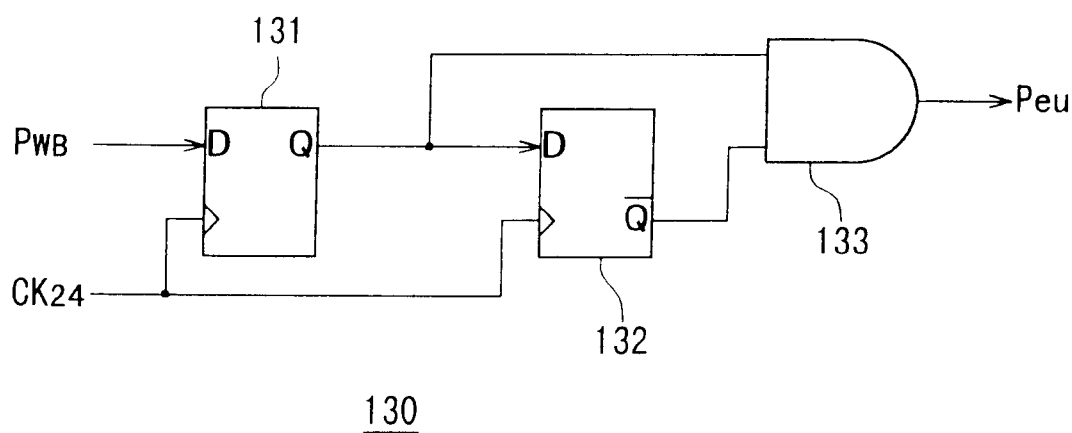
FIG. 20 is a block diagram showing the rising edge of the detector.

The structure of the rising edge detector 130 is shown in FIG. 20. This edge detector 130 is comprised of a 2 stage flipflop circuits 131, 132 triggered by the clock signal CK24, and an AND circuit 133. The pulse signal $P_{WB}$ is supplied to the data terminal D of the D flipflop circuit 131. The signal obtained from the non-inverting output terminal Q of the D flipflop circuit 131 is supplied to the data terminal D of the D flipflop circuit 132. Then, the signals obtained from the non-inverting output terminal Q of the D flipflop circuit 131 and from the inverting Q bar output terminal of the D flipflop circuit 132 are supplied to the input of the AND circuit 133. An edge detector pulse Peu is output from this AND circuit 133.

Figure 21:
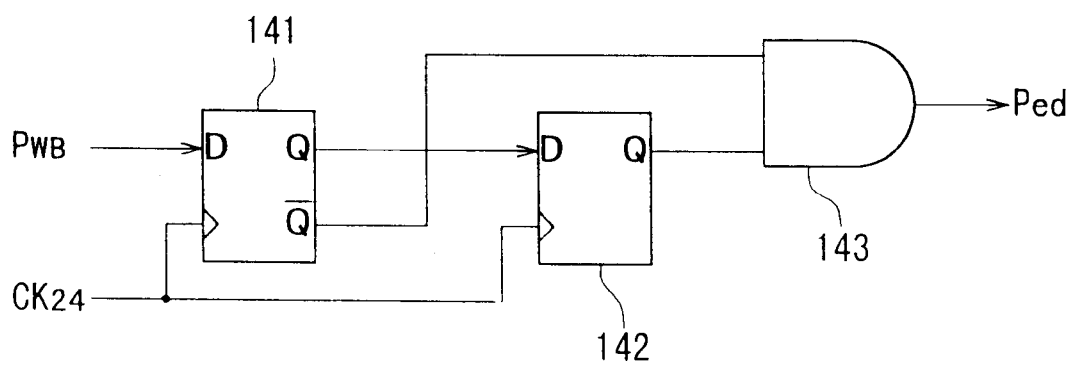
FIG. 21 is a block diagram showing the falling edge of the detector.

Also, the structure of the falling edge detector 140 is shown in FIG. 21. This edge detector 140 is comprised of a 2 stage flipflop circuits 141, 142 triggered by the clock signal CK24, and also comprised of an AND circuit 143. The pulse signal $P_{WB}$ is supplied to the data terminal D of the D flipflop circuit 141. The signal obtained from the non-inverting output terminal Q of the D flipflop circuit 141 is supplied to the data terminal D of the D flipflop circuit 142. Then, the signals obtained from the non-inverting output terminal Q of the D flipflop circuit 141 and from the inverting Q bar output terminal of the D flipflop circuit 142 are supplied to the input of the AND circuit 143. An edge detector pulse Ped is output from this AND circuit 133.

Returning now to FIG. 19, the detector 67A further has a window pulse generating circuit 104 to generate a window pulse $P_{W0}$u and a window pulse $P_{W0}$d which are utilized as gated edge detection pulses Peu, Ped. The AND gates 151, 152 function as coincidence detection circuits and the respective edge detection pulses Peu and Ped for the window pulses $P_{W1}$u and $P_{W1}$d generated by the window pulse generating circuit 104 and supplied to the AND gates 153, 154 in the detector 67A which function as coincidence detection circuits.

The detector 67A further comprises an edge pulse counter 155, 156 for counting the edge detection pulses Peu, Ped respectively gated from the AND gates 151 and 152, an edge pulse counters 157, 158 for counting the edge detection pulse Peu, Ped gated from the AND gates 153, 154, an adder 159 for adding the counts from the edge pulse counters 155 and 156, and an adder 160 for adding the counts from the edge pulse counters 157 and 158. The detector 67A also compares the x (output from the adder 159) total count of the edge pulse counters 155 and 156 counted in the previous biphase 1 bit interval, with the y (output value from the adder 160) total count of the edge pulse counters 157 and 158 counted in the previous biphase 1 bit interval. In the next biphase 1 bit interval, the comparator 161 outputs the address information ADM based on the results of the comparison.

Here, the clock signal $CK_{BP}$ of each biphase bit period is supplied as a reset signal in the edge pulse counters 155–158. Also, the clock signal $CK_{BP}$ is supplied as a timing signal to the comparator circuit 161. In this comparator circuit 161, a bit "0" is output as address information ADM when x is greater than y; and a bit "1" is output as address information ADM when y is greater than x.

The detector 67A also has a frequency divider 126 to output a clock signal ACK (see FIG. 11D) synchronized with the address information ADM, after dividing the clock signal CK by 24 (1/24) while referring to the clock signal $CK_{BP}$.

The operation of the detector 67 is next described while referring to FIG. 19. A pulse signal $P_{WB}$ and a clock signal CK24 are supplied to a biphase period detector 102 and a biphase period clock signal $CK_{BP}$ obtained. In the 5 bit counter 103, this clock signal $CK_{BP}$ is supplied as a reset signal and the clock signal CK24 supplied as a clock signal for counting. Thus, each biphase bit period is first reset in the 5 bit counter 103 and then counting performed by the clock signal CK24. This count is performed from "0" to "23" in base 10.

The count output from the 5 bit counter 103 is supplied to the window pulse generator 104A and based on the output from the 5 bit counter 103, a window pulse $P_{W0}u$, $P_{W0}d$ for counting the biphase bit "0" and a window pulse $P_{W1}u$, $P_{W1}d$ for counting the biphase bit "1" are generated and each is supplied as gating signals to the AND gates 151–154.

On the other hand, a pulse signal $P_{WB}$ and a clock signal CK24 are supplied to an edge detector circuit 130. The rising edge of the pulse signal $P_{WB}$ is detected and an edge detection pulse Peu obtained. This edge detection pulse Peu is supplied respectively to the AND gates 151, 153. In the same way, a pulse signal $P_{WB}$ and a clock signal CK24 are supplied to an edge detector circuit 140. The falling edge of the pulse signal $P_{WB}$ is detected and an edge detection pulse Ped obtained. This edge detection pulse Ped is supplied respectively to the AND gates 152, 154.

The edge detection pulses Peu and Ped gated to the AND gates 151 and 152, are respectively supplied to the edge pulse counters 155 and 156 and counted at each biphase 1 bit period. Further, the edge detection pulses Peu and Ped gated to the AND gates 153 and 154, are respectively supplied to the edge pulse counters 157 and 158 and counted at each biphase 1 bit period.

The comparator circuit 161 compares the total x from the count by the edge pulse counters 155, 156 counted in the previous biphase 1 bit period, with the total y count from the edge pulse counters 157, 158 counted in the previous biphase 1 bit period. The address information ADM is output in the next biphase 1 bit period based on these comparison results.

Figure 22:
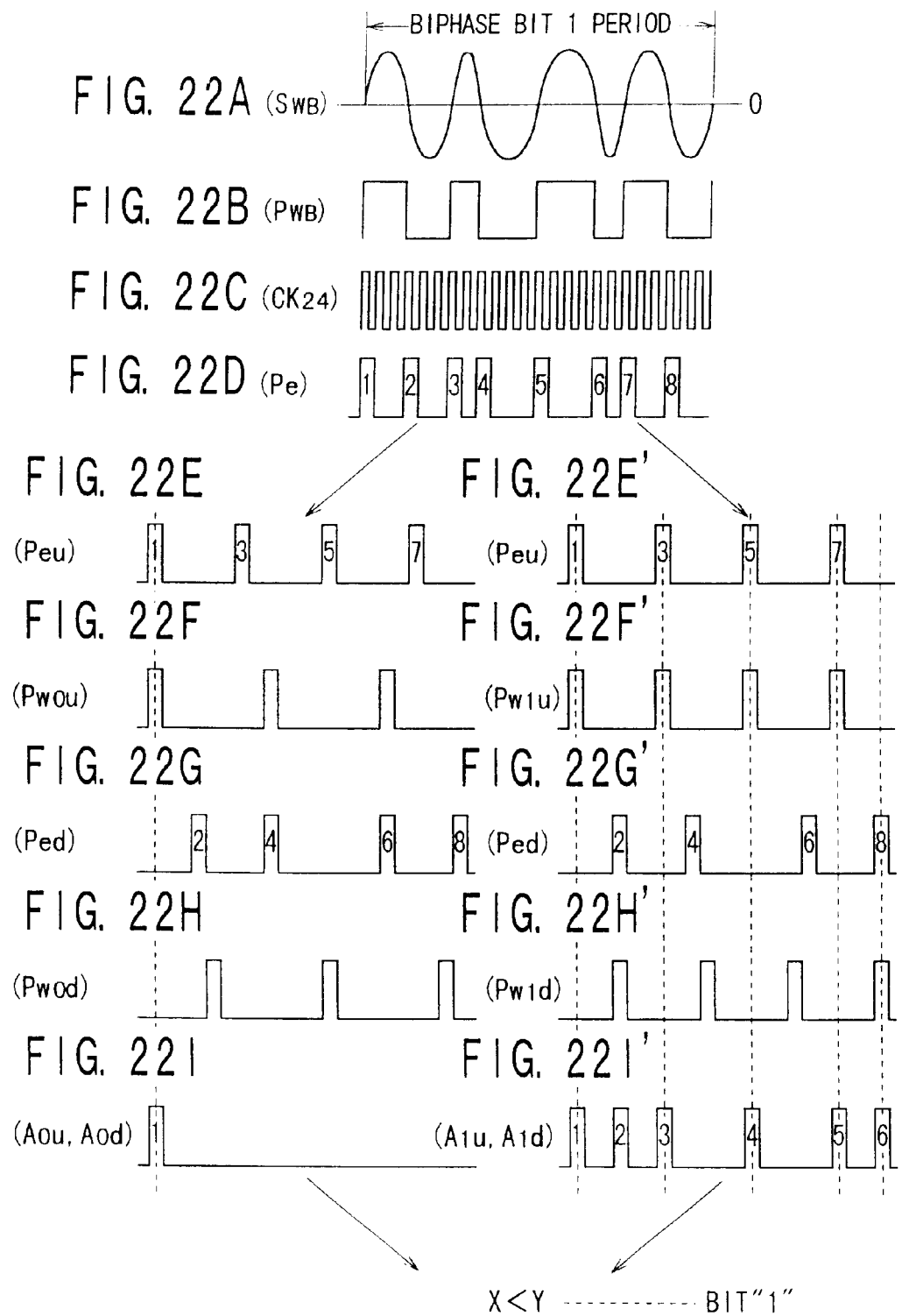
FIGS. 22A through 22I' are waveforms illustrating the operation of the detector.

The operation in the detector 67A shown in FIG. 19 when deformation occurs as shown in FIG. 22A (=18A) the biphase 1 bit period of the wobble signal $S_{WB}$ is explained next. The pulse (binary) signal $P_{WB}$ appears as shown in FIG. 22B and an edge detection pulse Peu corresponding to the rising edge as shown in FIG. 22E (=22E') is acquired and an edge detection pulse Ped corresponding to the falling edge in FIG. 22G (=FIG. 22G') is acquired. The clock signal CK24 is shown in FIG. 22C. The edge detection pulse Pe which combines the edge detection pulse Peu and Ped is shown in FIG. 22D.

Then, in order to form the window pulses $P_{W0}u$, $P_{W0}d$ as shown in FIGS. 22F and 22H for supply to the AND gates 151, 152, the gate outputs Aou, Aod for supply to the edge pulse counter 155, 156 are set so that x=1 as shown in FIG. 22I. However, in order to form the window pulses $P_{W1}u$, $P_{W1}d$ as shown in FIGS. 22F' and 22H' for supply to the AND gates 153, 154, the gate outputs A1u, A1d for supply to the edge pulse counters 157, 158 are set so that y=6 as shown in FIG. 22I'. Accordingly, the x, y differential has become sufficiently large so that correct detection results are obtained even just by using the comparison results as is.

Accordingly, the x, y results are utilized as is, in the comparator circuit 161 and a bit "1" is output as address information ADM in the next biphase 1 bit period.

This arrangement has the benefit that a more accurate identification is possible by also using the edge information from the pulse signal $P_{WB}$ in addition to the window pulse.

Next, the ADIP decoder 60 shown in FIG. 10 contains a PLL circuit 64 and has a relatively complex configuration.

As related above, the biphase bit count "a" between adjacent clock marks is two bits. The channel bit count "n" between adjacent clock marks is 528 bits. Further, the oversampling value for the biphase bit is 24 clocks. As related later on, in the data clock reproducer 70, the reproduction signal $S_{CM}$ of the clock mark is a multiple n=528 and a data clock signal DCK is obtained. In this case, the frequency of the data clock signal DCK and the oversampling clock signal CK24 for the biphase bit are related by means of an integer ratio. In other words, the frequency of the data clock DCK signal is set as f dck and when the frequency of the signal CK is set as f 24, then f dck=11×f 24. Here, frequency division of the data clock signal DCK can be performed and a clock signal CK24 generated.

Figure 23:
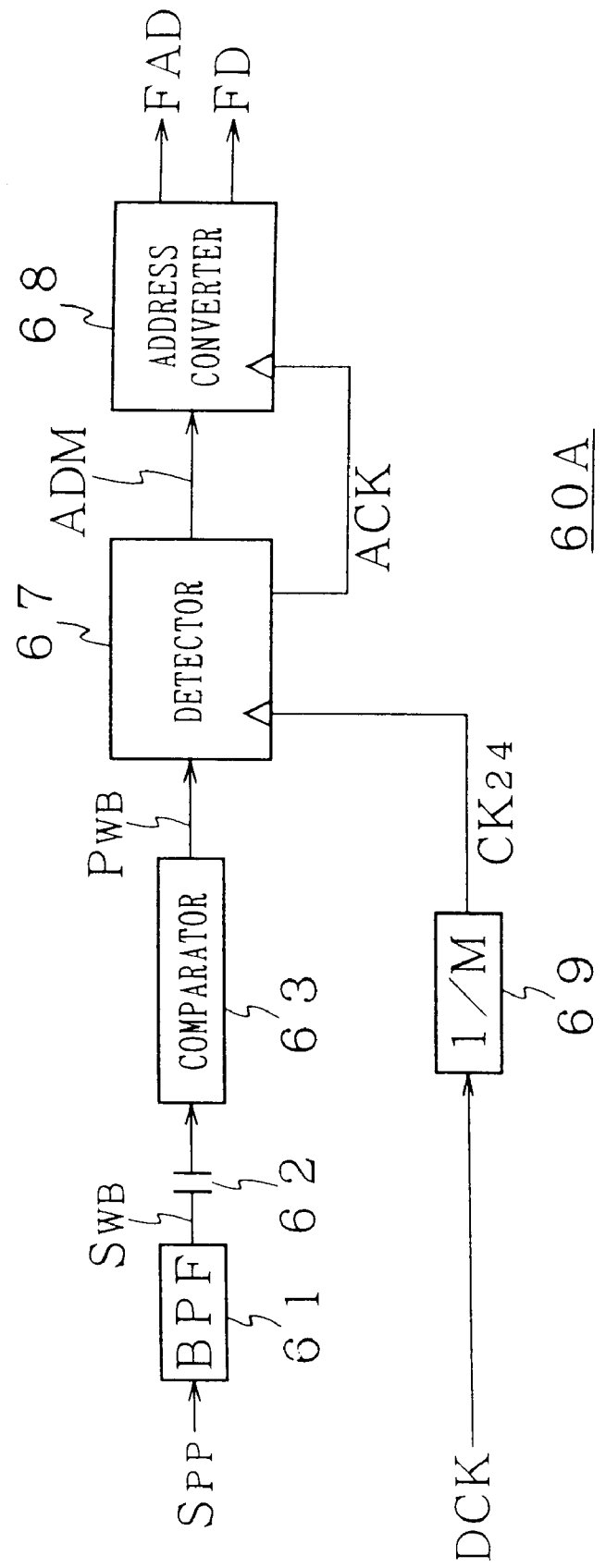
FIG. 23 is a block diagram showing the structure of another embodiment of the ADIP decoder.

The configuration of another aspect of the ADIP decoder 60A is shown in FIG. 23. The data clock signal DCK is frequency divided and a clock signal CK24 acquired. In this FIG. 23, symbols identical to the portions of FIG. 10 are used so a detailed description is omitted here.

Figure 24:
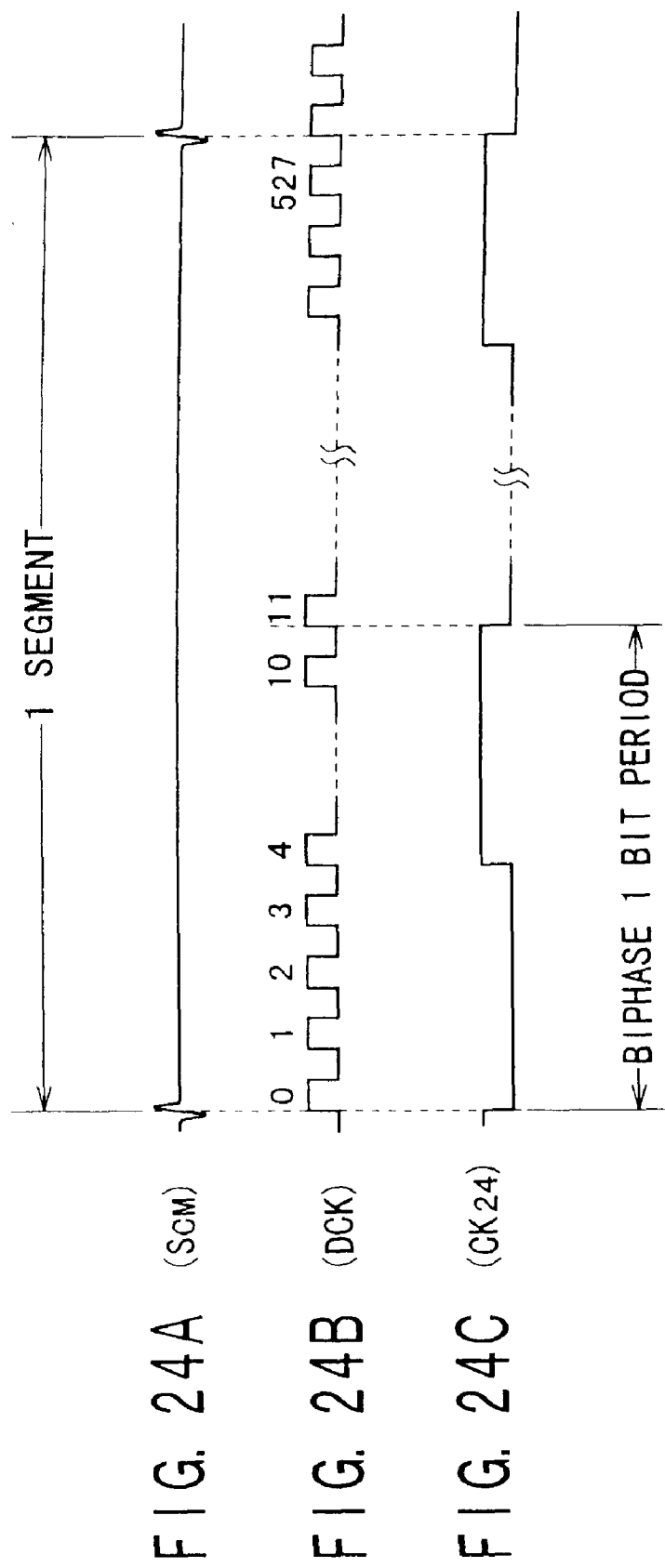
FIGS. 24A through 24C are timing flowcharts describing the clock used by the ADIP decoder.

This ADIP decoder 60A has a frequency divider 60 to divide the data clock signal reproduced by the data clock reproducer 70 by 1/M and generate an oversampling clock signal CK24. Here, M=n/(a·s) and in this embodiment, M=528/(2·24)=11. The clock signal CK 24 generated in this frequency divider 69 is used in the detector 69 (67A). The timing for the reproduction signal $S_{CM}$ of the clock mark CM, the data clock signal DCK and the oversampling clock signal CK24 of the biphase bit are shown in FIGS. 24 A through C.

The ADIP decoder 60 shown in FIG. 23 is identical to the ADIP decoder 60 shown in the another configuration in FIG. 10 so a detailed description is omitted here. This ADIP decoder 60 however operates in the same manner as the ADIP decoder 60 shown in FIG. 10 and a frame address data FAD and frame synchronizing signal FD are acquired from the address converter 68.

This ADIP decoder 60 as shown in FIG. 23 acquires a clock signal S24 so that a PLL circuit is not needed and has the benefit of a simpler configuration compared to the ADIP decoder 60 shown in FIG. 10.

Figure 25:
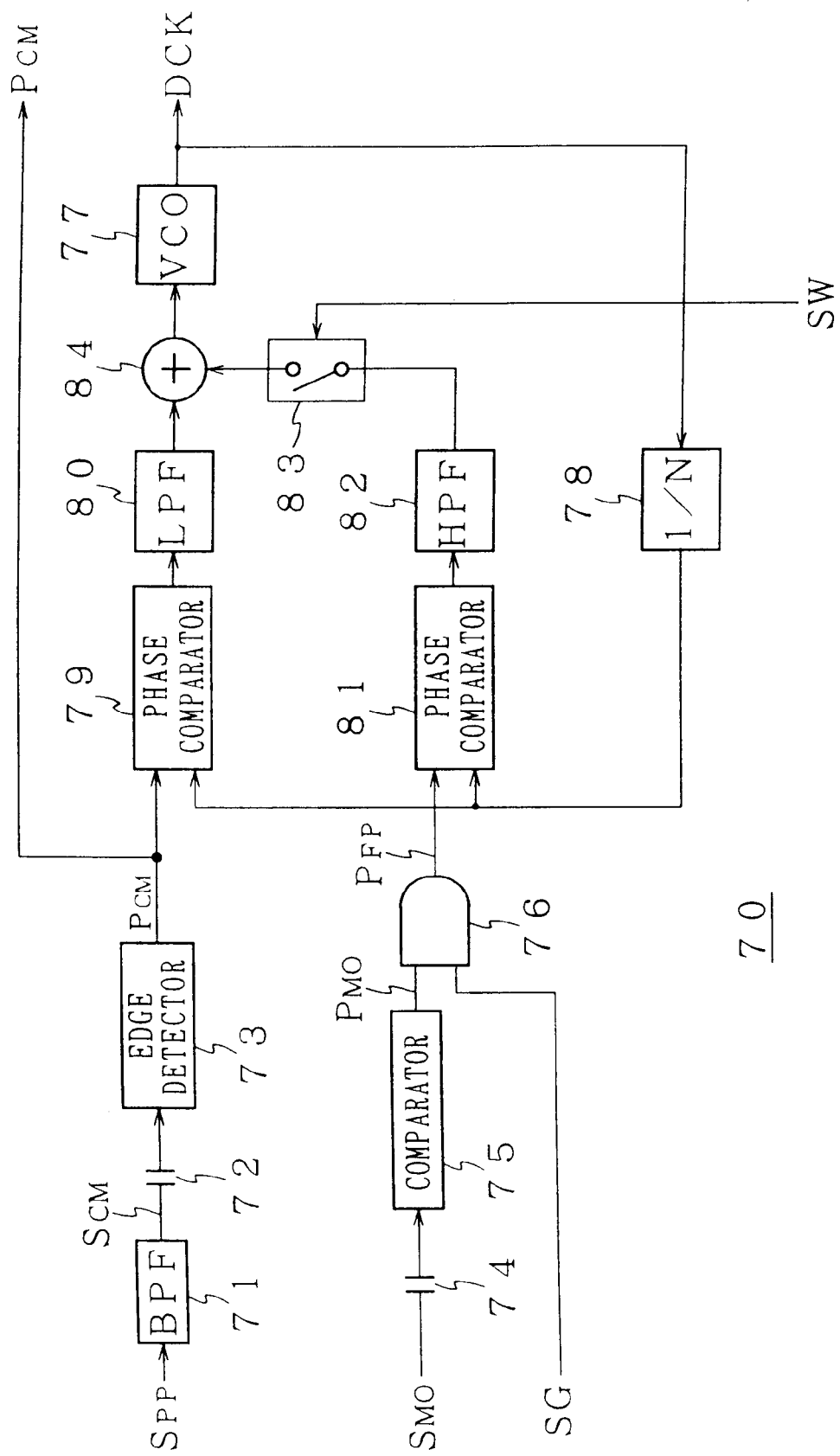
FIG. 25 is a block diagram showing the structure of the data clock reproducing device.

Also in FIG. 25, there is shown the configuration of the data clock reproducer 70. This data clock reproducer 70 contains a band-pass filter 71 for extracting a clock mark reproduction signal $S_{CM}$ from the push-pull signal $S_{PP}$, a capacitor 72 for removing the DC component, and an edge detector 73 for acquiring a pulse signal $P_{CM}$ to show the timing of a zero cross point from the clock mark reproduction signal $S_{CM}$.

This data clock reproducer 70 also contains a capacitor 74 for removing the DC component of the reproduction signal $S_{MO}$; a comparator 75 for converting the reproduction signal $S_{MO}$ into a pulse (binary) signal $P_{MO}$ while setting a threshold value=0; and an AND circuit 76 for AND-gating this pulse signal $P_{MO}$ by using the fixed pattern gate signal SG supplied from the timing generator 90 to output a pulse signal $P_{FP}$ corresponding to the reproduction signal $S_{MO}$ of the fixed pattern region of the magneto-optical disk 11. In this case, as indicated in FIG. 3D, the fixed pattern gate signal SG becomes "1" in the time period during which the reproduction signal $S_{MO}$ of the fixed pattern region is obtained, and becomes "0" in other time periods.

In this timing generator 90, a pulse signal $P_{CM}$ is supplied to show the 0 cross point timing of the above mentioned clock mark reproduction signal $S_{CM}$. Also, in this timing generator 90, the data clock signal DCK is counted and a fixed pattern gate signal SG is generated based on the timing of this pulse (binary) signal $P_{CM}$.

This data clock reproducer 70 further contains a voltage controlled oscillator 77, a frequency divider 78, a phase comparator 79, and a low-pass filter 80, which constitute a PLL circuit. The frequency divider 78 frequency-divides a data clock signal DCK output from this voltage-controlled oscillator 77 by 1/N (here N=n=528). The phase detector 79 performs a phase comparison between a pulse signal $P_{CM}$ output from the edge detector 73 and an output signal of the frequency divider 78. The low-pass filter 80 filters out the low frequency component of a phase error signal output from this phase comparator 79.

This data clock reproducer 70 furthermore includes another phase comparator 81, a high-pass filter 82, and an adder 84. The phase comparator 81 performs phase comparison between the pulse signal $P_{FP}$ output from the AND circuit 76 and the output signal from the frequency divider 78. The high-pass filter 82 filters out high frequency components of the phase error signal output from this phase comparator 81. The adder 84 adds the output signal from the low-pass filter 80 to the output signal of the high-pass filter 82 which is supplied via a connection switch 83. To this connection switch 83, a switch control signal SW is supplied from the system controller 51. As a result, the connection switch 83 is turned OFF when the data is written (recorded), whereas the connection switch 83 is turned ON when the data is read (reproduced).

Figure 26:
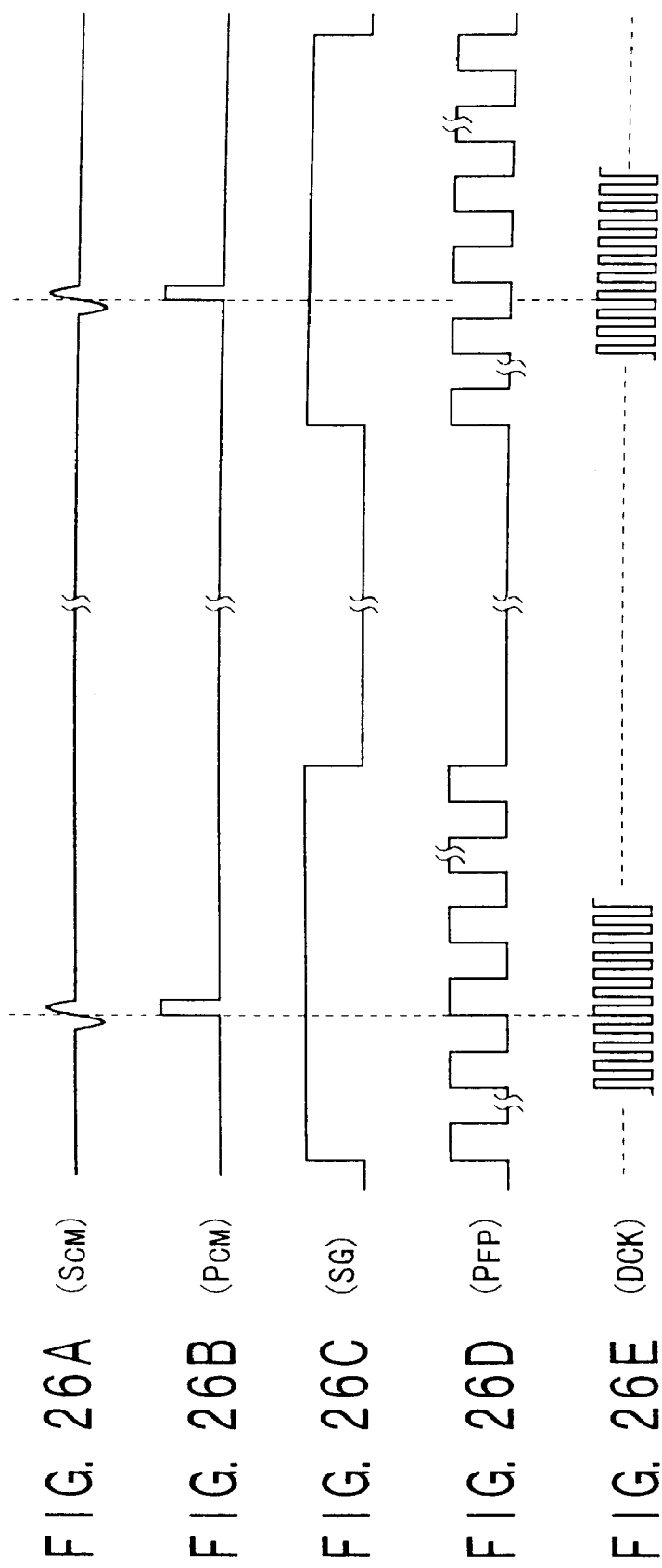
FIGS. 26A through 26E are timing charts describing the operation of the data clock reproducing device.

The operation of the data clock reproducer 70 shown in FIG. 25 will next be explained. The clock mark reproduction signal (represented in FIG. 26A) is extracted from the push-pull signal $S_{PP}$, and then this clock mark reproduction signal $S_{CM}$ is supplied via the capacitor 72 to the edge detector 73. A pulse signal $P_{CM}$ (shown in FIG. 26B) is obtained from the edge detector 73, which indicates the timing of the zero cross point of the clock mark reproduction signal.

The reproduction signal $S_{MO}$ output from the optical head 17 (see FIG. 1) is supplied via the capacitor 74 to the comparator 75 so as to be converted into the pulse (binary) signal $P_{MO}$. Then, the pulse signal $P_{FP}$ (shown in FIG. 26D) corresponding to the reproduction signal $S_{MO}$ of the fixed pattern region SG (shown in FIG. 26C) of the magneto-optical disk 11 is derived from this pulse (binary) signal $P_{MO}$ by the AND circuit 76.

Then, when the data is written (recorded), since the connection switch 83 is turned OFF, the PLL circuit is comprised of a voltage-controlled oscillator 77, a frequency divider 78, a phase comparator 79, and a low-pass filter 80. Only the low frequency component of the phase error signal output from the phase comparator 79 is supplied as the control signal to the voltage-controlled oscillator 77. As a consequence, the data clock signal DCK is generated from the voltage-controlled oscillator 77, and the phase of this data clock signal DCK is controlled by the low frequency component of the phase information possessed by the clock mark reproduction signal $S_{CM}$.

Further, when the data is read (reproduced), since the connection switch 83 is turned ON, the PLL circuit is comprised of the voltage-controlled oscillator 77, the frequency divider 78, the phase comparators 79, 81 and the low-pass filter 80. An addition signal produced by adding the low frequency component of the phase error signal output from the phase comparator 79 to the low frequency component of the phase error signal output from the phase comparator 79 is supplied as the control signal to the voltage-controlled oscillator 77. As a consequence, the data clock signal DCK is produced from the voltage-controlled oscillator 77, and the phase of this data clock signal DCK is controlled by the low frequency component of the phase information possessed by the clock mark reproduction signal $S_{CM}$ and the high frequency component of the phase information possessed by the reproduction signal $S_{MO}$ of the fixed pattern region. It should be understood that FIG. 26E shows the data clock signal DCK.

A description will now be made of the magneto-optical disk apparatus 10 operation indicated in FIG. 1. When a data write command is supplied from the host computer to the system controller 51, the data writing process (recording process) operation is carried out. In this case, with respect to the write data received by the SCSI interface 53 and stored in the data buffer 52, the error correction code adding process operation is executed by the ECC circuit 54, and furthermore the conversion operation to the NRZI data is carried out by the data modulator 55. Then, both the recording data Dr and the fixed pattern signal $S_{FP}$ are supplied from the data demodulator 55 to the magnetic head driver 16, so that the recording data Dr is recorded into the data region as the target position of the magneto-optical disk 11, and also the fixed pattern signal $S_{FP}$ is recorded into the fixed pattern region corresponding to the data region into which the recording data Dr is recorded.

When a data read command is supplied from the host computer to the system controller 51, the data reading process (reproducing process) operation is carried out. In this case, the reproduction signal $S_{MO}$ is obtained from such a data region functioning as the target position of the magneto-optical disk 11 and from the fixed pattern region corresponding to this data region. The frequency characteristic of this reproduction signal $S_{MO}$ is compensated by the equalizer circuit 56, and this reproduction signal $S_{MO}$ is converted into the digital signal by using the data clock DCK by the A/D converter 57. Thereafter, the digital data is discriminated by the data discriminator 58 to thereby obtain reproduction data Dp. Then, the NRZI inverse conversion is carried out on this reproduction data Dp by the data demodulator 59, and the error correction process operation is performed by the ECC circuit 54, so that the read data is obtained. This read data is then temporarily stored in the data buffer 52, and thereafter is transmitted via the SCSI interface 53 to the host computer at a predetermined timing.

In the data writing process operation and the data reading process operation, it should be noted that both the magnetic head 51 and the optical head 17 are seek-controlled to the target position by the servo controller 41. In this case, the seek operation is carried out with reference to the frame address data FAD output from the ADIP decoder 60. Also, when the data is written (recorded), the data clock signal DCK is produced from the data clock reproducer 70, the phase of which is controlled by the low frequency component of the phase information held by the clock mark reproduction signal $S_{CM}$. The data writing process operation is carried out synchronously with this data clock signal DCK. On the other hand, when the data is read (reproduced), the data clock signal DCK is produced from the data clock reproducer 70, the phase of which is controlled by the low frequency component of the phase information held by the clock mark reproduction signal $S_{CM}$, and the high frequency component of the phase information held by the reproduction signal $S_{MO}$ of the fixed pattern region. The data reading process operation is carried. out synchronously with the data clock signal DCK In the magneto-optical disk apparatus 10 operation of FIG. 1, when the data is read (reproduced), the data clock signal DCK (see FIG. 25) may be acquired from the data clock reproducer 70, the phase of which is controlled by the low frequency component of the phase information held by the clock mark reproduction signal $S_{CM}$, and the high frequency component of the phase information held by the reproduction signal $S_{MO}$ of the fixed pattern region. Thus, even when the signal to noise (S/N) ratio of the clock mark reproduction signal $S_{CM}$ is low, it is possible to obtain the clock signal synchronized with the reproduction data with high precision. Thus, the precision of the data reading process operation can be increased.

Also, the amplitude of the groove wobble of the magneto-optical disk 11 is varied in response to the frequency of the post-modulated signal, and the slope of the groove wobble at the zero cross point which corresponds to the junction between the address information ADM of "1" and the address information ADM of "0" (see FIG. 5) is prevented from being changed. As a result, the jitter component of the wobble signal $S_{WB}$ along the time axis direction, which corresponds to the junction between the address information ADM of "1" and the address information ADM of "0" is reduced, so that the address information ADM can be obtained under better conditions by the ADIP decoder 60 (see FIG. 10). As previously explained, in this embodiment mode, the waveform numbers of the groove wobbles corresponding to the address information of "1" and "0" are each selected to be integers. Since all junctions of the groove wobbles corresponding to the address information ADM of "1" and "0" become the zero crosspoints, this is a particularly effective arrangement.

Also, in the ADIP decoder 60, the address information ADM is obtained by way of the demodulating process operation by employing a clock signal CK 24 having such a frequency "fc" (=6 fa=8 fb) higher than the frequencies "fa" and "fb" of the wobble signals $S_{WB}$ by a common frequency multiple, which corresponds to the data of the address information ADM of "1" and "0" (see FIG. 10). As a consequence, since the decoding process circuit can be arranged by employing only one signal system of the PLL circuit, there is the advantage that the arrangement of the ADIP decoder 60 can be simplified. In this case, while the waveform numbers of the groove wobbles corresponding to the address information ADM of "1" and "0" are selected to be the proper integers, since the pulse signals output from the comparator 63 in response to the address information ADM of "1" and "0" always have the same shapes, it is possible to easily perform the demodulating process operation by using the clock signal CK 24 in the decoding process circuit 67 (67A).

Also, the frequency of the data clock signal DCK and the oversampling clock signal CK24 for the biphase bit are related by means of an integer ratio. Here, frequency division of the data clock signal DCK is performed and a clock signal CK24 acquired to allow a simpler configuration for the ADIP decoder 60A (FIG. 23).

Further in the ADIP decoder 60, 60A of the detector 67 (67A) wave detection of the bit "0" and bit "1" is performed using the window pulses so that even if defects are present in the wobble $S_{WB}$ signal, the quality of the address information ADM is the same as that when no deformation was present in the wobble signal.

Figure 27:
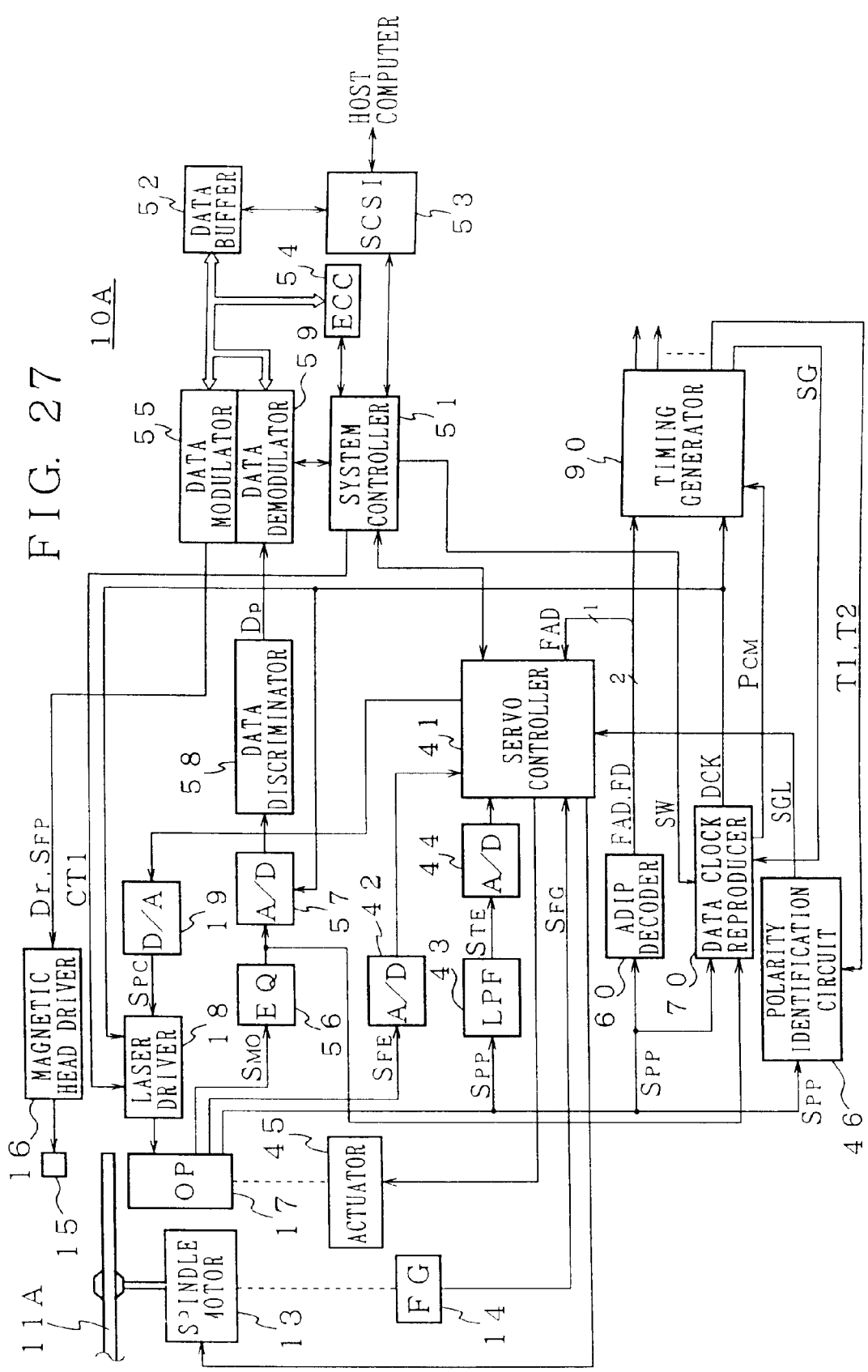
FIG. 27 is a block diagram showing the structure of the magneto-optical disk apparatus of the second embodiment of this invention.

The second embodiment of this invention is next described. The structure of a magneto-optical disk apparatus 10a of the first embodiment of this invention is shown in FIG. 27. The reference numerals of FIG. 27 are identical to those shown in FIG. 1 so a detailed description is omitted here.

An optical disk 11A used in this magneto-optical disk apparatus 10A is formed with alternate grooves and lands radially across the disk surface containing recording tracks. The lands or the grooves are preformatted with clock marks containing phase information.

These clock marks CM differ from the marks shown in FIGS. 44A and 44B in that these clock marks CM have a first protrusion CM with a parallel falling edge section formed radially at one end of the groove and, a second protrusion CM with a parallel rising edge section formed radially at the other end of the groove.

A preformatting device 200 as shown in FIG. 28 is utilized to preformat the surface of the base disk with the above mentioned clock marks CM and the address information ADM by groove wobbles.

This preformatting device 200 has a cutting light source 201. A helium-cadium (He—Cd) laser may for instance be used as the laser light source.

The cutting beam (laser) output from the light source 201 is isolated into two optical path beams by a half mirror 20. One of these beams, a beam Ba is supplied to a switch 204 by way of a half mirror 202, while the other beam Bb is supplied directly to a switch 205.

These switches 204, 205 regulate the output and stopping of the laser beams. In the example here, an electro optical modulator is utilized. These switches 204, 205 are controlled based on control signals Ca, Cb from the beam on/off controller 206. The control beam signal output timing of the on/off controller 206 is regulated by a controller 207.

The wobble status of the cutting beams Ba, Bb whose on/off is regulated, are controlled by beam wobble controllers 211, 212. An AOM (acoustic optical modulator) is used in the example given here as the beam wobble controllers 211 and 212. The wobble quantity of these beam wobble control 211 and 212 is regulated by control signals Fa, Fb from a beam wobble controller 213. Actually, the wobble quantity is controlled by the amplitude levels of the control signal Fa, Fb. Also, the wobble direction is controlled by the polarity of the control signals Fa, Fb. When the control signal has a triangular waveform, the wobble marks form a triangular wave. When supplied with a sine wave the wobble marks will form a triangular wave.

The cutting beams Ba, Bb controlled by the wobble status are input to an optical system 215 and a light junction formed by these beams overlapping in one section as shown in FIG. 30. In this case, a pair of prisms 216, 217 are utilized. The cutting beams 216, 217 are thus made to overlap at one junction as shown in FIG. 30 by means of the pair of prisms 216, 217.

These cutting beams Ba, Bb which form a light junction are irradiated onto a surface 11f of the base disk 11E by means of the objective lens 218 and a groove 12G and (disk counting for both grooves and groove wobble) a groove wobble formed. Here, a rotation-drive mechanism 219 is provided to rotate a base disk 11E radially and drive in the x direction. The base disk 11E is driven one spiral for each rotation of the base disk 11E. In other words, driven a distance equal to the distance from one groove to the next groove.

The clock mark CM is formed by controlling the cutting the surface 11f of the base disk 11E. Cutting of the base disk 11E is performed when the laser beam is irradiated onto the surface 11f of the base disk 11E. However, when laser beam irradiation of the surface 11f of the base disk 11E is stopped, no cutting of the base disk 11E is performed.

Accordingly, by setting as the boundary, the zero cross point (timing to) of the clock mark CM reproduction signal $S_{CM}$ (FIG. 29A) to be obtained, the clock mark CM can be formed by switching the cutting beams Ba and Bb on and off. In other words, the cutting beam Ba is switched off (FIG. 29B) from a specified position prior to the zero cross point up to the zero cross point; while the cutting beam Bb is switched off (FIG. 29C) up to a specified position immediately after the zero cross point.

In this case, the scanning tracks TRa, TRb of the cutting beams Ba, Bb are respectively shown in FIG. 30. Accordingly, the land 12L and the groove 12G are formed on the surface 11f of the base disk 11E.

An examination of the groove 12G shows that the upper edge is one side of the groove wobble edge and that the lower edge is a flat surface. This upper edge is formed according to the off period of the beam Ba so that a rectangular protrusion 4a projects internally. On the other hand, the lower edge is formed according to the off period of the beam Bb so that a rectangular protrusion 4b projects internally.

Conversely, an examination of the land 12L shows that the upper edge is one side of the groove wobble edge and that the lower edge is a flat surface. This lower edge is formed according to the off period of the beam Ba so that a rectangular protrusion 4a projects externally. On the other hand, the upper edge is formed according to the off period of the beam Bb so that a rectangular protrusion 4b projects externally.

These pair of protrusions 4a, 4b formed by the beams Ba, Bb, comprise the clock mark CM. The edge of this pair of protrusions 4a, 4b has a steep edge, consequently the protrusion 4a of the ON edge 4a' and the protrusion 4b of the OFF edge 4b' have corresponding positions in the track direction and are therefore formed with the same radius.

Returning to FIG. 27, the optical disk 11A has the above related preformatting performed on the base disk 11E by means of the preformatting device 200 as shown in FIG. 28. Accordingly, the surface of the optical disk 11A as shown in FIG. 31A is formed with the same lands 12L and the grooves 12G on the surface 11f of the base disk 11E as shown in FIG. 30.

When the clock marks CM (protrusions 4a, 4b) preformatted on the optical disk 11A as shown in FIG. 31A are reproduced by means of the beam $P_{PB}$ shown in the figure, a reproduction signal $S_{CM}$ as shown in FIG. 31B is obtained. In this case, when differential between the signal Su from the upper part of Pu for the scan tracks 5, and the Sd signal from the lower part of Pd is set (push-pull signal: $S_{PP}$=Su−Sd); only the differential for the protrusions 4a, 4b becomes larger during scanning of the land 12L. Furthermore, since this polarity is reversed, the reproduction signal $S_{CM}$ becomes the signal SL as shown by the solid line in FIG. 31B. The reproduction signal of $S_{CM}$=SL is a steep level change in the vicinity of the zero cross point.

In contrast, when scanning the grooves 12G, the reproduction signal $S_{CM}$ becomes a signal SG as shown by the dashed line in FIG. 31B since the polarity of the protrusions 4a, 4b becomes reversed, and the polarity is inverted for the above mentioned signal SL. The reproduction signal of $S_{CM}$=SG is also a steep level change in the vicinity of the zero cross point.

A pulse (binary) signal $P_{CM}$ (shown in FIG. 31C) is acquired which shows the timing of the zero crosspoint of the clock mark $S_{CM}$ (SL, SG) extracted from the push-pull signal $S_{PP}$ by means of the edge detector 73 (see FIG. 25) in the data clock reproducer 70. A data clock signal DCK is reproduced based on this pulse (binary) signal $P_{CM}$.

This magneto-optical disk apparatus 10A has a polarity identification circuit 46 to identify whether the beam $P_{PB}$ is above the land 12L or above the groove 12G by means of the polarity of the clock mark signal $S_{CM}$. The identification signal SGL acquired by this polarity identification circuit 46 is supplied to a servo controller 41 in this embodiment. In this servo controller 41 a selection is made based on the identification signal SGL, whether to use the tracking servo for the land 12L or the tracking servo for the groove 12G (servo signal polarity differs between the land and groove). Then, based on the tracking servo that was selected, an actuator 45 is controlled by means of the tracking control signal from the servo controller 41 so that tracking is performed by the beam over the land 12L or over the groove 12G.

Figure 32:
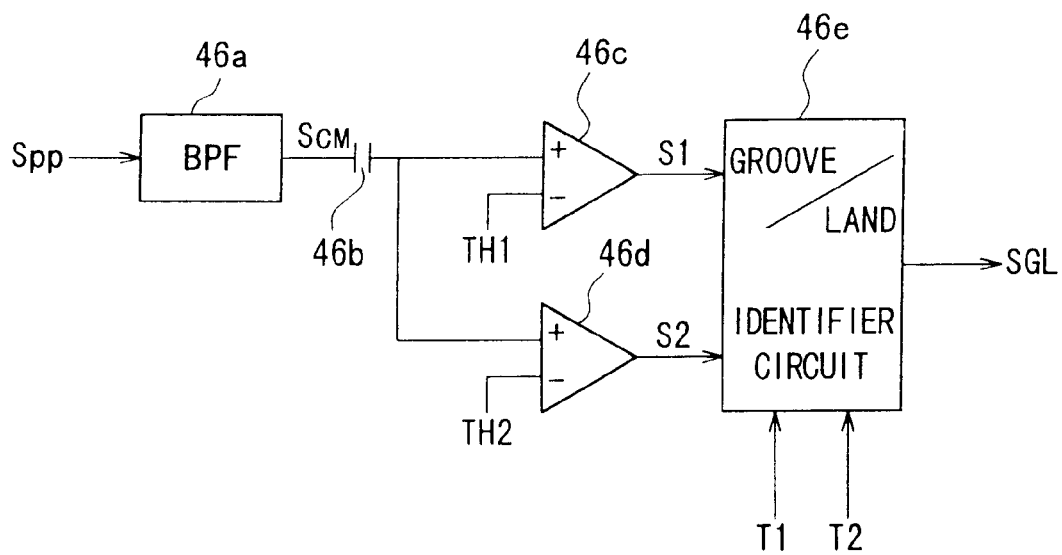
FIG. 32 is a block diagram showing the structure of the polarity discriminator.
Figure 40:
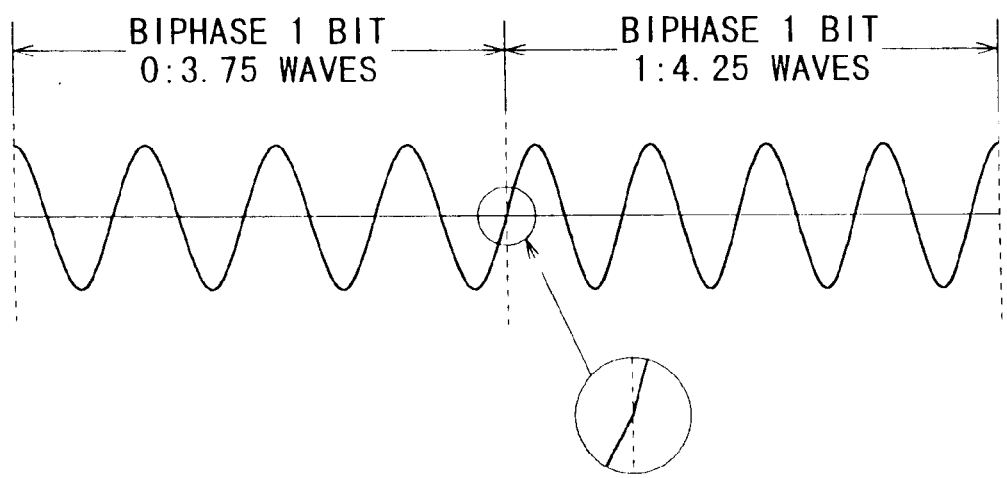
FIG. 40 is a drawing showing a sample structure of a wobble groove of the conventional art.

The structure of the polarity identification circuit 46 is shown in FIG. 32. This polarity identification circuit 46 is comprised of a bandpass filter 46a for extracting a clock mark reproduction signal $S_{CM}$ from the push pull $S_{PP}$, a capacitor 46b for removing the DC components, a comparator 46c for comparing the clock mark reproduction signal $S_{CM}$ with the positive threshold value TH1, and a comparator 46d for comparing the clock mark reproduction signal $S_{CM}$ with the negative threshold value TH2.

In this case, in the comparator 46c, the clock mark signal $S_{CM}$ is supplied to the non-inverted input terminal, and the threshold value TH1 is supplied to the inverted input terminal. The output signal S1 of this comparator 46c becomes "1" when $S_{CM}$ is greater than or equal to TH1; and becomes "0" when the $S_{CM}$ is less than TH1. In the comparator 46d, the clock mark signal $S_{CM}$ is supplied to the inverted input terminal, and the threshold value TH2 is supplied to the non-inverted input terminal. The output signal S2 from this comparator 46 becomes "1" when $S_{CM}$ is less than or equal to TH2 and becomes "0" when $S_{CM}$ is greater than TH1.

The polarity identification circuit 46 has a groove/land identifier circuit 46e for identifying whether the beam $P_{PB}$ is above the land 12L or above the groove 12G by means of the polarity of the clock mark signal $S_{CM}$ based on the output signals S1, S2; and then issue an identification signal SGL. In this groove/land identifier circuit 46e, timing pulses t1, t2 (shown in FIG. 31F) are supplied from a timing generator 90 (see FIG. 1) to show the approximate timing for "to" of the zero cross point timing of the clock mark signal $S_{CM}$.

In this groove/land identifier circuit 46e, when the output signal S1 becomes "1" at timing t1 and the output signal S2 becomes "1" at timing t2, the beam $P_{PB}$ is determined to be over the groove 12G and a "1" is output as an identifier signal SGL. However when the output S2 becomes "1" at timing t1 and the output signal S1 becomes "1" at timing t2, the beam $P_{PB}$ is determined to be over the land 12L and a "0" is output as an identifier signal SGL.

Next, the operation of the polarity identification circuit 46 of FIG. 32 is explained. When the beam $P_{PB}$ is scanning over a groove 12G, the clock mark reproduction signal $S_{CM}$ becomes a signal SG shown in the dashed line in FIG. 31B. Consequently, the output signals S1, S2 of the comparators 46c, 46d become as shown in FIG. 31D, and the output signal S1 becomes "1" at the timing t1 and the output signal S2 becomes "1" at timing t2. Accordingly, in the groove/land identifier circuit 46e, the beam $P_{PB}$ is determined to be over the groove 12G and a "1" is output as the identifier signal SGL.

On the other hand, when the beam $P_{PB}$ is scanning over the land 12L, the clock mark reproduction signal $S_{CM}$ becomes a signal SL shown in the solid line in FIG. 31B. Consequently, the output signals S1, S2 of the comparators 46c, 46d become as shown in FIG. 31E, and the output signal S2 becomes "1" at the timing t1 and the output signal S1 becomes "1" at timing t2. Accordingly, in the groove/land identifier circuit 46e, the beam $P_{PB}$ is determined to be over the land 12L and a "0" is output as the identifier signal SGL.

However, in the example in FIG. 30, since the direction that the protrusions 4a, 4b of the land 12L and groove 12G face is determined by the on/off switching of the cutting beams Ba, Bb, as can be seen, the land 12L is fatter than the groove 12G (wider) Consequently, the amplitude levels of the signals SL, SG used as the clock mark reproduction signals $S_{CM}$ will be different (see FIG. 31B).

This difference in amplitude levels is due to forming of the clock marks CM (protrusions 4a, 4b) just by the on/off switching of the cutting beams Ba, Bb as shown in the example in FIG. 30. In order to eliminate this difference, as for instance shown in FIG. 33A, the cutting beam Bb can be shifted to the land 12L side (fixed quantity wobble) for at least the off period of the cutting beam Ba. The shifting of this beam Bb is performed by the beam wobble control 212 shown in FIG. 28.

When beam wobble control is performed, the pitch Wa of the groove 12G matches the pitch Wb of the land 12L in the off period of the cutting beam Ba. This process allows the differential between the amplitude levels of signals SL, SG of the clock mark reproduction signal $S_{CM}$ to be corrected as shown in FIG. 33B. However, the difference in the positive and negative sides of the amplitude levels cannot be eliminated. In the example shown in FIG. 34, the difference in positive and negative amplitude levels has been set to allow correction.

In this case, the beam Ba, Bb on/off switching timing "to" is set as the boundary and both the beams Ba, Bb shifted in mutually opposite directions (fixed quantity wobble) around the boundary. Consequently, for the cutting beam Ba, a control signal Ca as shown in FIG. 34A is supplied to the switch 204; a control signal Fa as shown in FIG. 34B is supplied to the beam wobble control 211.

In the same way, for the cutting beam Bb, a control signal Cb as shown in FIG. 34C is supplied to the switch 205, and a control signal Fb as shown in FIG. 34D is supplied to the beam wobble control 212. The interval for shifting the beam Ba, Bb by means of these control signals Fa, Fb is optional. In this example, the beam off period is approximately ½.

The beams Ba, Bb are each set in mutually different directions for wobbling by means of supplying these control signals Fa, Fb as shown in FIGS. 34B and 34D so that for instance, the cutting of the groove 12G is performed as shown by the diagonal line in FIG. 34E. Consequently, the relation of the land 12L and the groove 12G becomes that shown in FIG. 34F and the imbalance in width between the land 12L and the groove 12G is eliminated. Accordingly, as shown in FIG. 34G, the difference between the amplitude levels of signals SL and SG of the clock mark reproduction signal $S_{CM}$ is completely eliminated.

In the example in FIG. 34, a triangular waveform is shown for the control signals Fa, Fb however a sine wave or other waveforms may also be used. The width and amplitude of the triangular waveform, in other words the wobble quantity and other items merely constitute one example. For instance if the wobble quantity is increased, then the amplitude levels of the signals SL, SG can be increased by that amount.

As mentioned above, in the clock mark CM preformatted on the optical disk 11A, on examining the groove 12G shows it comprises a pair of protrusions 4a 4b formed to protrude internally from both sides. However, instead of these protrusions 4a 4b, a pair of concavities can be formed to protrude externally at track direction positions matching these protrusions 4a 4b and these concavities may be used as the clock mark CM.

Returning to FIG. 27, when writing data (during record) in the disk apparatus 10A, during record of the record data Dr and the fixed pattern signal $S_{PP}$, modulation of the laser beam is performed with the data clock signal DCK. Accordingly, the data clock signal DCK reproduced by the data clock reproducer 70 is supplied to a laser driver 18. This method for modulating the laser beam with a data clock signal DCK is for instance listed in U.S. Pat. No. 5,182,734.

Even when writing data (during record), reproduction of the clock mark CM is performed by the optical disk 11A. As related above, when the laser beam is modulated by the data clock signal DCK, a weighted clock mark reproduction signal $S_{CM}'$ (shown in FIG. 43) is acquired. When filtering is performed with a low-pass filter in order to remove the data clock signal DCK from this clock mark reproduction signal $S_{CM}'$, the waveform in the vicinity of the zero cross point become indistinct. When a data clock signal DCK is reproduced by utilizing the clock mark signal $S_{CM}$ as phase information, jitter occurs in this data clock signal DCK and adverse effects are exerted on the recording of data.

Whereupon, in the disk apparatus 10A in FIG. 27, during writing of data, a control signal CT1 as shown in FIG. 35B is supplied to the laser driver 18 from the system controller 51. The period (clock mark period) $T_{CM}$ in which the clock mark reproduction signal $S_{CM}$ (shown in FIG. 35A) is acquired is set so that the laser beam is not modulated by the data clock signal DCK as shown in FIG. 35D. Also, a power control signal as shown in FIG. 35C is supplied to the servo controller 41 from the system controller 51 and in the preformat period $T_{CM}$, the laser beam power is the reproduction power $P_R$ and not record power $P_w$.

Thus, as shown in FIG. 35A since the laser beam is set so as not to be modulated by the data clock signal DCK during the preformat period $T_{CM}$, a non-weighted data clock signal $S_{CM}$ can be acquired from the data clock signal DCK. Consequently, highly accurate phase information from the zero cross point of the clock mark reproduction signal $S_{CM}$ can be acquired and satisfactory reproduction of the data clock reproduction signal DCK can be obtained.

The disk apparatus 10A in FIG. 27 has the same structure as the disk apparatus 10 shown in FIG. 1 and the operation is identical. The disk apparatus 10A shown in FIG. 27, therefore has an effect identical to the disk apparatus 10 shown in FIG. 1.

Further, in this disk apparatus 10A, the beam $P_{PB}$ scanning the optical disk 11A can be determined to be over a land or over a groove by means of the polarity of the clock mark reproduction signal $S_{CM}$. The beam $P_{PB}$ can be easily identified as being over either over a land or over a groove.

During data writing, the laser beam is controlled in the preformat period $T_{CM}$ so as not to be modulated by the data clock signal DCK. Accordingly, a non-weighted data clock signal $S_{CM}$ can be acquired from the data clock signal DCK and highly accurate phase information from the zero cross point of the clock mark reproduction signal $S_{CM}$ acquired so that satisfactory reproduction of the data clock reproduction signal DCK can be obtained.

In the preformatting device 200 shown in FIG. 28, on/off control along the time axis of the cutting beams Ba, Bb is performed and a pair of protrusions 4a, 4b formed as clock marks CM. The level change in the vicinity of the cross point of the reproduction signal $S_{CM}$ for the clock marks CM (4a, 4b) formed in this way, is steep so that highly accurate phase information can be obtained from the zero cross point of this clock mark reproduction signal $S_{CM}$ satisfactory reproduction of the data clock reproduction signal DCK can be achieved.

Figure 36:
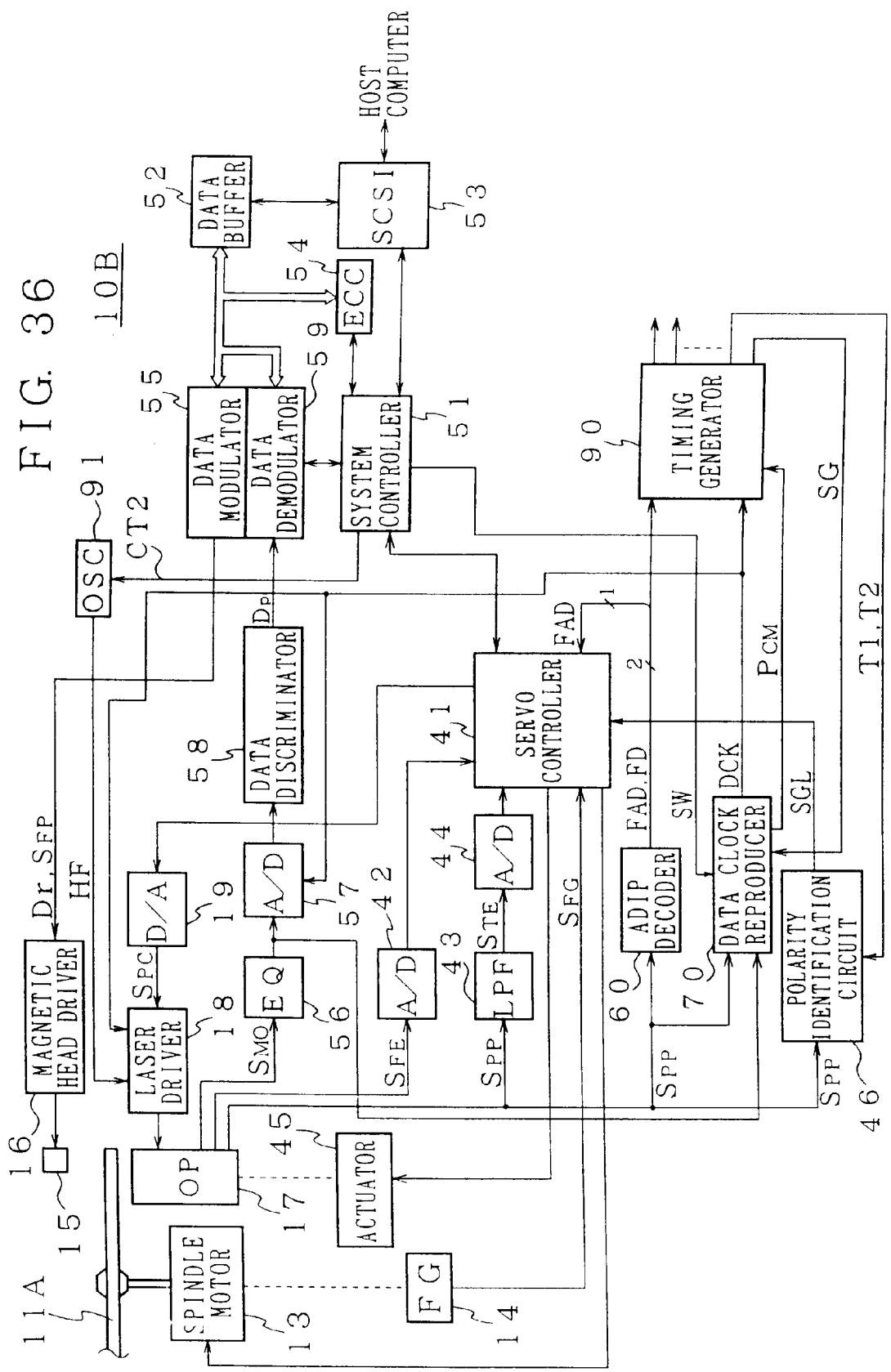
FIG. 36 is a block diagram showing the structure of the magneto-optical disk apparatus of the third embodiment of this invention.

Next, the third embodiment of this invention is described. The structure of the optical disk apparatus 10B of third embodiment is shown in FIG. 36. The same reference numerals as in FIG. 27 are used in FIG. 26 so a detailed description is omitted here.

In the disk apparatus 10A in FIG. 27, the laser beam is controlled in the preformat period $T_{CM}$ so as not to be modulated by the data clock signal DCK and the laser beam power is controlled to be the reproduction power $P_R$ however in the optical disk apparatus 10B of third embodiment, during the clock mark period $T_{CM}$, the laser beam DCK is substituted with the clock signal DCK; and modulation performed with the high frequency signal HF.

An oscillator 91 to output a high frequency signal HF is provided in the disk apparatus 10B, and this high frequency signal HF is supplied to the laser driver 18. A frequency band is selected for this high frequency signal HF so as to reduce the noise of the semiconductor laser and the frequency used is generally known to be approximately 500 MHz.

In the disk apparatus 10B during data writing, a control signal CT2 is supplied to the oscillator 91 from the system controller as shown in FIG. 37B. The high frequency signal HF is supplied to the laser driver 18 by oscillator 91 only for the clock mark period $T_{CM}$. Accordingly, as shown in FIG. 37D, the laser beam is modulated by the high frequency signal HF in the clock mark period $T_{CM}$ with the date clock signal DCK. The laser beam power is normally controlled in record power $P_W$ status as shown in FIG. 37C however, control may also be accomplished with the reproduction power $P_R$ only in the preformat period TM.

Thus, when the laser beam is modulated by the high frequency signal HF in the preformat period $T_{CM}$, the push-pull signal SP output during clock mark CM reproduction is obtained with the high frequency signal HF in a weighted status, however this high frequency signal HF is present in a frequency band that is considerably higher than the clock mark reproduction signal $S_{CM}$ frequency band. Accordingly as shown in FIG. 37A, the clock mark reproduction signal $S_{CM}$ can be extracted by (see FIG. 25) the bandpass filter 71 with no effects whatsoever being exerted by this high frequency signal HF. The phase information can also be acquired with high accuracy from the zero cross point of this clock mark reproduction signal $S_{CM}$ and satisfactory reproduction of the data clock reproduction signal DCK can be achieved.

Figure 38:
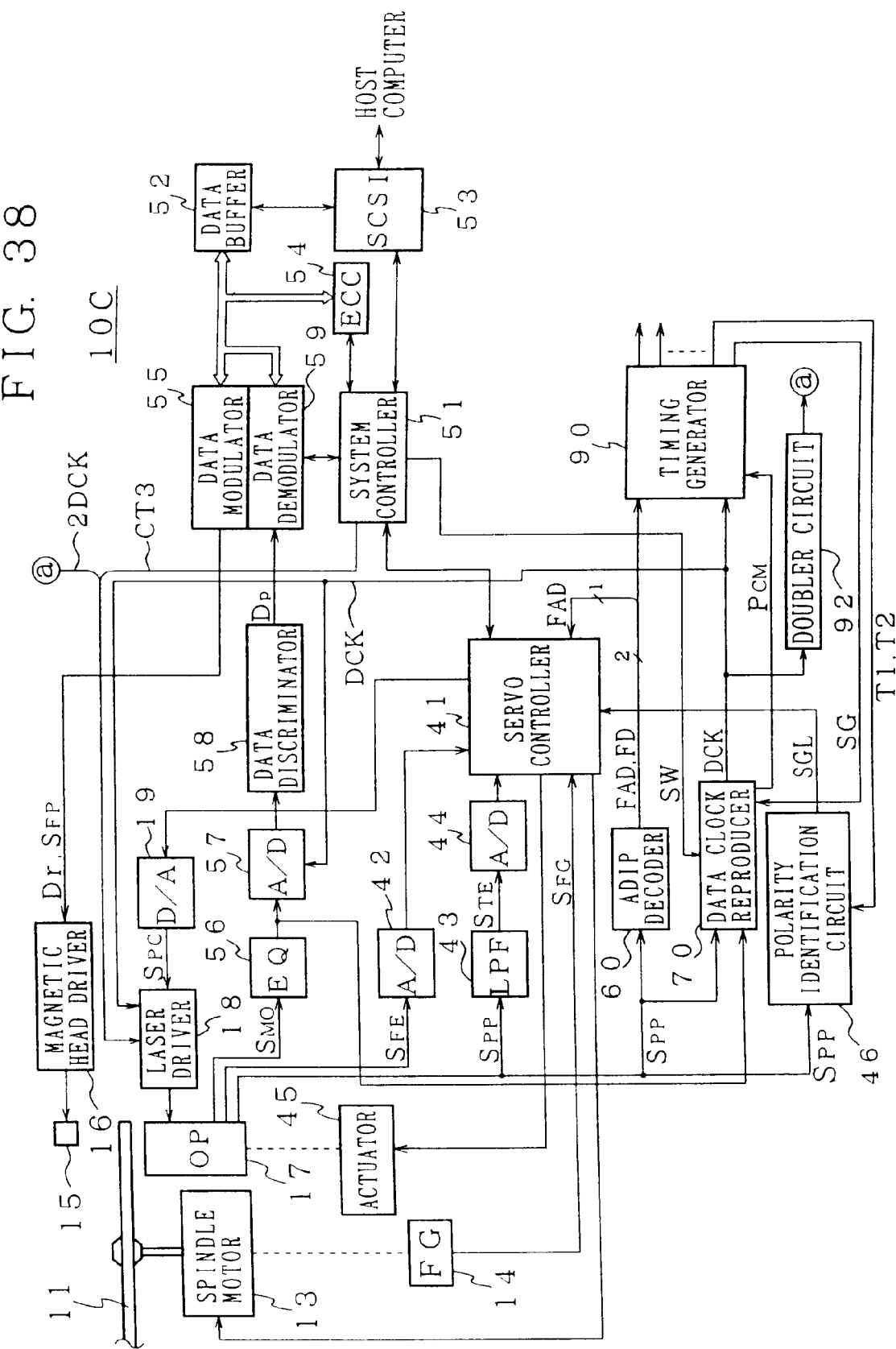
FIG. 38 is a block diagram showing the structure of the magneto-optical disk apparatus of the fourth embodiment of this invention.
Figure 41:
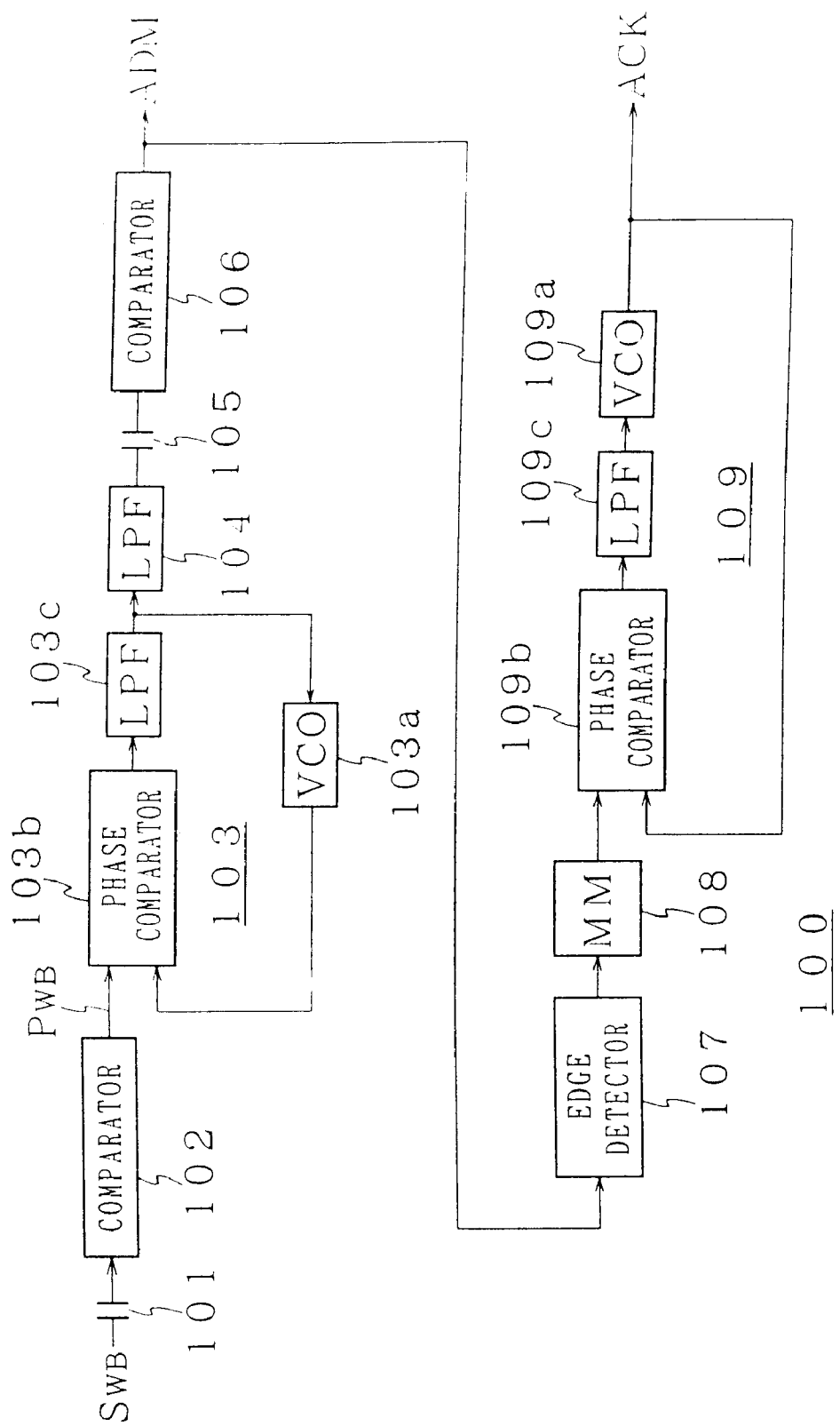
FIG. 41 is a block diagram showing the structure of the frequency demodulation circuit of the conventional art.

Next, the fourth embodiment of this invention is described. The structure of the optical disk apparatus 10C of the fourth embodiment is shown in FIG. 38. The same reference numerals as in FIG. 36 are used in FIG. 38 so a detailed description is omitted here.

In the optical disk apparatus 10B in FIG. 36, the laser beam was modulated by high frequency signal HF during the clock mark period $T_{CM}$ however in the optical disk apparatus 10C in FIG. 38, during the clock mark period $T_{CM}$, the data clock signal DCK is used and modulation is performed at twice the frequency with the clock signal 2DCK.

Consequently, in the optical disk apparatus 10C, a doubler circuit 92 is provided to double the data clock signal DCK and acquire a data clock signal 2DCK. The laser driver 18 is then supplied with this data clock signal 2DCK. Also, during data writing in the optical disk apparatus 10C, a control signal CT3 is supplied to the laser driver 18 from the system controller 51 as shown in FIG. 39B, and the laser beam is modulated by the clock signal 2DCK as shown in FIG. 39D during the clock mark period $T_{CM}$. The laser beam power is normally controlled in record power $P_W$ status as shown in FIG. 39C.

Thus, when the laser beam is modulated by the clock signal 2DCK during the preformat period $T_{CM}$, the push-pull signal $S_{PP}$ output during clock mark CM reproduction is acquired in a weighted status however the clock mark signal 2DCK is in a much higher frequency band than the clock mark reproduction signal $S_{CM}$. Accordingly, as shown in FIG. 39A, this lock mark reproduction signal $S_{CM}$ can be extracted by the bandpass filter 71 (see FIG. 29) while being affected in no way whatsoever by the clock signal 2DCK. Further, phase information can be obtained with high accuracy from the zero cross point, and a satisfactory reproduction of the data clock signal DCK achieved.

The optical disk apparatus 10D, is provided just with a doubler circuit 92. As can be seen in FIG. 36 in which the optical disk apparatus 10B is also provided with an oscillator 91, the optical disk apparatus 10D has a simpler structure and is less expensive. Further, in the optical disk apparatus 10C shown in FIG. 38 there is no switching between the record power and the reproduction power $P_R$ so that compared to optical disk apparatus 10A, the optical disk apparatus 10C has the advantage of simple power control of the semiconductor laser.

The example in the above embodiments showed in the optical disk 11, a groove 12G wobbled only on one side however, the groove 12G may also be wobbled on both sides.

Also, in the above-explained embodiment, the clock mark CM is preformatted on the wobbled side of the groove portion 12G. However, the clock mark CM may be preformatted on the non-wobbled side of the groove 12G, and moreover the clock marks CM may be preformatted on both sides of this groove 12G.

Further in the above embodiments, the waveform numbers of the groove wobbles corresponding to the address information of "1" and "0" are respectively selected to be "4" and "3", but need not be limited to these numbers.

Still further, in the above embodiments, the fixed pattern region of the recording region is provided to correspond to the recording position of the clock mark CM in an one-to-one relationship. However, this fixed pattern region need not necessarily be positioned to correspond to the recording position of the clock mark CM. The total number of these fixed pattern regions may for instance be selected to be smaller than the clock marks CM.

Yet further in the above embodiments, the 2T fixed pattern signal is recorded in synchronization with the NRZI data in the fixed pattern region of the magneto-optical disk 11. Alternatively, either a 1T fixed pattern signal or a 3T or higher fixed pattern signal may also be recorded. However it should be understood that when the pattern interval becomes small, the amplitude of the reproduction signal $S_{MO}$ will decrease and the S/N ratio would deteriorate due to the MTF (Modulation Transfer Function). Conversely, when the pattern interval is extended, the fixed pattern region must be widened, in order for the edge numbers for phase comparison to be obtained as the same number, with the result that the data region into which the data can be recorded becomes narrow.

Even further, in the above embodiments in the ADIP decoder 60, the demodulating process operation is carried out by utilizing a clock signal CK 24 having a frequency "fc" (=6 fa=8 fb) higher than the frequencies "fa" and "fb" of the wobble signals $S_{WB}$ by a common frequency multiple, which corresponds to the data of the address information ADM of "1" and "0". Alternatively, a similar demodulating process operation may be performed may be performed by utilizing a clock signal having a frequency higher than these frequencies "fa" and "fb" of the wobble signal $S_{WB}$ by another common frequency multiple.

Still yet further, in the above embodiments, the unique idea of the present invention is applied to the magneto-optical disk apparatus 10. Alternatively, this unique idea may similarly be applied to other types of optical disk apparatus capable of handling an optical disk in which address information is frequency-modulated, and the frequency-modulated signal is recorded as a groove wobble.

What is claimed is:

1. An optical disk apparatus for driving an optical disk on which a groove wobble corresponding to a signal acquired from frequency modulation of biphase modulated address information, and a mark for representing phase information placed inside said wobble are preformatted; and having the biphase bit count "a" ("a" is a natural number) between two of adjacent said marks, and the channel bit count "n" ("n" is a natural number) between two of said adjacent marks, comprising:

first clock signal production means for generating a first clock signal utilizing an "n" frequency multiple of the reproduction signal of said clock mark;

wobble signal reproduction means for reproducing from said optical disk a wobble signal corresponding to said groove wobble; and frequency demodulation means for acquiring said address information by frequency demodulation of said wobble signal, said frequency demodulation means having:

a second clock signal generator for generating a second clock signal by frequency dividing a data clock signal supplied from said first clock signal reproduction means by $1/M(M=n/(a \cdot s))$ in which a clock "s" ("s" is a natural number) is an oversampling value of said biphase bit;

a waveform shaping unit for acquiring binary values by waveforming said wobble signal; and, a detector for acquiring said address information by processing said second clock signal using said binary signal.

2. An apparatus according to claim 1 further comprising information recording/reproducing means for recording or reproducing the record track formed along said wobble groove on the optical disk.

3. An apparatus according to claim 2, wherein said information recording/reproducing means records or reproduces said information signal based on said first clock signal.

* * * * *